United States Patent
Takai et al.

(10) Patent No.: US 8,675,759 B2
(45) Date of Patent: Mar. 18, 2014

(54) WIRELESS TRANSMISSION SYSTEM, AND WIRELESS STATION AND METHOD USED FOR SAME

(75) Inventors: Hitoshi Takai, Osaka (JP); Hidetoshi Yamasaki, Hyogo (JP); Hideki Nakahara, Hyogo (JP); Kenji Miyanaga, Osaka (JP)

(73) Assignee: Panasonic Corporation, Osaka (JP)

( * ) Notice: Subject to any disclaimer, the term of this patent is extended or adjusted under 35 U.S.C. 154(b) by 1184 days.

(21) Appl. No.: 12/294,568

(22) PCT Filed: Mar. 20, 2007

(86) PCT No.: PCT/JP2007/055696
§ 371 (c)(1),
(2), (4) Date: Sep. 25, 2008

(87) PCT Pub. No.: WO2007/114049
PCT Pub. Date: Oct. 11, 2007

(65) Prior Publication Data
US 2010/0239039 A1    Sep. 23, 2010

(30) Foreign Application Priority Data
Mar. 29, 2006    (JP) ................................. 2006-091308

(51) Int. Cl.
*H04B 7/02*    (2006.01)

(52) U.S. Cl.
USPC ............................................. 375/267; 455/7

(58) Field of Classification Search
USPC ............ 375/267, 347; 455/11.1, 7, 16, 15, 9, 455/18, 24; 370/315
See application file for complete search history.

(56) References Cited

U.S. PATENT DOCUMENTS

| | | |
|---|---|---|
| 5,394,435 A | 2/1995 | Weerackody |
| 5,822,701 A | 10/1998 | Tomisato et al. |

(Continued)

FOREIGN PATENT DOCUMENTS

| | | |
|---|---|---|
| EP | 1 471 696 | 10/2004 |
| JP | 2506748 | 4/1996 |

(Continued)

OTHER PUBLICATIONS

S. Ariyavisitakul, S. Yoshida, F. Ikegami, K. Tanaka, T. Takeuchi, "A Power-Efficient Linear Digital Modulator and Its Application to an Anti-Multipath Modulation PSK-RZ Scheme", Proceedings of IEEE Vehicular Technology Conference), Jun. 1987, pp. 66-71 and Figures 5 and 8.

(Continued)

*Primary Examiner* — Aristocratis Fotakis
(74) *Attorney, Agent, or Firm* — Wenderoth, Lind & Ponack, L.L.P.

(57) ABSTRACT

A wireless transmission system performs multi-station simultaneous transmission of data. The wireless transmission system includes wireless stations for transmitting and receiving data. Transmitter-side wireless stations, a multipath channel, and receiver-side wireless stations constitute a system for path diversity. At least one wireless station among the wireless stations determines, depending on a response packet with respective to a multi-station simultaneous transmission request packet transmitted by itself or other stations, delay amounts from a reference timing during multi-station simultaneous transmission in the wireless transmission system, and symbol waveforms that are a basis for a modulated waveform. A difference between each delay amount is set to be larger than or equal to a predetermined delay resolution for each symbol waveform, and a difference between maximum and minimum values of the delay amounts is set to be smaller than or equal to a predetermined maximum delay.

20 Claims, 66 Drawing Sheets

(56) References Cited

U.S. PATENT DOCUMENTS

| | | |
|---|---|---|
| 8,345,693 B1 * | 1/2013 | Kim .............................. 370/400 |
| 2003/0124976 A1 * | 7/2003 | Tamaki et al. .................. 455/15 |
| 2003/0125067 A1 * | 7/2003 | Takeda et al. ................. 455/522 |
| 2004/0213231 A1 | 10/2004 | Cho et al. |
| 2004/0233918 A1 * | 11/2004 | Larsson et al. ................ 370/400 |
| 2004/0266339 A1 * | 12/2004 | Larsson ............................ 455/7 |
| 2005/0113084 A1 * | 5/2005 | Scaglione et al. ......... 455/426.2 |
| 2005/0201316 A1 | 9/2005 | Fukuhara et al. |
| 2006/0045065 A1 | 3/2006 | Kim et al. |
| 2006/0057958 A1 * | 3/2006 | Ngo et al. .......................... 455/7 |
| 2007/0076740 A1 * | 4/2007 | Manjeshwar ................. 370/432 |
| 2007/0165581 A1 * | 7/2007 | Mehta et al. .................. 370/338 |
| 2008/0025248 A1 * | 1/2008 | Naden ............................ 370/321 |
| 2009/0005104 A1 * | 1/2009 | Wang et al. ................... 455/522 |
| 2009/0036052 A1 * | 2/2009 | Miyanaga et al. .............. 455/18 |
| 2009/0147785 A1 * | 6/2009 | Yanagihara ................... 370/390 |
| 2010/0110973 A1 * | 5/2010 | Hart .............................. 370/315 |

FOREIGN PATENT DOCUMENTS

| | | |
|---|---|---|
| JP | 2000-115181 | 4/2000 |
| JP | 3325890 | 7/2002 |
| JP | 2005-244873 | 9/2005 |
| WO | 96/27245 | 9/1996 |

OTHER PUBLICATIONS

International Search Report mailed Jun. 19, 2007 for International Application No. PCT/JP2007/055696.

H. Takai, "BER Performance of Anti-Multipath Modulation Scheme PSK-VP and its Optimum Phase-Waveform", IEEE, Trans. Veh. Technol., vol. VT-42, Nov. 1993, pp. 625-639.

Akira Hiroike, Fumiyuki Adachi, Nobuo Nakajima, "Combined Effects of Phase Sweeping Transmitter Diversity and Channel Coding," IEEE, Trans. Veh. Technol. vol. 41, No. 2, May 1992, pp. 170-176.

* cited by examiner

FIG. 2

| PR | UW | PACKET IDENTIFIER | DESTINATION ADDRESS | SOURCE ADDRESS | SOURCE MANAGEMENT STATION ADDRESS (ID) | INFORMATION DATA | CRC |

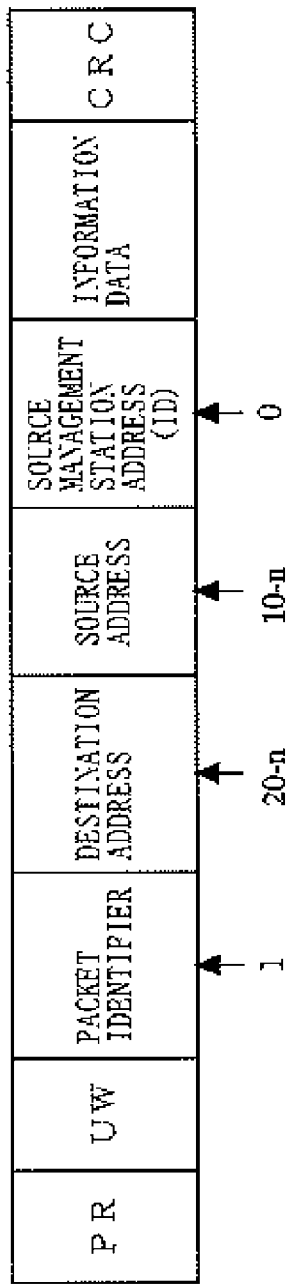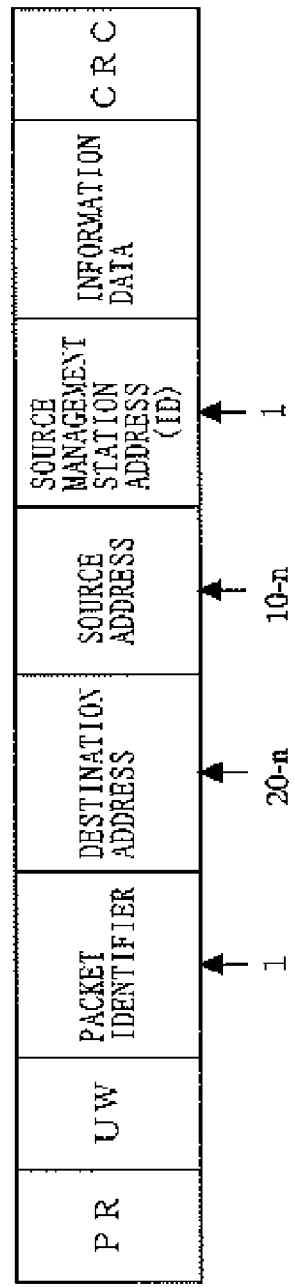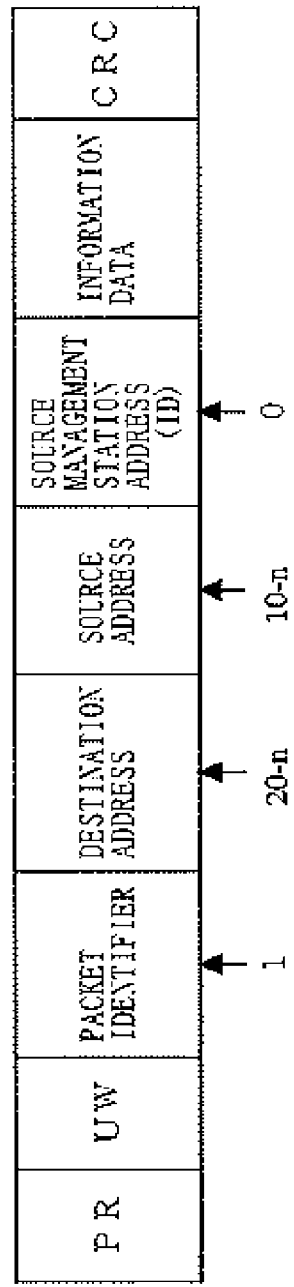

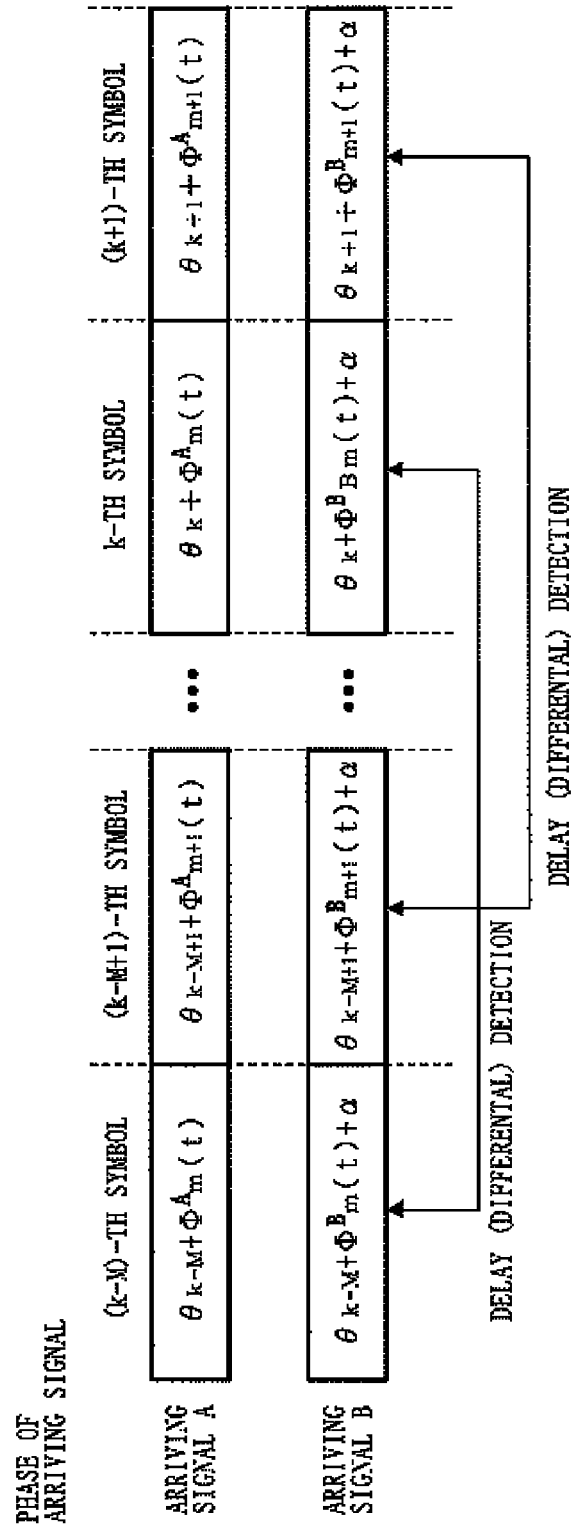

F I G. 1 2
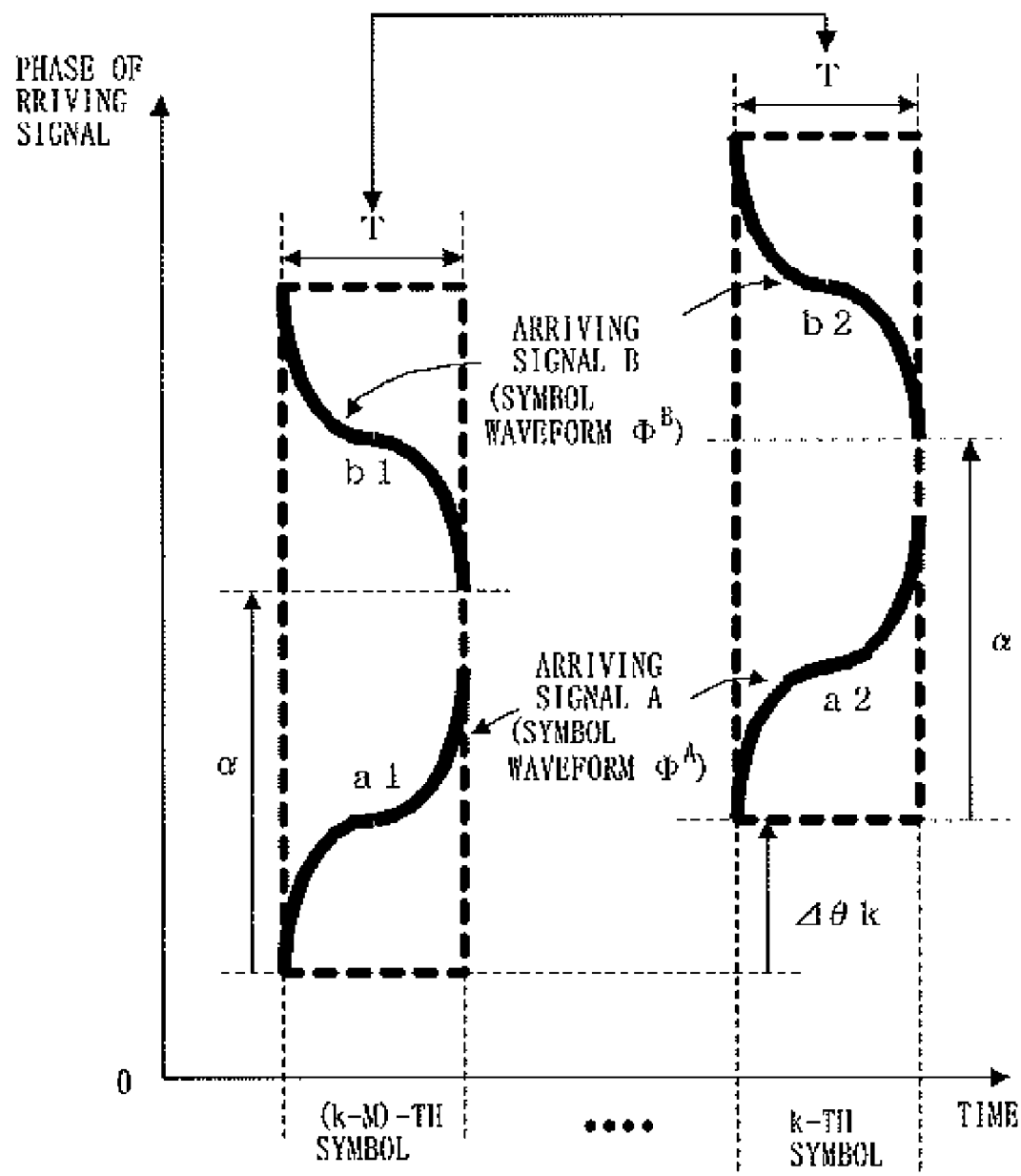

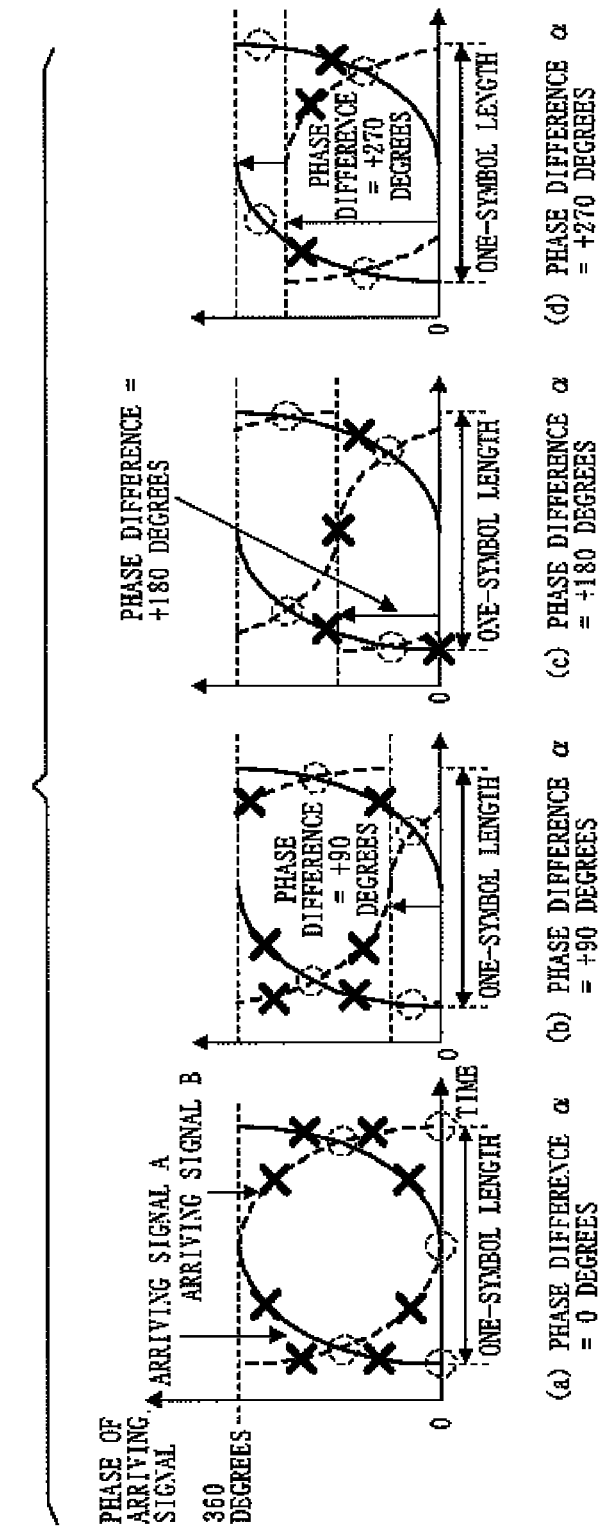

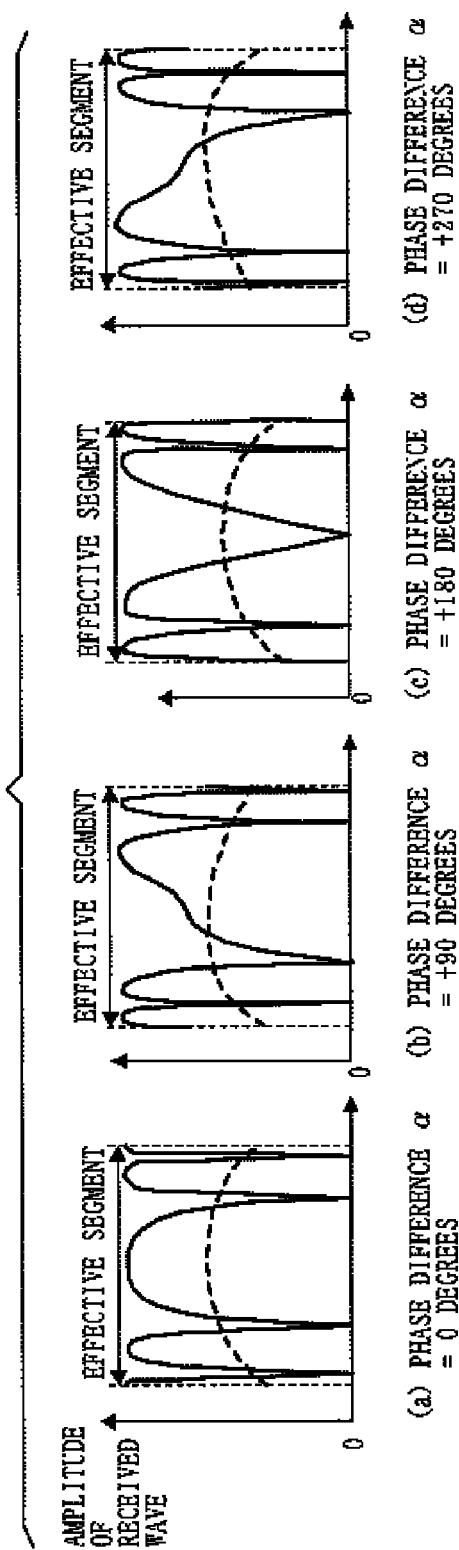

F I G. 1 7
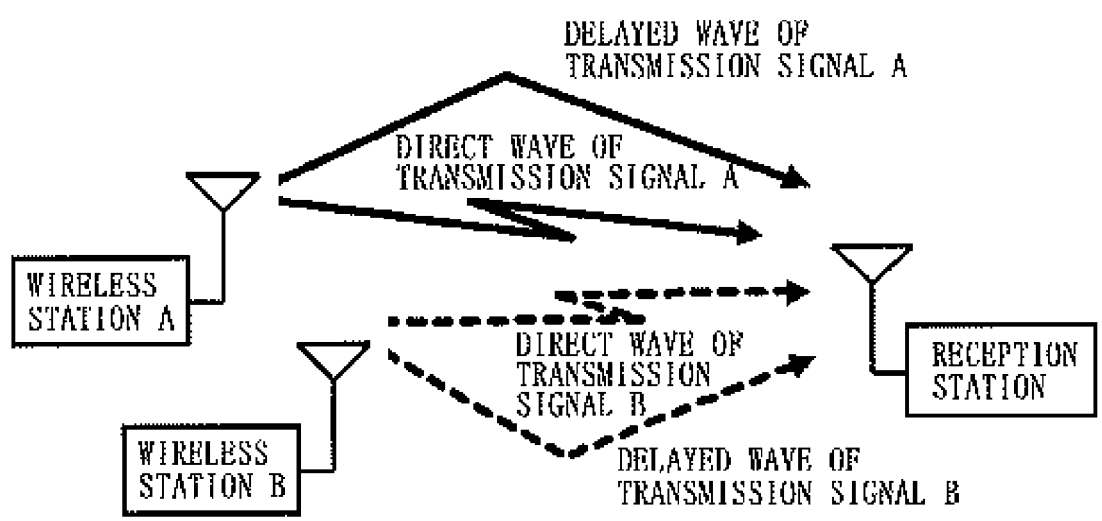

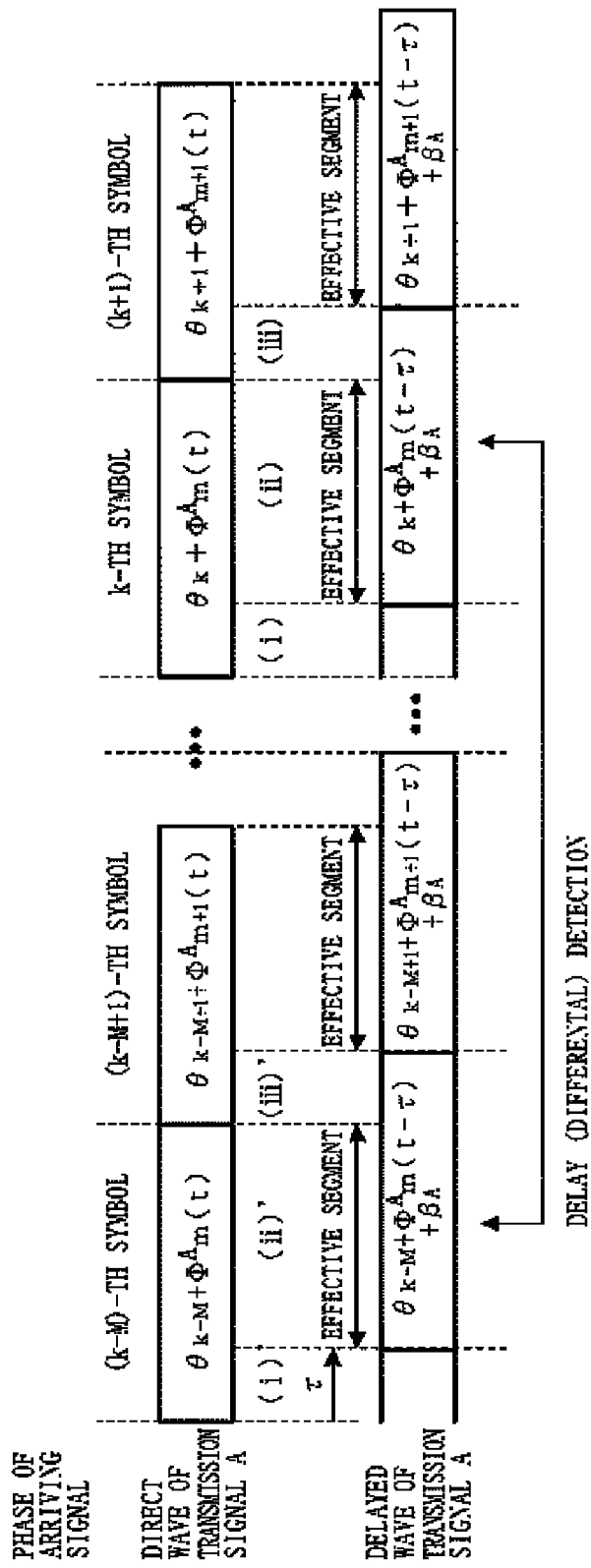

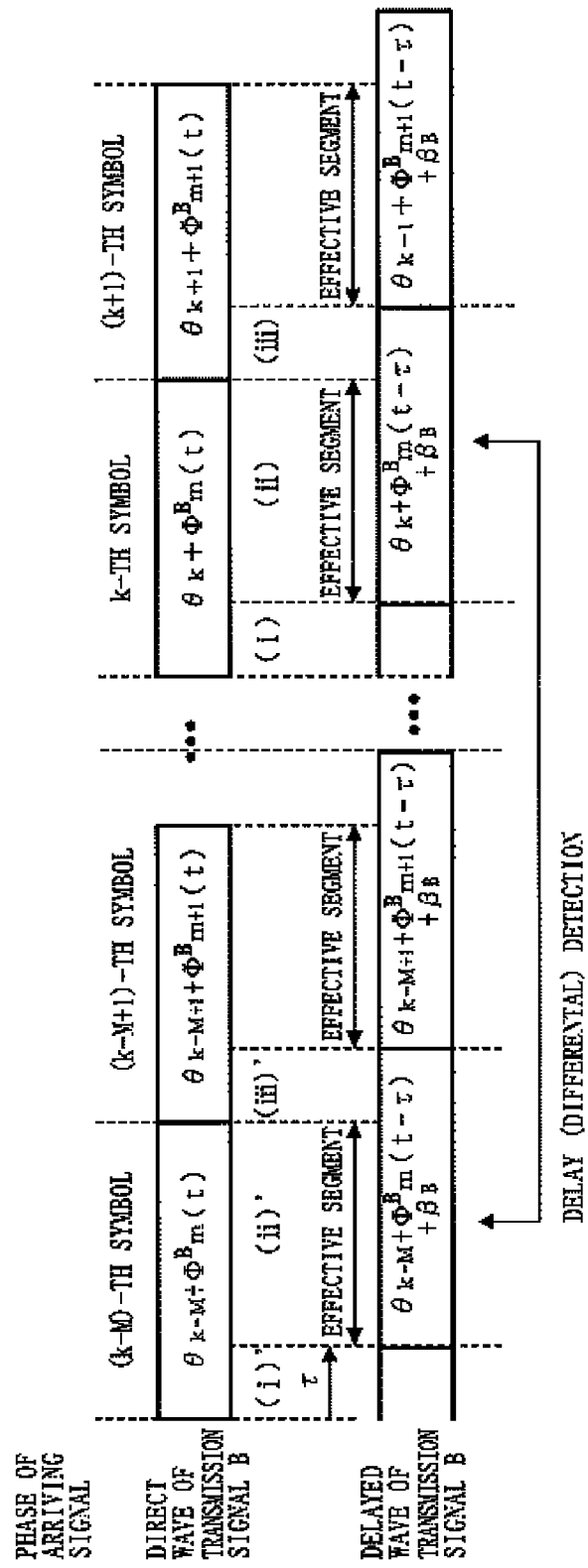

F I G. 2 1 A
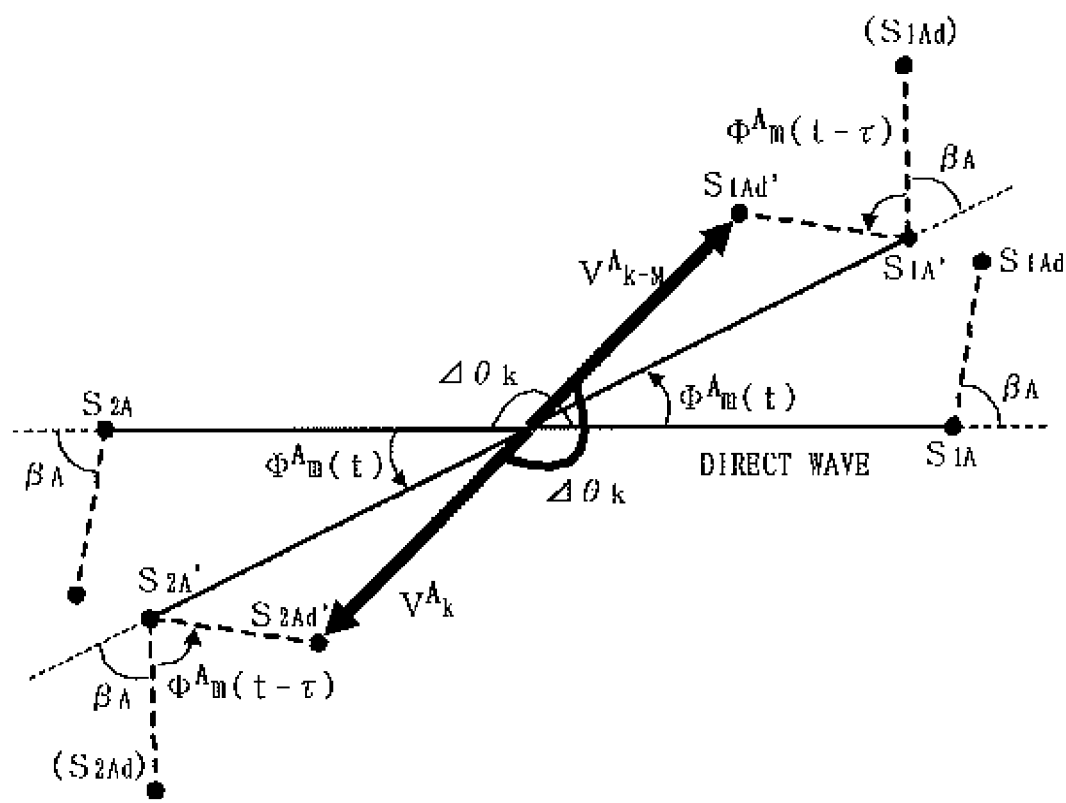

F I G. 3 1 A
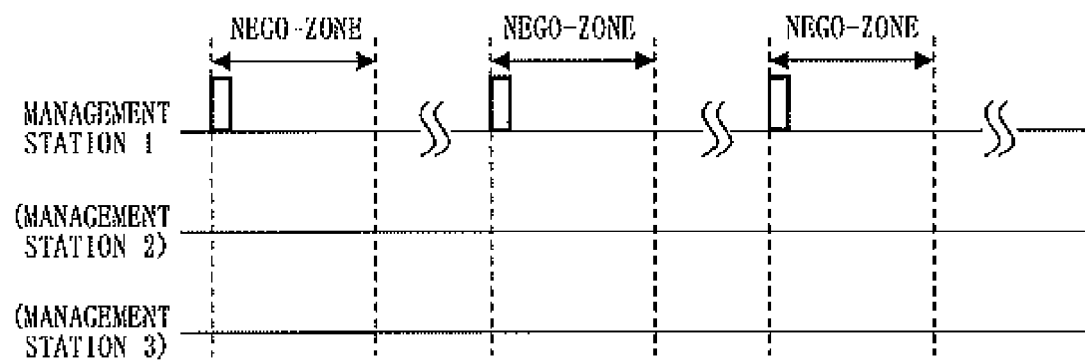
F I G. 3 1 B
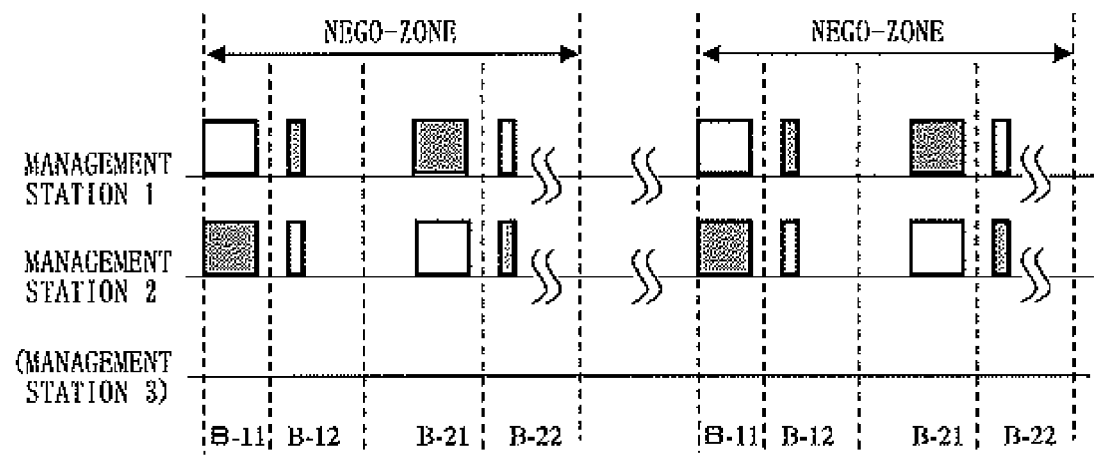

| SOURCE MANAGEMENT STATION ID \ MANAGEMENT STATION ID | SYMBOL WAVEFORM AND DELAY AMOUNT ASSIGNED TO EACH MANAGEMENT STATION | | | | |
|---|---|---|---|---|---|
| | 1 | 2 | 3 | 4 | 5 |
| 1 | — | W1T1 | W1T2 | W2T1 | W2T2 |
| 2 | W1T1 | — | W1T2 | W2T1 | W2T2 |
| 3 | W1T1 | W1T2 | — | W2T1 | W2T2 |
| 4 | W1T1 | W1T2 | W2T1 | — | W2T2 |
| 5 | W1T1 | W1T2 | W2T1 | W2T2 | — |

F I G. 3 6 A
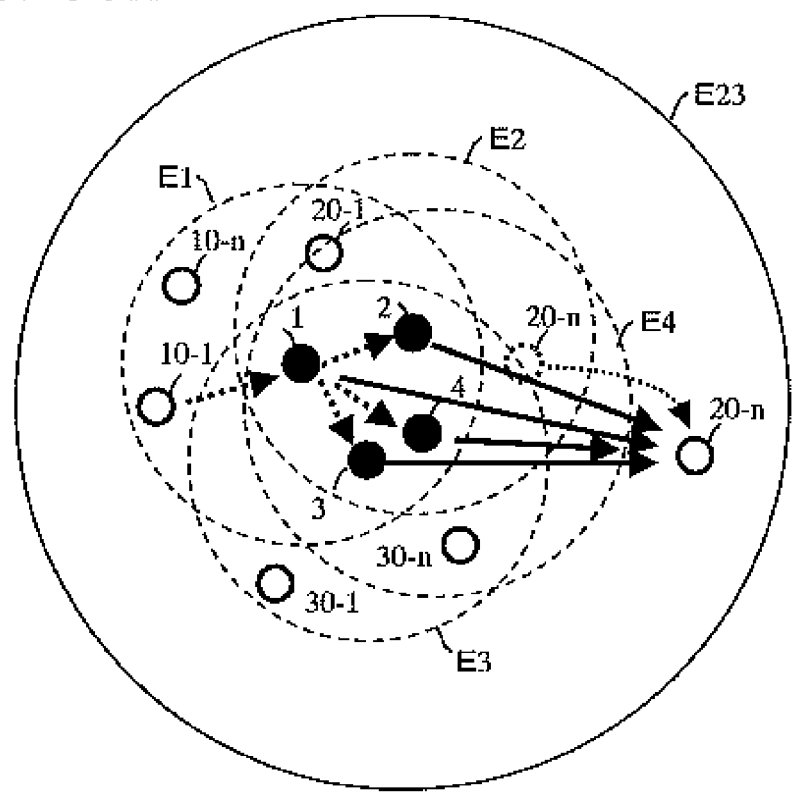
F I G. 3 6 B
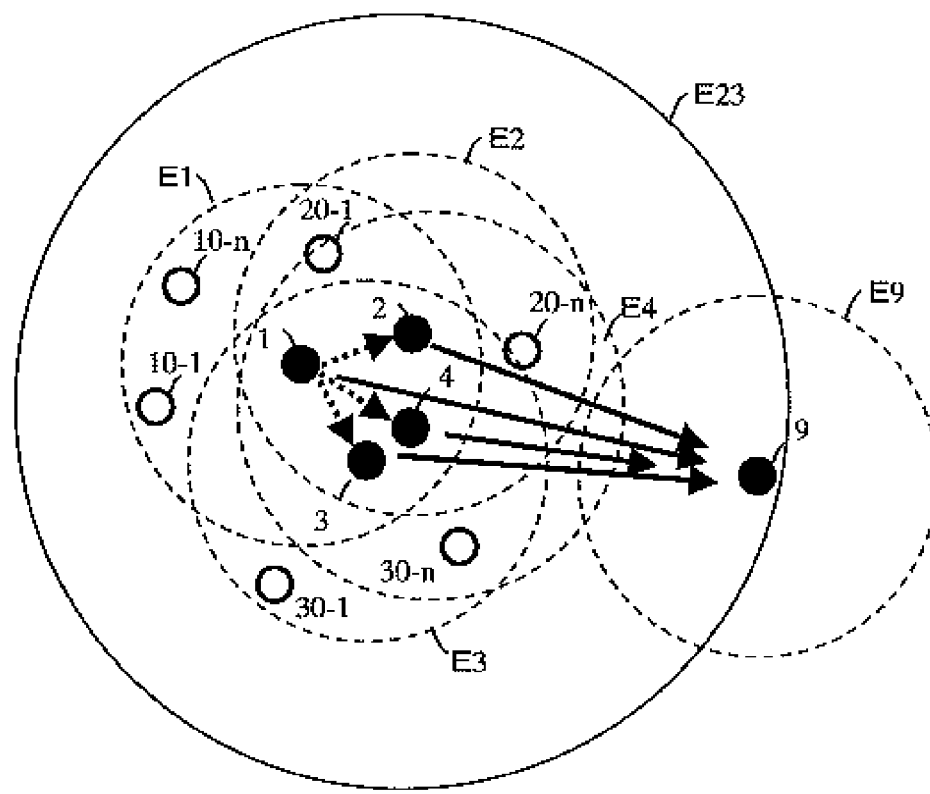

| SOURCE MANAGEMENT STATION ID \ MANAGEMENT STATION ID | SYMBOL WAVEFORM AND DELAY AMOUNT ASSIGNED TO EACH MANAGEMENT STATION | |
|---|---|---|
| | 1 | 2 |
| 1 | W1 T1 | W1 T2 |
| 2 | W1 T1 | W1 T2 |

FIG. 41

| SYMBOL WAVEFORM AND DELAY AMOUNT OF EACH MANAGEMENT STATION ||
|---|---|
| STATION IS SOURCE MANAGEMENT STATION | ANOTHER STATION IS SOURCE MANAGEMENT STATION |
| W1T2 OR W2T1 | W1T1 |

FIG. 42

| | SYMBOL WAVEFORM AND DELAY AMOUNT ASSIGNED TO EACH MANAGEMENT STATION ||||
|---|---|---|---|---|
| SOURCE MANAGEMENT STATION ID \ MANAGEMENT STATION ID | 1 | 2 | 3 | 4 |
| 1 | W1T1 | W1T2 | W2T1 | W2T2 |
| 2 | W1T1 | W1T2 | W2T1 | W2T2 |
| 3 | W1T1 | W1T2 | W2T1 | W2T2 |
| 4 | W1T1 | W1T2 | W2T1 | W2T2 |

F I G. 4 5 A

| SOURCE MANAGEMENT STATION ID \ MANAGEMENT STATION ID | SYMBOL WAVEFORM AND DELAY AMOUNT ASSIGNED TO EACH MANAGEMENT STATION ||||| 
|---|---|---|---|---|---|
| | 1 | 2 | 3 | 4 | 5 |
| 1 | — | W1T1 | W1T2 | W2T1 | W2T2 |
| 2 | W1T1 | — | W1T2 | W2T1 | W2T2 |
| 3 | W1T1 | W1T2 | — | W2T1 | W2T2 |
| 4 | W1T1 | W1T2 | W2T1 | — | W2T2 |
| 5 | W1T1 | W1T2 | W2T1 | W2T2 | — |

F I G. 4 5 B

| SOURCE MANAGEMENT STATION ID \ MANAGEMENT STATION ID | SYMBOL WAVEFORM AND DELAY AMOUNT ASSIGNED TO EACH MANAGEMENT STATION ||||
|---|---|---|---|---|
| | 1 | 2 | 4 | 5 |
| 1 | — | W1T1 | W2T1 | W2T2 |
| 2 | W1T1 | — | W2T1 | W2T2 |
| 4 | W1T1 | W1T2 | — | W2T2 |
| 5 | W1T1 | W1T2 | W2T2 | — |

| SOURCE MANAGEMENT STATION ID \ MANAGEMENT STATION ID | SYMBOL WAVEFORM AND DELAY AMOUNT ASSIGNED TO EACH MANAGEMENT STATION | | | |
|---|---|---|---|---|
| | 1 | 2 | 4 | 5 |
| 1 | W1T2 | W1T1 | W2T1 | W2T2 |
| 2 | W1T1 | W1T2 | W2T1 | W2T2 |
| 4 | W1T1 | W1T2 | W2T1 | W2T2 |
| 5 | W1T1 | W1T2 | W2T2 | W2T1 |

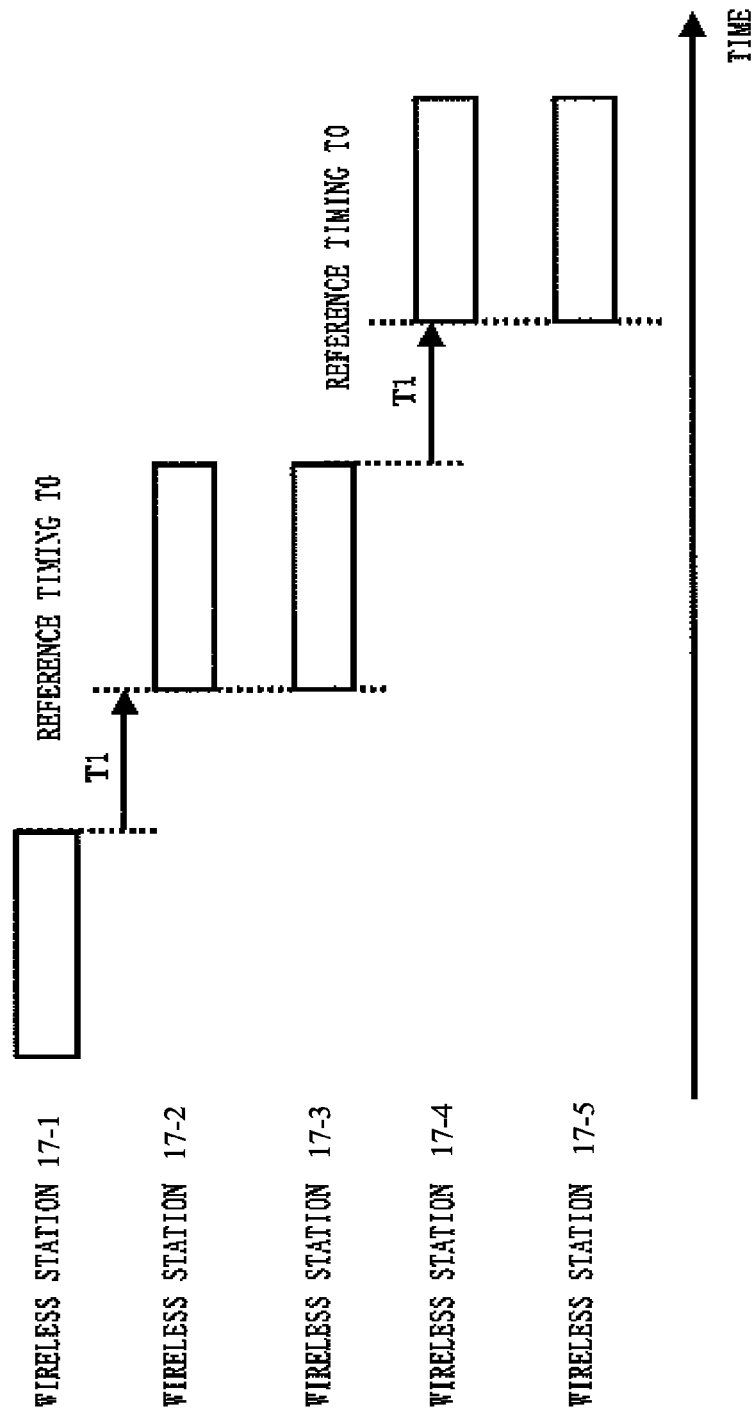

FIG. 55A  PRIOR ART
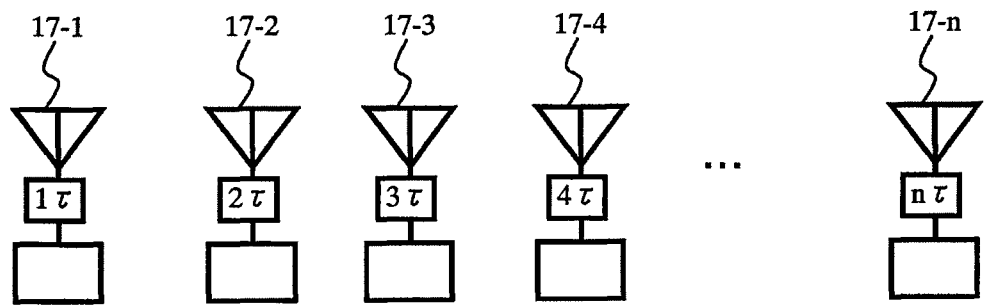
FIG. 55B  PRIOR ART
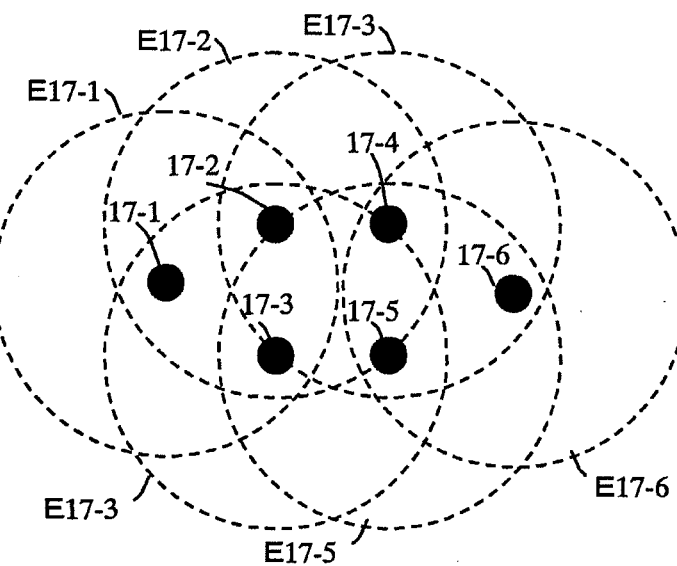

(a) PHASE RELATIONSHIP OF ARRIVING SIGNALS (b) AMPLITUDE OF RECEIVED WAVE WHEN PHASE IS OPPOSITE

WIRELESS TRANSMISSION SYSTEM, AND WIRELESS STATION AND METHOD USED FOR SAME

BACKGROUND OF THE INVENTION

1. Technical Field

The present invention relates to a wireless transmission systems in which a plurality of wireless stations in proximity to each other send data by multi-station simultaneous transmission, and a wireless station and method for use in the same.

2. Background Art

Generally, in wireless communication, a transmitted signal propagates through a plurality of propagation paths to reach a receiver in different propagation times, which causes multipath fading. To prevent a deterioration in transmission characteristics due to multipath fading, modulation/demodulation schemes resistant to multipath have been used.

Examples of the multipath resistant modulation/demodulation scheme include spread spectrum, Orthogonal Frequency Division Multiplexing (OFDM) in which information is distributed over a large number of subcarriers arranged within a wide range of frequencies, anti-multipath modulation in which multipath resistance is achieved by adding phase or amplitude redundancy to transmitted symbols, and the like.

Examples of spread spectrum include Direct Sequence Spread Spectrum (DSSS) in which an original signal is multiplied by a spread signal having a wider band than that of the original signal, Frequency Hopping Spread Spectrum (FHSS) in which a carrier signal is caused to hop over a wide band of frequencies, and Time Hopping Spread Spectrum (THSS) in which a signal is spread using impulses within a wide band.

Examples of the anti-multipath modulation scheme include PSK-VP (Phase Shift Keying with Varied Phase) in which convex-shape phase redundancy is added (Non-Patent Document 1), PSK-RZ (Return to Zero Phase Shift Keying) in which amplitude redundancy is added (Non-Patent Document 2), and the like.

Also, even when a typical single carrier modulation scheme is employed to perform wireless communication, multipath resistance can be imparted by providing an equalizer on the receiver's side. A modulation/demodulation scheme in which a single carrier modulation scheme is employed for wireless communication and an equalizer is used on the receiver's side, is also a multipath resistant modulation/demodulation scheme.

By using such a multipath resistant modulation/demodulation scheme for communication, a deterioration in transmission characteristics due to multipath waveform distortion can be prevented. Further, when element waves forming multipath (delayed waves) have moderate differences between their arrival times to a receiver, delayed wave components may be separated or combined by performing diversity reception (path diversity reception) with respect to the delayed waves, so that transmission characteristics can be actively improved.

Hereinafter, the lower limit value and the upper limit value of the arrival time difference that allows the path diversity effect are referred to as a delay resolution and a maximum delay, respectively. The delay resolution and the maximum delay may be determined by the principle of a modulation/demodulation scheme used or by parameters, or constraints on implementation, of the modulation/demodulation scheme.

For example, in the DSSS scheme, a received signal is separated into a plurality of delayed wave components (paths), which are in turn combined (RAKE reception), on the receiver's side. The delay resolution for obtaining the path diversity effect corresponds to the one-chip length of spread code. The maximum delay corresponds to a value that is less than the spread code length.

Also, in the OFDM scheme, a delayed wave component is absorbed in a guard interval set for a signal, and the maximum delay corresponds to a guard time. If a difference in propagation time between delayed waves is within the guard interval, symbol-to-symbol interference does not occur. Also, since an error correction process is typically performed over a plurality of subcarriers, information can be reproduced even if an error occurs in a portion of the subcarriers due to multipath distortion. On the other hand, the delay resolution is substantially equal to about the reciprocal of a frequency bandwidth. Thus, when the OFDM scheme is used, the path diversity effect can be obtained by the effect of the guard interval and the frequency diversity effect by distributing information over a wide frequency band and recovering the information.

Also, when the PSK-VP scheme or the PSK-RZ scheme is used, the delay resolution is equal to a time of a fraction of a symbol length, and the maximum delay is equal to a time of less than a one-symbol length. Also, when a single carrier scheme, such as the PSK scheme, the QAM scheme or the like, is used on the transmitter's side, and an equalizer using a delay line with a tap is used on the receiver's side, the delay resolution is equal to a one-symbol length, and the maximum delay is equal to a time determined by the number of taps.

In the fields of cellular telephone or broadcasting, a wireless transmission system has been proposed in which, by using the above-described anti-multipath modulation/demodulation scheme, when the same signal is sent by multi-station simultaneous transmission from antennas of a plurality of base stations, the signal is artificially delayed to obtain the path diversity effect, whereby transmission characteristics are actively improved, a communication area is increased, and the like. Note that, even in such a multi-station system, the path diversity effect cannot be obtained at a point where the arrival time difference of arriving waves from antennas departs from the range of the delay resolution or more and the maximum delay or less.

In fact, for example, when the arrival time difference of arriving waves from two stations is extremely small, the signals cancel each other at a point where two delayed waves having equal power and opposite phases are simultaneously received, so that transmission characteristics are significantly deteriorated. On the other hand, also at a point where the arrival time difference of arriving waves from two stations exceeds the maximum delay, the path diversity effect is not obtained, and in addition, the transmission characteristics are deteriorated. Therefore, in a conventional multi-station system, to avoid such a problem, an appropriate difference is provided between transmission timings at which a plurality of antennas perform multi-station simultaneous transmission, thereby making it possible to reliably obtain the path diversity effect (e.g., Patent Document 1).

FIG. 48A is a diagram showing a configuration of a conventional multi-station simultaneous transmission system described in Patent Document 1. In FIG. 48A, a base station 50 communicates with mobile terminals using the CDMA (Code Division Multiple Access) scheme. Remote antenna systems 52-1 to 52-n are located between the base station and mobile terminals (not shown), and relay signals transmitted between the base station and the mobile stations. The remote antenna systems 52-1 to **52-*n* are provided at predetermined locations far apart from the base station 50. The remote antenna systems 52-1 to 52-*n* include high-gain antennas 54-1 to 54-*n*, delay units 56-1 to 56-*n*, and remote antennas 58-1 to 58-*n***.

A signal transmitted from the base station 50 is received and amplified by the high-gain antennas 54-1 to **54-*n*, and thereafter, are delayed by respective predetermined times in the delay units 56-1 to 56-*n*, and are transmitted from the remote antennas 58-1 to 58-*n*. In this system, the delay units 56-1 to 56-*n* provided in the remote antenna systems 52-1 to 52-*n* have different delay times that are multiples of a time τ that is slightly larger than the one-chip time of spread code. Thereby, for example, areas E58-1 to E58-5 which the remote antennas 58-1 to 58-5 cover, respectively, are formed as shown in FIG. 48**B. In this case, by setting the arrival time difference of arriving waves at an area overlapping point at which signals from adjacent local antennas have substantially equal power and which are equidistant from the local antennas to be an appropriate value (in this case, about τ to 3τ), the path diversity by multi-station simultaneous transmission can be reliably obtained.

Also, Patent Document 2 describes a modulation scheme for a transmission method in which attention is paid to a symbol waveform (a phase waveform in a symbol). This scheme provides a symbol waveform having a convex-shape phase transition that is synchronous with a symbol length T, and obtains a detection output by delay (differential) detection. By this scheme, a situation in which a detection output is lost due to multipath can be avoided, and the path diversity effect is obtained, so that transmission characteristics can be improved. This improvement effect is theoretically achieved when the delay amount τ of delayed wave is within a predetermined range (0<τ<T).

FIG. 49 is a schematic diagram showing the phase transition of a symbol waveform described in Patent Document 2. In FIG. 49, in this phase transition, a phase is parabolically changed based on a function represented by:

$$\phi(t) = (4\phi_{MAX}/T^2) \cdot 1 \cdot (T-t); (0 < t < T) \quad (1)$$

where a transition width when the time length of one symbol (symbol length) is T is limited by a maximum phase transition amount $\phi_{MAX}$.

FIG. 50 is a diagram showing a configuration of a transmission signal generating circuit 700 described in Patent Document 2. As shown in FIG. 50, the transmission signal generating circuit 700 comprises a differential encoding circuit 701, a waveform generating circuit 702, a quadrature modulator 704, and an oscillator 703. The transmission signal generating circuit 700 differentially encodes transmission data using the differential encoding circuit 701, modulates the resultant transmission data with a symbol waveform having convex-shape phase redundancy using the waveform generating circuit 702, and converts the resultant transmission data into a signal having a carrier frequency band using the quadrature modulator 704.

Next, a phase relationship between arriving signals when such a symbol waveform having convex-shape phase redundancy is used, will be described.

FIG. 51 is a schematic diagram showing a phase relationship between two arriving signals A and B when the symbol waveform having convex-shape phase redundancy is used. In FIG. 51, when a phase difference α is assumed to be 180 degrees, then if a delay occurs between arriving signals, the convex-shape phase transition allows an interval in which received waves remain without being canceled (points a and c in FIG. 51), though there is an interval in which received waves are canceled and lost in an effective interval (point b in FIG. 51). By processing the arriving signals A and B by a combination of delay (differential) detection and a low-pass filter, an effective detection output can be obtained. As a result, the path diversity effect is obtained and the transmission characteristics are improved.

FIG. 52 is a schematic diagram showing a configuration of a conventional wireless transmission system using transmission diversity by the modulation scheme described in Patent Document 2. As shown in FIG. 52, a delay unit 901 is provided between the transmission signal generating circuit 700, and first and second antennas 904 and 905 so as to provide a delay between signals to be transmitted from the first and second antennas 904 and 905. In this case, a delay amount is set so that the path diversity effect is satisfactorily exhibited before transmission is performed, so that transmission characteristics can be improved.

On the other hand, in recent years, a multi-hop system has been studied in which a plurality of wireless stations relay data to each other for wireless communication. FIG. 53 is a diagram showing a configuration of a conventional wireless transmission system described in Patent Document 3. In FIG. 53, the wireless transmission system comprises six wireless stations 17-1 to 17-6. FIG. 54 is a diagram schematically showing transmission timings of packets transmitted by the wireless stations of FIG. 53.

Initially, the wireless station 17-1 transmits a broadcast packet. The packet transmitted by the wireless station 17-1 can be received by the wireless stations 17-2 and 17-3 that are located in proximity to the wireless station 17-1. The wireless stations 17-2 and 17-3 wait for transmission from a timing when packet reception is completed to a predetermined transmission timing, and then simultaneously transmit packets.

Next, the packets transmitted by the wireless stations 17-2 and 17-3 can be received by the wireless stations 17-4 and 17-5. The wireless stations 17-4 and 17-5 also wait for transmission from a timing at which packet reception is completed to a predetermined transmission timing, and then simultaneously transmit packets. Thereafter, the wireless station 17-6 receives the packets transmitted by the wireless stations 17-4 and 17-5. Thus, in the multi-hop system of Patent Document 3, by using the multipath resistant OFDM, even when a plurality of wireless stations simultaneously transmit the same packet, interference does not occur. As compared to the case where the wireless stations 17-1 to 17-6 successively perform multi-hop transmission (in the stated order, one station for each time), a time required for broadcast packet transmission can be reduced, so that transmission efficiency can be improved.

Thus, according to the conventional wireless transmission system described in Patent Document 3, a plurality of wireless stations can perform efficient multi-hop transmission using a multipath resistant modulation/demodulation scheme.

Patent Document 1: Japanese Patent No. 3325890
Patent Document 2: Japanese Patent No. 2506748
Patent Document 3: Japanese Laid-Open Publication No. 2000-115181
Non-Patent Document 1: H. Takai, "BER Performance of Anti-Multipath Modulation Scheme PSK-VP and its Optimum Phase-Waveform", IEEE, Trans. Veh. Technol.), Vol. VT-42, November 1993, p 625-639
Non-Patent Document 2: S. Ariyavisitakul, S. Yoshida, F. Ikegami, K. Tanaka, T. Takeuchi, "A Power-efficient linear digital modulator and its application to an anti-multipath modulation PSK-RZ scheme", Proceedings of IEEE Vehicular Technology Conference), June 1987, p 66-71

SUMMARY OF THE INVENTION

Typically, a multi-hop system is constructed using wireless stations that are located in proximity to each other. Therefore, propagation path lengths from wireless stations that send a packet by multi-station simultaneous transmission to a receiving station are substantially the same. Therefore, also in the conventional wireless transmission system described in Patent Document 3, if an appropriate difference is not provided between packet transmission timings in wireless stations performing multi-station simultaneous transmission (e.g., the wireless stations 17-9 and 17-5), then when two delayed waves have opposite phases as described above, the two delayed waves cancel each other, so that the path diversity effect cannot be obtained.

However, Patent Document 3 is directed to a reduction in a time required for packet transmission, thereby increasing transmission efficiency. Therefore, in Patent Document 3, reliable acquisition of the path diversity effect is not taken into consideration. Thus, Patent Document 3 does not describe a method for reliably providing an appropriate transmission timing difference between wireless stations.

Also, in the conventional multi-station simultaneous transmission system described in Patent Document 1, only one base station is a signal source at any time as in a wireless broadcasting or cellular system, and the arrangement of antennas that are used to send a transmitted signal by multi-station simultaneous transmission from base stations, and transmission routes are fixed. Therefore, when a wireless station as a source or a wireless station that relays a signal moves, the number of wireless stations performing multi-station simultaneous transmission (station number) or a transmission route may be changed, which is not taken into account in Patent Document 1. Therefore, when the conventional multi-station simultaneous transmission system of Patent Document 1 is applied to a multi-hop system in which wireless stations performing multi-station simultaneous transmission or transmission routes are changed, a problem arises as described below.

FIGS. 55A to 55C are diagrams for describing a problem that arises when the multi-station simultaneous transmission system of Patent Document 1 is applied to a multi-hop system in which the station number or a transmission route varies. Wireless stations 17-1 to 17-$n$ ($n$ is a natural number of one or more) of FIG. 55A form communication areas E17-1 to E17-$m$ ($m$ is a natural number of 1 through n), respectively, as shown in FIG. 55B or 55C.

For example, it is assumed that, as shown in FIG. 55A, delay times that are multiples of $\tau$ are assigned to the n wireless stations 17-1 to 17-$n$. The wireless stations 17-1 to 17-$n$ delay a packet by the assigned delay times and relay and transmit the resultant packets. The delay time $\tau$ is a time that is more than or equal to the delay resolution.

When the wireless stations 17-1 to 17-6 have a positional relationship as shown in FIG. 55B, a packet to be relayed and transmitted that is transmitted by the wireless station 17-1 (hereinafter referred to as a broadcast packet) is sent by multi-station simultaneous transmission by the wireless stations 17-2 and 17-3, and next, is sent by multi-station simultaneous transmission again by the wireless stations 17-4 and 17-5. In this case, delays of 2$\tau$ to 5$\tau$ are set in the wireless stations 17-2 to 17-5, respectively. Therefore, an arrival time difference between each path during multi-station simultaneous transmission is $\tau$, so that the path diversity effect can be obtained.

However, the wireless stations 17-1 to 17-5 and 17-$m$ may be present in the positional relationship of FIG. 55C, due to movement, exchange or the like of wireless stations. In this case, a broadcast packet transmitted by the wireless station 17-2 is then sent by multi-station simultaneous transmission by the wireless stations 17-1 and 17-5. However, the time difference between the delay time $\tau$ assigned to the wireless station 17-1 and the delay time 5$\tau$ assigned to the wireless station 17-5 is 4$\tau$. Therefore, when 4$\tau$ exceeds the maximum delay, the path diversity effect cannot be obtained. Therefore, the wireless stations 17-3 and 17-$m$ cannot receive broadcast packets that are transmitted by the wireless stations 17-1 and 17-5 and would otherwise be received. On the other hand, when 4$\tau$ is smaller than or equal to the maximum delay, broadcast packets transmitted by the wireless stations 17-3 and 17-$m$ are sent by multi-station simultaneous transmission again, where the time difference is $(m-3)\tau$. Also in this case, however, when $(m-3)\tau$ exceeds the maximum delay, the path diversity effect cannot be obtained, so that the wireless station 17-4 cannot receive a broadcast packet.

It is also contemplated that, for example, a modulation/demodulation scheme where the maximum delay is larger than or equal to $k\tau$ and less than $(k+1)\tau$ is applied to the wireless stations 17-1 to 17-$k$ ($k$ is a natural number of 1 through n) so that multi-hop transmission of a packet is performed, in order to avoid the problem such that the maximum delay is exceeded irrespective of the positional relationship of the wireless stations during multi-station simultaneous transmission as described above. In this case, it may be contemplated that, as shown in FIG. 56A, a delay time $j\tau$ (j is the remainder left over when m is divided by k) is assigned to the wireless station 17-$m$ having a wireless station ID number of m. Also in this case, however, a wireless station that is set to have the same delay time may be present. Therefore, for example, as in FIG. 56B, when the same delay time is assigned to wireless stations 17-$a$ and 17-$b$ that send a packet by multi-station simultaneous transmission, the timings of arriving waves from the wireless stations 17-$a$ and 17-$b$ to the wireless stations 17-4 and 17-5 are the same, so that the path diversity effect cannot be obtained.

The number of delay amounts that can be set by the above-described method (maximum effective branch number) is suppressed to about a value obtained by dividing the maximum delay by the delay resolution. Therefore, if the maximum delay is indefinitely large or the delay resolution is indefinitely small, the above-described problem does not arise. Actually, however, a delay resolution and a maximum delay inevitably exist for each modulation/demodulation scheme due to parameters, or constraints on implementation, of the modulation/demodulation scheme. Therefore, if the conventional multi-station simultaneous transmission system of Patent Document 1 is applied to multi-station simultaneous transmission of a multi-hop system, the path diversity effect may not be obtained as described above.

Particularly, in the above-described anti-multipath modulation/demodulation scheme, the maximum number of effective branches (maximum effective branch number) may be limited to a small number with respect to independent branches contributing to the path diversity effect, under circumstances described below. The maximum effective branch number contributing to the path diversity effect is smaller than or equal to a value obtained by dividing the maximum delay by the delay resolution. The maximum effective branch number becomes a considerably small value if the maximum delay is close to the delay resolution.

For example, if the maximum effective branch number is two, then when a third wave is added to two waves having an arrival delay corresponding to the delay resolution, where the third wave arrives during the arrival delay between the two waves, the third wave is superimposed on the two original waves, and remains in common after path disintegration in the receiver. Therefore, correlation in path diversity between branches increases, resulting in a deterioration. Thus, when the maximum delay is close to the delay resolution and the maximum effective branch number contributing to the path diversity effect is limited to a small number, a satisfactory result is not obtained only by adding a path having a delay. This problem has not been overcome by Patent Documents 1 to 3 and a method for solving the problem has not yet been proposed.

Assuming that the maximum delay is close to the delay resolution and the maximum effective branch number contributing to the path diversity effect is limited to a small number, each modulation/demodulation scheme will be hereinafter described in greater detail.

When the DSSS scheme is used, the maximum delay is less than the spread code length, so that the spread code length becomes short. As the spread chip length approaches the delay resolution, the maximum effective branch number becomes smaller. For example, when the spread code length is four chip lengths, and the spread ratio is four times, i.e., one symbol is spread using 4-chip spread code, the delay resolution is equal to one chip length and the maximum delay is equal to three chip lengths, so that the branch number is no higher than about four. When the FHSS scheme is used, the delay resolution is equal to the spread bandwidth, and the maximum delay is determined by the hop sequence length. Therefore, when the spread bandwidth is narrow and the hop sequence length is short, the maximum effective branch number is limited to a small number.

Also, when the THSS scheme is used, the delay resolution is equal to the pulse width and the maximum delay is determined by the pulse sequence length. Therefore, when the pulse width is large and the pulse sequence length is small, the branch number is limited to a small number. Similarly, in the OFDM scheme, the delay resolution is equal to the frequency bandwidth in which subcarriers are distributed and arranged, and the maximum delay is determined by the guard interval length. Therefore, when the frequency bandwidth is small and the guard interval is small, the maximum effective branch number is limited to a small number. When the PSK-VP scheme or the PSK-RZ scheme is used, since the maximum delay theoretically does not exceed the symbol length, the delay resolution is originally close to the maximum delay.

Also, when an equalizer is used, the delay resolution is determined by the symbol length, and the maximum delay is determined by the tap length of an equalizing filter. Therefore, when the time length of a filter tap is smaller than the symbol length, a similar case is obtained. Note that, in the equalizer, the circuit scale significantly depends on the number of taps, so that the maximum delay is often limited by constraints on the circuit scale.

Also, in the transmission technique of Patent Document 2 in which a modulation scheme having a phase transition synchronous with a symbol is applied to transmission diversity without insertion of a delay, in the case of a propagation path in which delay distribution is negligible, even if, for example, the levels of arriving waves from a plurality of transmission antennas are secured, then when the phases of two arriving signals are opposite to each other, the arriving signals cancel each other, so that the path diversity effect is not exhibited.

FIG. 57 is a schematic diagram showing a case where the phases of arriving signals are opposite to each other in the modulation scheme of Patent Document 2. Even if the phase transition has a convex shape as shown in FIG. 57 and a delay is not present between two arriving signals, then when the phases of the two arriving signals are opposite to each other, a detection output is not obtained, so that the improvement effect is lost.

FIG. 58 schematically shows a relationship between the bit error rate and the delay amount τ of the transmission scheme of Patent Document 2, in the two-wave model. In FIG. 58, the horizontal axis indicates the delay amount between arriving signals in the two-wave model, and the vertical axis indicates the bit error rate. If the delay amount between the arriving waves is small, then when the two arriving waves have phases opposite to each other, the improvement effect is lost, resulting in a deterioration in error rate, as described in FIG. 57. As the delay amount τ relatively increases, the improvement increases. As the delay amount τ approaches the symbol length T, the effective segment decreases, and eventually disappears, so that the error rate is deteriorated again.

Next, the PSK-VP scheme will be specifically described as an example based on a characteristic evaluation result.

FIG. 59 is a diagram showing an actual bit error rate characteristic with respect to an arrival time difference between two waves in a two-wave Rician model for the quadrature PSK-VP scheme (hereinafter referred to as a QPSK-VP scheme). The horizontal axis indicates the arrival time difference normalized by a symbol length T, and the vertical axis indicates the bit error rate. Note that a transmission path has a two-wave Rician fading environment of Eb/No=25 dB. According to FIG. 59, an improvement is actively performed by the path diversity effect within the arrival time difference range of 0.3 symbol lengths to 0.7 symbol lengths, resulting in a satisfactory bit error rate of 1E-5 or less. In other words, when an active improvement effect is obtained by the path diversity, the delay resolution is about 0.3 symbol lengths and the maximum delay is about 0.7 symbol lengths.

Patent Document 2 describes a method for providing transmission diversity by intentionally inserting a predetermined delay to a transmission signal (FIG. 52). A delay amount inserted by the delay unit 901 is set at a middle of a bottom (desirable error rate segment) of an error rate characteristic curve, for example, as shown by $\tau_s$ in FIG. 58, assuming a path difference of propagation paths (including a feeder) and an addition of delay distribution in each path. However, in the case of this conventional transmission diversity, in view of resistance (delay resistance) to delay distribution occurring in a propagation path, a relatively large delay $\tau_s$ needs to be previously inserted on the transmitter's side with respect to the original ability of the scheme indicated by the "desirable error rate segment", so that delay amount resistance is disadvantageously significantly reduced.

Under the above-described constraints on the delay amount resistance, FIG. 60 is a diagram showing a bit error rate characteristic when received waves in the QPSK-VP scheme include two waves (two reception timings) and three waves (three reception timings), and FIG. 61 shows a time relationship between the two waves and three waves of FIG. 60. Note that each received wave is a Rice fading wave, and three waves are a transmission path model in which a third wave is inserted at an intermediate time position of the two waves. It can be seen from FIG. 60 that, as compared to when the received wave is two waves, a bit error rate when the third wave is inserted between the two waves is deteriorated. In the case of the three waves, the third wave is not separated with respect to the two waves on both sides thereof, and imparts the same interference to the two waves or increases the correlation, so that it can be confirmed that it leads to a deterioration. In other words, transmission waves having up to two delays as shown in FIG. 52 provide a satisfactory result, but when a third transmission wave is added, the characteristics are conversely deteriorated.

Thus, when a delay resolution and a maximum delay that can separate delayed wave components are significantly close to each other, the maximum effective branch number contributed to the path diversity effect is limited to a small number. Therefore, if a path having a delay is unintentionally added, transmission characteristics are deteriorated.

Therefore, an object of the present invention is to provide a wireless transmission system and a wireless station and method for use in the same, in a multi-station simultaneous transmission system in which the maximum effective branch number contributing to the path diversity effect is increased, and even when the maximum effective branch number is limited to a small number, a plurality of wireless stations located in proximity to each other transmit the same data. In the wireless transmission system, even if the positional relationship of the wireless stations or the number of wireless stations that send data by multi-station simultaneous transmission changes, the path diversity effect can be obtained to the maximum extent and with reliability.

The present invention is directed to a wireless transmission system for path diversity capable of performing multi-station simultaneous transmission of data by wireless, comprising a plurality of wireless stations and a multipath transmission path formed between the plurality of wireless stations. To achieve the above-described object, in the present invention, the plurality of wireless stations include at least one wireless station that determines a plurality of combinations of a symbol waveform and a delay amount from a reference timing that are used for a transmission signal that is sent by multi-station simultaneous transmission, depending on a response packet with respect to a multi-station simultaneous transmission request packet for requesting multi-station simultaneous transmission that is transmitted by itself or another station, and a destination wireless station that receives a transmission signal that is sent by multi-station simultaneous transmission using the plurality of, combinations determined by the at least one wireless station.

Preferably, the at least one wireless station sets a difference between delay amounts to be a predetermined delay resolution or more, and sets a difference a maximum value and a minimum value of delay amounts to be a predetermined maximum delay or less, for two or more combinations having the same symbol waveform and different delay amounts. The predetermined delay resolution and the predetermined maximum delay are desirably set to respective values that allow the destination wireless station to perform path diversity reception of a plurality of delayed waves. The destination wireless station obtain a detected signal by delay (differential) detection.

The plurality of wireless stations may include a plurality of management stations having a function of managing at least one terminal station present within respective communication areas. Each of the management stations may include a transmission/reception section for transmitting and receiving, prior to communication, the multi-station simultaneous transmission request packet and the response packet as a negotiation packet for establishing a state in which communication can be performed. The at least one wireless station may be a source management station that transmits data to a management station that performs multi-station simultaneous transmission, and the source management station may include a symbol waveform/delay amount determining section for recognizing, based on the negotiation packet, a management station capable of performing multi-station simultaneous transmission and determining the combinations used when multi-station simultaneous transmission of a transmission signal is performed by the recognized management station. Alternatively, at least one wireless station may be a management station that is caused, based on the negotiation packet, to be capable of performing multi-station simultaneous transmission, and the management station includes a symbol waveform/delay amount determining section for determining the combinations used when multi-station simultaneous transmission of a transmission signal is performed by itself.

The wireless transmission system may be a system for causing other wireless stations to relay a transmission signal from a source wireless station, thereby transmitting the transmission signal to the destination wireless station. In this case, each of the plurality of wireless stations may include a transmission section for transmitting the multi-station simultaneous transmission request packet to other wireless stations if there is a transmission signal to be sent by multi-station simultaneous transmission, and transmitting the response packet if the multi-station simultaneous transmission request packet is received, a reception section for receiving the response packet, and a symbol waveform/delay amount determining section for determining a relay station capable of performing multi-station simultaneous transmission based on the received response packet, and determining the combination used when the determined relay station sends a transmission signal by multi-station simultaneous transmission. When a wireless station is a source wireless station, the transmission section of the wireless station may include a function of receiving a notification indicating reception of the response packet from the destination wireless station from any of the relay stations. Alternatively, when a wireless station directly receives the response packet from the destination wireless station, the transmission section of the wireless station may include a function of notifying the relay station that relay transmission is canceled.

Also, each wireless station may further include a relay availability determining section for determining whether or not this wireless station can relay a transmission signal transmitted from the source wireless station, depending on the multi-station simultaneous transmission request packet from the source wireless station. The transmission section may add a result of determination of the relay capability determining section to the response packet and may transmit the resultant response packet, or when the relay availability determining section determines that this wireless station can perform relay transmission, may transmit a response packet.

Note that when receiving the response packets transmitted by the other wireless stations with respect to the multi-station simultaneous transmission request packet, then if the number of the response packets is larger than the maximum effective branch number, the transmission/reception section of each of the plurality of wireless stations may not transmit the response packet.

Preferably, the multi-station simultaneous transmission request packet is a channel information packet relating to a communication channel used by the plurality of wireless stations, a request-to-send packet RTS that is transmitted regardless of the availability of multi-station simultaneous transmission, or the whole or a part of the packet to be sent by multi-station simultaneous transmission. The response packet is a response packet CTS with respective to the request-to-send packet RTS.

Also, the at least one wireless station determines the plurality of combinations, depending on the number of wireless stations capable of performing multi-station simultaneous transmission, notifies a wireless station capable of performing multi-station simultaneous transmission of at least one of the plurality of combinations, or determines the plurality of combinations in order of when the response packet is received. In this case, preferably, the at least one wireless station determines the number of wireless stations capable of performing multi-station simultaneous transmission to be smaller than or equal to the maximum effective branch number. Alternatively, when the number of wireless station capable of performing multi-station simultaneous transmission is larger than the maximum effective branch number, the at least one wireless station determines the number of the plurality of combinations to be smaller than or equal to the maximum effective branch number.

Also, the source wireless station preferably retransmits the transmission signal based on a combination assigned to itself of the plurality of combinations. Here, the source wireless station preferably determines a combination to be assigned when the transmission signal is retransmitted to the source wireless station transmitting the transmission signal to the wireless stations capable of performing multi-station simultaneous transmission, of the plurality of combinations. The source wireless station preferably retransmits the transmission signal based on the assigned combination, where a combination of a wireless station capable of multi-station simultaneous transmission other than itself is a predetermined combination.

A wireless station for performing multi-station simultaneous transmission may include a storage section for storing a record table for recording the plurality of combinations determined by the at least one wireless station, and reference the record table and transmit a transmission signal to be sent by multi-station simultaneous transmission, depending on a combination assigned to itself. Only a combination or combinations assigned to the wireless station for performing multi-station simultaneous transmission may be recorded in the record table. Alternatively, combinations assigned to all wireless stations performing multi-station simultaneous transmission are recorded in the record table.

The at least one wireless station generates a transmission signal, where symbol waveforms of any two symbols separated by a predetermined number of symbols are the same regardless of the transmission signal, and a phase difference between the any two symbols is determined based on the transmission signal. The predetermined symbol number is one, and the at least one wireless station uses, as the phase difference, any angle obtained by dividing $2\pi$ by powers of two.

Also, the at least one wireless station preferably includes, in the candidates of the symbol waveforms having a predetermined number of types, at least a first symbol waveform having a phase transition in which a phase increases in a chronological direction and a second-order differential coefficient calculated from a chronological change of the phase is not always zero during one symbol period, and a second symbol waveform having a phase transition in which a phase decreases in the chronological direction and the second-order differential coefficient calculated from the chronological change of the phase is not always zero during the one symbol period; at least a first symbol waveform and a second symbol waveform, each having a phase transition in which an amount of a chronological change of a phase decreases before a predetermined point during one symbol period and increases after the predetermined point during the one symbol period; at least a first symbol waveform and a second symbol waveform, each having a phase transition in which an amount of a chronological change of a phase increases before a predetermined point during one symbol period and decreases after the predetermined point during the one symbol period; at least a first symbol waveform and a second symbol waveform, each having a phase transition in which an amount of a chronological change of a phase decreases during an entirety of one symbol period; at least a first symbol waveform having a phase transition in which a phase increases and then decreases in a chronological direction and a second-order differential coefficient calculated from a chronological change of the phase is not always zero during one symbol period, and a second symbol waveform having a phase transition in which a phase decreases and then increases in the chronological direction and the second-order differential coefficient calculated from the chronological change of the phase is not always zero during the one symbol period; at least a first symbol waveform having a phase transition in which a phase increases in a chronological direction and a second-order differential coefficient calculated from a chronological change of the phase is not always zero during one symbol period, and a second symbol waveform having a phase transition in which a phase decreases in the chronological direction and the second-order differential coefficient calculated from the chronological change of the phase is not always zero during the one symbol period; or when a predetermined point is set at a center of one symbol period, at least a first symbol waveform and a second symbol waveform having phase transitions in which phases before the center of the one symbol period and phases after the center of the one symbol period are changed in a symmetrical manner.

As described above, according to the present invention, in a multi-station simultaneous transmission system in which a plurality of wireless station arranged in proximity to each other transmit the same data, a wireless transmission system, and a wireless station and a method for use in the same are provided that can provide the path diversity effect to the maximum extent and with reliability even if a positional relationship of wireless stations or the number of wireless stations that send data by multi-station simultaneous transmission changes.

BRIEF DESCRIPTION OF THE DRAWINGS

FIG. 2 is a diagram showing an exemplary structure of a packet transmitted in the first to fourth embodiments.

FIG. 4A is a diagram showing a structure of a packet transmitted by a terminal station 10-1 of FIG. 3A.

FIG. 4B is a diagram showing a structure of a packet transmitted by a management station 1 of FIG. 3A.

FIG. 4C is a diagram showing a structure of a packet transmitted by management stations 2 and 3 of FIG. 3A.

FIG. 11 is a schematic diagram showing phases of arriving signals A and B at a receiving station for each symbol.

FIG. 12 is a phase transition diagram schematically showing a phase relationship between an arriving signal A and an arriving signal B and a phase relationship between symbols.

FIG. 15 is a schematic diagram showing a phase relationship between arriving signals A and B received by a receiving station when the delay distribution of a propagation path is negligible.

FIG. 16 is a diagram showing a detection output after the arriving signals A and B of FIG. 15 have passed through low-pass filters 1810 and 1811.

FIG. 17 is a conceptual diagram showing a two-wave arrival model using two transmission antennas.

FIG. 18A is a schematic diagram showing changes in phase between a direct wave and a delayed wave of a transmission signal A for each symbol.

FIG. 18B is a schematic diagram showing changes in phase between a direct wave and a delayed wave of a transmission signal B for each symbol.

FIG. 21A is a schematic diagram representing phase transitions of a direct wave and a delayed wave of the transmission signal A using vectors.

FIG. 31A is a diagram showing an exemplary negotiation procedure performed by the management station of the first embodiment.

FIG. 31B is a diagram showing an exemplary negotiation procedure performed by the management station of the first embodiment.

FIG. 36A is a diagram showing a multi-hop transmission method according to a second embodiment.

FIG. 36B is a diagram showing the multi-hop transmission method of the second embodiment.

FIG. 41 is a diagram showing an exemplary structure of a record table held by the management station of the third embodiment.

FIG. 42 is a diagram showing an exemplary structure of a record table held by the management station of the third embodiment.

FIG. 45A is a diagram showing an exemplary structure of a record table held by the management station of the fourth embodiment.

FIG. 45B is a diagram showing an exemplary structure of a record table held by the management station of the fourth embodiment.

FIG. 54 is a diagram schematically showing a transmission timing of a packet transmitted by each wireless station of FIG. 53.

FIG. 55A is a diagram for describing a problem arising when multi-station simultaneous transmission is performed using a conventional multi-hop system.

FIG. 55B is a diagram for describing the problem arising when multi-station simultaneous transmission is performed using the conventional multi-hop system.

Figure 1A:
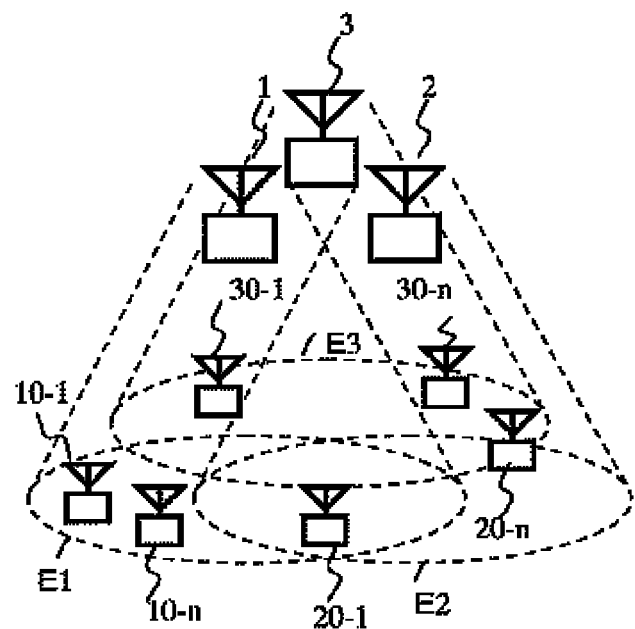
FIG. 1A is a diagram showing an exemplary configuration of a wireless transmission system according to first to fourth embodiments.

| DESCRIPTION OF THE REFERENCE CHARACTERS | |
|---|---|
| 1 to 5, 9 | management station |
| 10-1, 10-n, 20-1, 20-n, 30-1, 30-n | terminal station |
| 17-1 to 17-6 | wireless station |
| 21 | modulating section |
| 22 | read controlling section |
| 23 | waveform storing section |
| 24, 1808, 1809 | D/A converter |
| 31 | antenna |
| 32 | RF section |
| 33 | demodulating section |
| 34 | packet determining section |
| 35 | own-packet processing section |
| 36 | symbol waveform/delay amount determining section |
| 37 | record table |
| 38 | transmission timing controlling section |
| 40 | transmission packet processing section |
| 42 | table storing section |
| 700 | transmission signal generating circuit |
| 701 | differential encoding circuit |
| 702 | waveform generating circuit |
| 703, 1801 | oscillator |
| 704 | quadrature modulator |
| 901, 1601 | delay unit |
| 902, 903 | level adjuster |
| 904, 905 | antenna |
| 1602, 1603 | multiplier |
| 1604, 1605 | phase shifter |
| 1606, 1607, 1810, 1811 | low-pass filter |
| 1802 | L divider |
| 1803, 1804 | counter |
| 1805, 1806 | shift register |

DETAILED DESCRIPTION OF THE INVENTION

First Embodiment

Figure 1B:
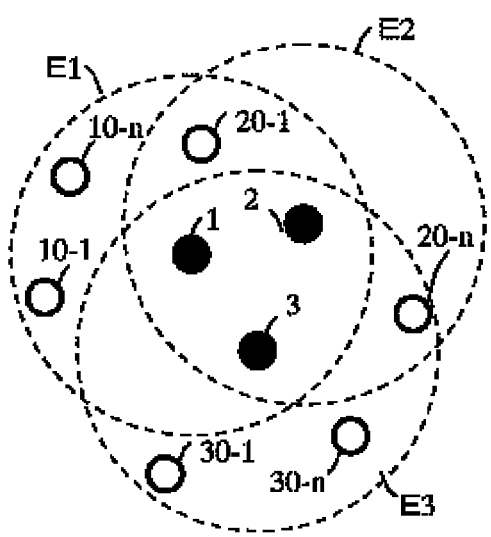
FIG. 1B is a diagram showing an exemplary configuration of the wireless transmission system of the first to fourth embodiments.

FIG. 1A is a diagram showing an exemplary configuration of a wireless transmission system according to a first embodiment of the present invention. In FIG. 1A, the wireless transmission system comprises management, stations (wireless stations) 1 to 3, and terminal stations (wireless stations) 10-1 to 10-$n$, 20-1 to 20-$n$, and 30-1 to 30-$n$. FIG. 1B is a diagram showing a positional relationship between the management stations and the terminal stations of FIG. 1A.

The management stations 1 to 3, which form communication areas E1 to E3, respectively, are connected via wireless to terminal stations that are present in the respective communication areas. The management stations 1 to 3 also assign channels to terminal stations that are present in the respective communication areas. Note that the communication areas E1 to E3 indicate communication areas when the management stations 1 to 3 singly transmit packets (single-station transmission). The terminal stations 10-1 to 10-$n$ are present in the communication area E1. The terminal stations 20-1 to 20-$n$ are present in the communication area E2.

The terminal station 30-1 to 30-$n$ are present in the communication area E3. Note that when it is not necessary to distinguish the terminal stations 10-1 to 10-$n$, 20-1 to 20-$n$, and 30-1 to 30-$n$ from each other, they are collectively referred to as a terminal station 11. Also, when it is not necessary to distinguish the terminal station from the management station, they are collectively referred to as a wireless station.

The management stations 1 to 3 perform inter-system negotiation (hereinafter referred to as negotiation) to avoid channel interference between communication areas during a negotiation zone (hereinafter referred to as a nego-zone). The nego-zone is a zone that is regularly provided on a common channel. Specifically, the management stations 1 to 3 use a common channel that is shared by the management stations 1 to 3 to transmit or receive a negotiation packet (hereinafter referred to as a channel information packet) for establishing a state in which communication can be performed, prior to communication. The channel information packet includes channel information that is used in the communication area of a station, information about an ID of the station, information about IDs of terminal stations managed by the station, beacon information for synchronizing systems, and the like. Note that the channel information packet does not need to include all the pieces of information described above and may include only one of the pieces of information. The common channel is a channel for controlling a system, and is similar to a common channel for control of a system that is used in a general wireless transmission system. Also, the common channel may be used for general data transmission. A management station, when receiving the channel information packet, generates a response packet for notifying other stations that the channel information packet has been normally received, and transmits the response packet to a management station that is a source of the channel information packet. Note that the response packet is a packet that is transmitted or received during a nego-zone, and therefore, is a negotiation packet.

Although it is assumed in this embodiment that management stations communicate with each other using a frequency channel of an FDMA system, a time slot of a TDMA system may be used.

It is also assumed in this embodiment that a management station is a central control station that is always involved in communication between terminal station managed by itself. Note that the function of a management station is not limited to this. For example, a management station may perform only negotiation with other systems and relay data to other systems, while terminals that are present under the same management station may communicate with each other without via the management station. Also, a management station does not need to be initially determined. For example, of wireless stations included in a single wireless transmission system, a wireless station that has a function of becoming a management station may declare that it will become a management station. Note that when a plurality of wireless stations that have the function of becoming a management station exist in a single wireless transmission system, a wireless station that is the first to declare that it will become a management station may become a management station, for example.

The management stations 1 to 3 each determine that a packet can be sent by multi-station simultaneous transmission if a management station that constructs a system is newly generated within a communication area formed by itself, so that the number of management stations that can relay and transmit a packet is two or more. If multi-station simultaneous transmission can be performed when other management stations relay and transmit packets, the management stations 1 to 3 select and determine a combination of a symbol waveform that is used when a modulated signal described below is generated and a delay amount of a packet transmission timing from a reference timing, from a plurality of candidate combinations. Thereafter, the management stations 1 to 3 notify other management stations that can perform multi-station simultaneous transmission of the determined combination. In this case, for a plurality of combinations determined by the management stations 1 to 3, a difference in delay amount between combinations having the same symbol waveform is set to be larger than or equal to a predetermined delay resolution, and a difference between a maximum value and a minimum value in a plurality of delay amounts is set to be smaller than or equal to a predetermined maximum delay. The predetermined delay resolution and the predetermined maximum delay are each set to be a value at which the path diversity effect is obtained on the receiver's side, i.e., a value at which a wireless station on the receiver's side can perform path diversity reception with respect to a plurality of delayed waves. Hereinafter, a packet that is generated and transmitted by the management stations 1 to 3 so as to notify other management stations that send packets by multi-station simultaneous transmission, of the determined combination, is referred to as a notification packet.

Also, in the management stations 1 to 3, when a packet received from other management stations or terminal stations is a broadcast packet that needs to be relayed and transmitted, a timing that is delayed by a delay amount notified of from other stations, from a timing that is a reference for transmission of a broadcast packet (hereinafter referred to as a reference timing), is set to be a transmission start timing. The management stations 1 to 3 relay and transmit a broadcast packet at the transmission start timing. Thereby, when relay and transmission is performed by multi-station simultaneous transmission, multipath having an appropriate arrival time difference for each symbol waveform at any reception point can be generated, so that the path diversity effect can be obtained to the maximum extent and with reliability in a wireless station that receives a broadcast packet (hereinafter referred to as a receiving station).

FIG. 2 is a diagram showing an exemplary configuration of a packet that is transmitted and received by the wireless transmission system. The packet of FIG. 2 includes a preamble (PR), a unique word (UW), a packet identifier, a destination station address, a source address, a source management station address, information data, and a CRC.

The preamble is used for gain control, clock reproduction, frequency control, and the like. The unique word is used for determination of a frame type and frame synchronization. The source address is an address of a wireless station that is a source for the packet. The destination station address is an address of a wireless station that is the destination of the packet. The source management station address is an address of a management station that transmits a packet for causing other management stations to perform multi-station simultaneous transmission. In this embodiment, the source management station address is assumed to be an ID of the source management station. Hereinafter, an ID of a management station that receives a packet earliest of management stations that can perform multi-station simultaneous transmission is referred to as a source management station ID. The information data is a main portion of data to be transmitted. The packet identifier is used for identification of a packet. The CRC, which is a CRC (Cyclic Redundancy Check) code, is used for error detection.

Figure 3A:
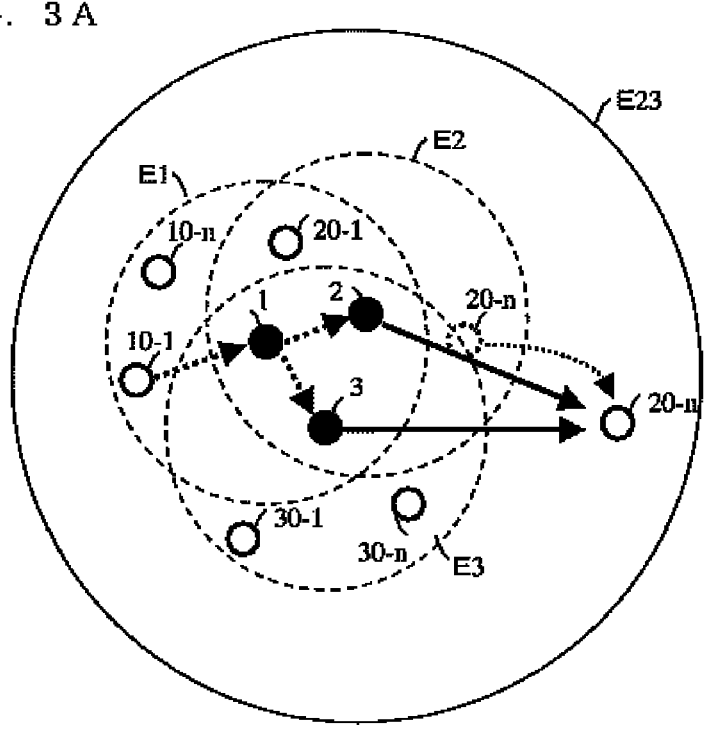
FIG. 3A is a diagram showing a multi-hop transmission method according to the first embodiment.
Figure 3B:
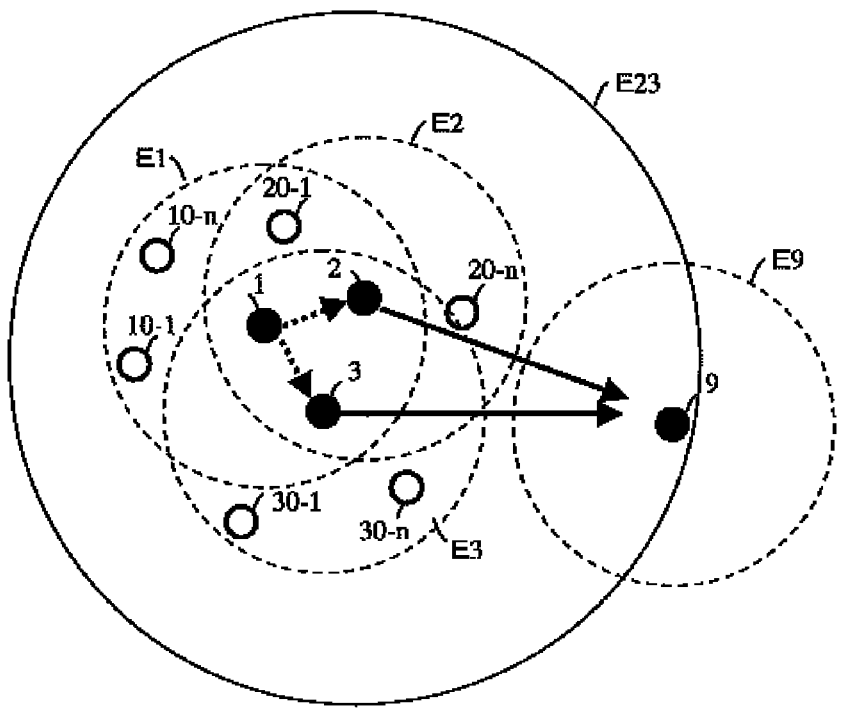
FIG. 3B is a diagram showing the multi-hop transmission method of the first embodiment.

FIGS. 3A and 3B are diagrams showing exemplary multi-hop transmission in this embodiment. In FIGS. 3A and 3B, the management stations 1 to 3 are located in proximity to each other so that a propagation time is negligible as compared to an arrival time difference (τ) that allows the path diversity effect. Also, one of the management stations 1 to 3 is located within the communication areas of the others. FIGS. 4A to 4C are diagrams showing structures of packets that are transmitted and received in FIG. 3A.

FIG. 3A is a diagram showing a flow of a packet when the terminal station 10-1 that is a source of the packet transmits a broadcast packet that is addressed to the terminal station 20-n. The terminal station 10-1 generates and transmits the packet of FIG. 4A. It is here assumed that the packet identifier indicates a non-relay packet when it is "0", a broadcast packet when it is "1", a channel information packet when it is "2", a response packet when it is "3", and a notification packet when it is "4". In this case, in the identifier of the packet generated by the terminal station 10-1, "1" indicating that the packet is a broadcast packet is recorded. Also, an address of the terminal station 20-n that is the destination of the packet is recorded in the destination station address, and an address of the terminal station 10-1 is recorded in the source address. Also, when the terminal station 10-1 transmits the packet, the packet has not yet been relayed or transmitted by the management station; and therefore, "0" is recorded in the source management station address.

The management station 1, when receiving the packet transmitted from the terminal station 10-1, generates and transmits a broadcast packet of FIG. 4B. FIG. 4B is a diagram showing a structure of the packet transmitted by the management station 1. The management station 1 rewrites the source management station ID of the packet transmitted from the terminal station 10-1 with its own ID. The management stations 2 and 3, when receiving the broadcast packet transmitted from the management station 1, relays and transmits the broadcast packet. FIG. 4C is a diagram showing a structure of the packet transmitted by the management stations 2 and 3 in this case. Thus, the multi-station simultaneous transmission of the broadcast packet transmitted from one management station (here, the management station 1) is performed by a plurality of management stations (here, the management stations 2 and 3). The broadcast packet with respect to which the management stations 2 and 3 have performed multi-station simultaneous transmission is received by the terminal station 20-n which is a destination station.

Note that, since the packet is transmitted to the destination station by the terminal station 10-1, depending on the system, it may not be determined whether or not relaying is required. In such a case, the terminal station 10-1 may transmit a packet in which "0" is set to the packet identifier. In this case, the management station 1 may determine whether or not relaying is required, based on a destination station address included in a packet received from the terminal station 10-1, and when relaying is required, may rewrite the packet identifier with "1" and relay and transmit the resultant packet. For example, if it can be determined from the destination address that the destination of the packet is a wireless station within the area E1, the management station 1 may relay the packet in which the packet identifier remains "0". In this case, the management stations 2 and 3 do not relay a packet whose packet identifier is "0" even when receiving it, so that unnecessary multi-stage relaying can be avoided.

Also, in the management station 1, if it cannot be determined whether or not multi-stage relaying is required so as to transmit a packet to a destination station, the management station 1 may transmit a broadcast packet whose packet identifier is "1". Thereafter, when normally receiving the broadcast packet, the destination station may transmit a response packet notifying the reception. Also, the management station 1, when directly receiving the response packet or receiving a notification indicating the reception of the response packet from the management station 2 or 3, may notify the management station 2 or 3 that packet relaying should be stopped.

In the wireless transmission system of this embodiment, a notification packet is transmitted in the nego-zone described above. Thus, when the management stations 2 and 3 perform multi-station simultaneous transmission of a broadcast packet, multipath having the appropriate arrival time difference occur at any reception point for each symbol waveform. Therefore, transmission quality can be improved in the same communication area by the path diversity effect as compared to single station transmission, i.e.; a communication area where the same transmission characteristics are obtained can be expanded. A communication area when the management stations 2 and 3 perform multi-station simultaneous transmission, corresponds to the communication area E23 of FIG. 3A. Thus, as compared to the communication areas E1 to E3 during single station transmission, the communication area can be expanded by performing multi-station simultaneous transmission. Therefore, as shown in FIG. 3A, even when the destination terminal station 20-n has moved out of the single station communication area E2 of the management station 2, the terminal station 20-n can normally receive packets.

Note that, in the wireless transmission system, of this embodiment, as shown in FIG. 3B, multi-station simultaneous transmission of a broadcast packet (for example, a packet including information on a channel which is used or is going to be used in the communication area E1, or the like) transmitted by the management station 1 itself as a source may be performed by the management stations 2 and 3. Also, for example, the management stations 1 to 3 may perform multi-station simultaneous transmission of information shared by the management stations 1 to 3 in predetermined cycles. Examples of the shared information include information about a channel used in each communication area, the ID of a terminal station located in each communication area, beacon information for synchronizing systems, and the like.

FIG. 3B is similar to FIG. 3A. Specifically, multi-station simultaneous transmission of a packet transmitted by the management station 1 is performed by the management stations 2 and 3, and is received by a management station 9 with an appropriate arrival time difference. Therefore, if the management station 9 that will construct another wireless system outside the single station communication area is generated, then when the management station 9 that manages the other wireless system is located within the communication area E23 as shown in FIG. 3B, the management station 9 can normally receive the channel information of the management station 1, or the like.

Figure 5:
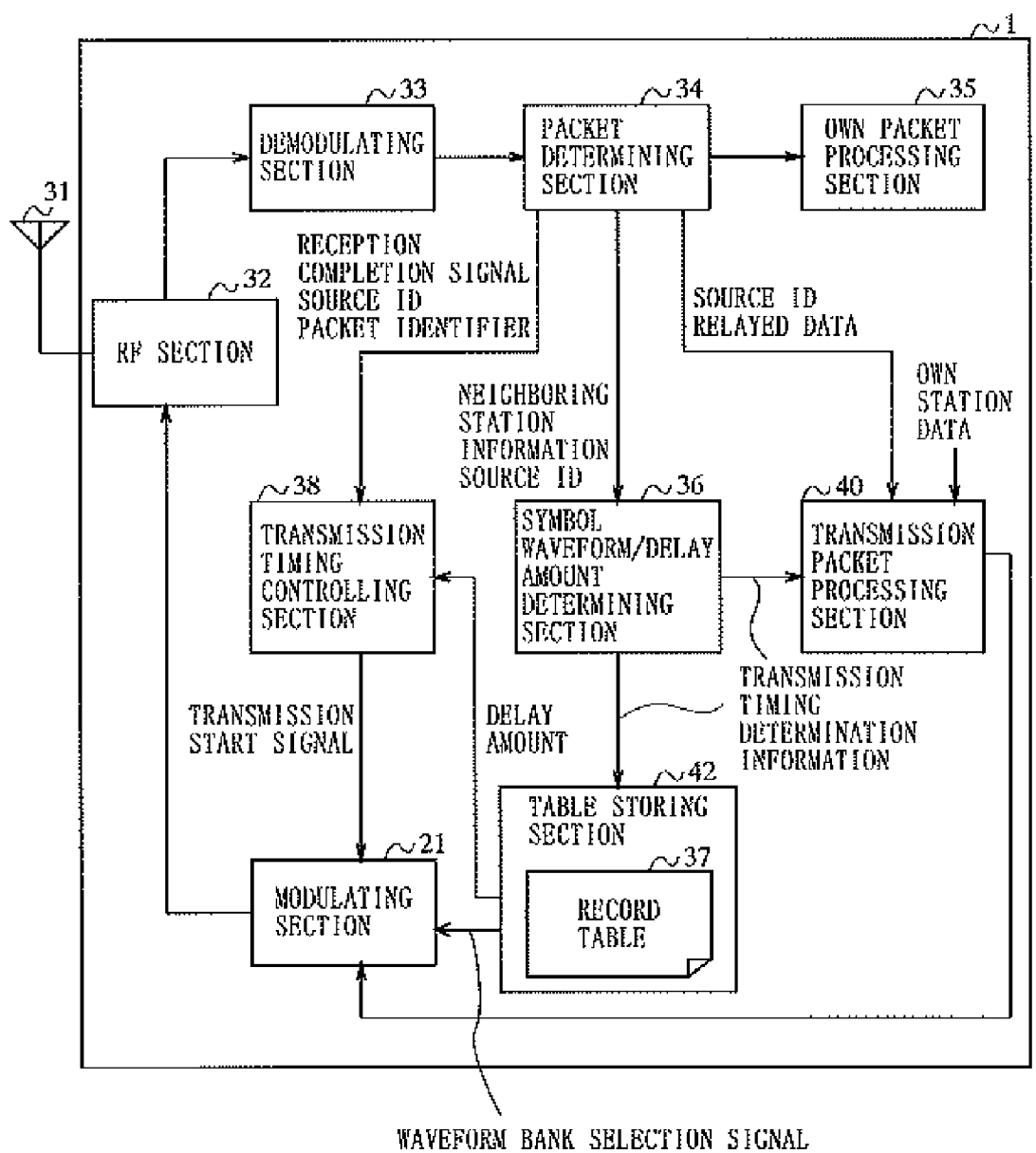
FIG. 5 is a block diagram showing an exemplary configuration of the management station 1.

FIG. 5 is a block diagram showing an exemplary functional configuration of the management station 1. As shown in FIG. 5, the management station 1 comprises an antenna 31, an RF section 32, a demodulating section 33, a packet determining section 34, a own-packet processing section 35, a symbol waveform/delay amount determining section 36, a transmission timing controlling section 38, a transmission packet processing section 40, a modulating section 21, and a table storing section 42. Note that the management stations 2 and 3 also have a configuration similar to that of the management station 1. The table storing section 42 stores a record table 37.

The packet determining section 34 determines whether or not a packet has been normally received using an error detection code; such as a CRC code included in data demodulated by the demodulating section 33. If the packet has been normally received, the packet determining section 34 analyzes a packet identifier, a destination station address, a source address, and a source management station ID included in the packet.

If the received packet is a channel information packet, the packet determining section 34 notifies the transmission packet processing section 40 of a source address included in the demodulated data as an address of a management station as a response destination, and instructs the transmission packet processing section 40 to generate a response packet. The packet determining section 34 also notifies the timing control section 38 so to determine a transmission start timing of the response packet.

If the received packet is a response packet, the packet determining section 34 passes a source address (management station ID) included in the response packet to the symbol waveform/delay amount determining section 36 as neighboring station information. If the received packet is a notification packet, the packet determining section 34 passes the notification packet to the symbol waveform/delay amount determining section 36. If the received packet is a broadcast packet, the packet determining section 34 generates a reception completion signal indicating that reception of the broadcast packet is completed, and passes the reception completion signal to the transmission timing controlling section 38 along with the source management station ID and the packet identifier. Also, in this case, the packet determining section 34 passes data (UW and thereafter) in the broadcast packet as relay data to the transmission packet processing section 40, and instructs the transmission packet processing section 40 to generate a broadcast packet for performing relay transmission. If the received packet is a packet addressed to the management station 1, the packet determining section 34 passes demodulated data to the own-packet processing section 35.

The own-packet processing section 35 processes the packet addressed to the manage station 1 that has been received from the packet determining section 34.

The symbol waveform/delay amount determining section 36 recognizes the IDs and the number of management stations capable of performing relay transmission of a broadcast packet that has been transmitted by the management station 1, based on neighboring station information notified by an end time of a response zone described below. If the number of management stations capable of performing relay transmission is plural, i.e., there are management stations which can perform multi-station simultaneous transmission, the symbol waveform/delay amount determining section 36 determines a symbol waveform and a delay amount to be assigned to each management station, depending on the number of management stations capable of performing multi-station simultaneous transmission. The symbol waveform/delay amount determining section 36 records the determined symbol waveform and delay amount into the record table 37, and passes the determined symbol waveform and delay amount along with a destination address to the transmission packet processing section 40. Also, when receiving a notification packet, the symbol waveform/delay amount determining section 36 extracts and records symbol waveforms and delay amounts assigned to the management station 1 and other stations into the record table 37.

The transmission timing controlling section 38 controls the timing of transmitting a broadcast packet, based on the reference timing, and a delay amount recorded in the record table 37. Specifically, the transmission timing controlling section 38 defines a timing after a predetermined time has elapsed since reception of the reception completion signal from the packet determining section 34, as the reference timing, and also defines a timing delayed from the reference timing by the delay amount, as a transmission start timing of relay transmission of a broadcast packet. When the transmission start timing arrives, the transmission timing controlling section 38 generates a transmission start signal for providing an instruction to start transmission and passes the transmission start signal to the modulating section 21. Also, the transmission timing controlling section 38, when notified of transmission of a response packet by the packet determining section 34, generates a transmission start signal in a predetermined response zone at a random timing and passes the transmission start signal to the modulating section 21.

The transmission packet processing section 40 receives, in the nego-zones provided regularly, the management station 1's data including a terminal station ID that is managed by the management station 1, channel information used in the management station 1's area and the like from a control section (not shown), and generates and holds a channel information packet in which a predetermined header (a preamble and a unique word) and a predetermined footer (a CRC code or the like) are added to the management station 1's data. Also, the transmission packet processing section 40, when receiving a delay amount and a destination address from the symbol waveform/delay amount determining section 36, generates and holds a notification packet in which the predetermined header and the predetermined footer are added to a destination address and a delay amount. Also, the transmission packet processing section 40, when receiving relay data from the packet determining section 34, adds the predetermined header to the relay data to generate and hold a broadcast packet. Also, the transmission packet processing section 40, when receiving an instruction to generate a response packet from the packet determining section 34, generates and holds a response packet.

Figure 6:
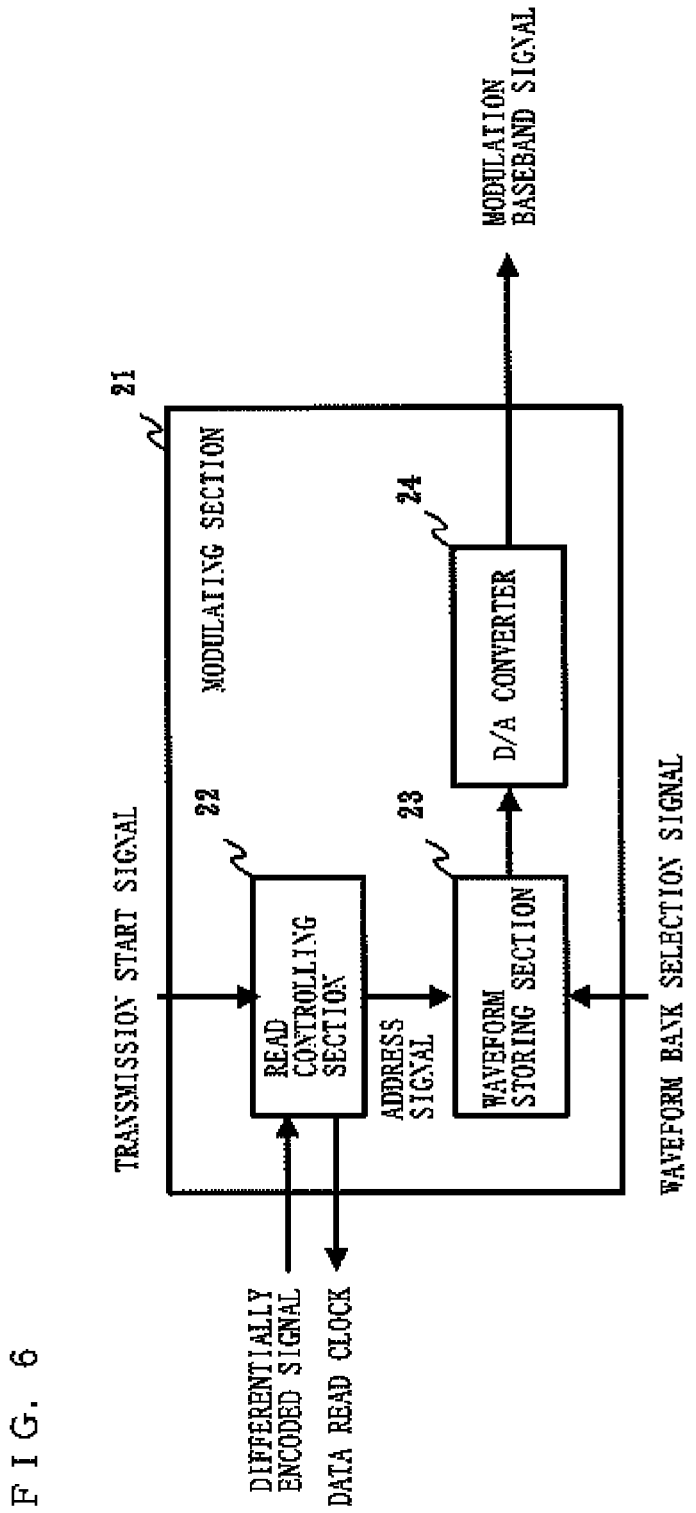
FIG. 6 is a block diagram showing a configuration of a modulating section 21.
Figure 8:
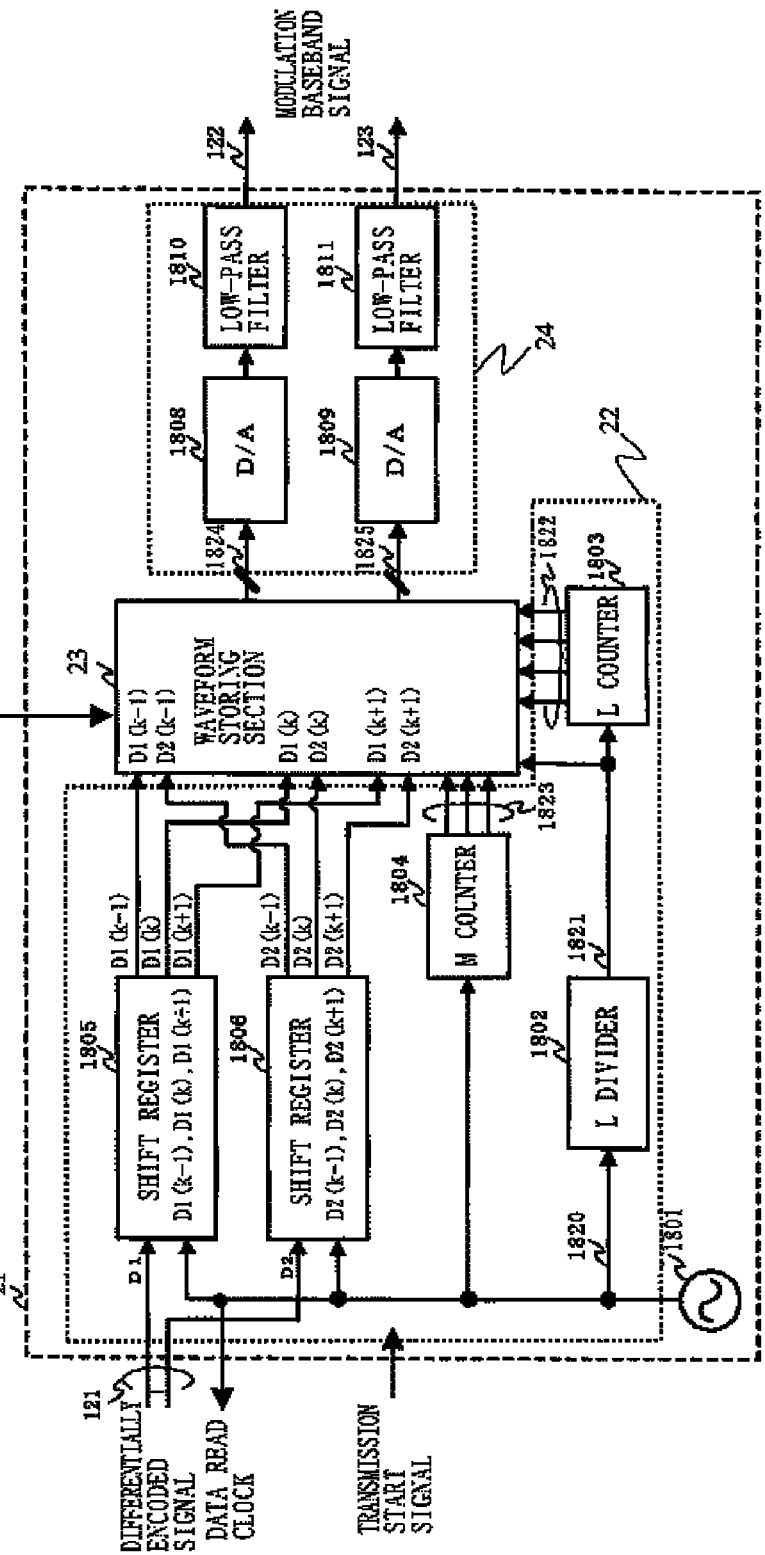
FIG. 8 is a diagram showing an exemplary internal configuration of each block of the modulating section 21.

The modulating section 21 generates and outputs a modulated baseband signal modulated with transmit data in a packet generated by the transmission packet processing section 40. FIG. 6 is a block diagram illustrating a configuration of the modulating section 21. In FIG. 6, the modulating section 21 comprises a read controlling section 22, a waveform storing section 23, and a D/A conversion section 24. Further, FIG. 8 shows an exemplary internal configuration of each block of the modulating section 21.

The read controlling section 22 includes a counter that is operated by a base clock. The read controlling section 22, when receiving a transmission start signal, generate a data read clock for reading transmission data, and an address signal which indicates an address for reading data of a modulated waveform, based on a counter value. The read controlling section 22 passes the generated data read clock to the transmission packet processing section 40, and passes the address signal to the waveform storing section 23. The transmission packet processing section 40 reads out and passes transmission data to the read controlling section 22 of the modulating section 21 in synchronization with the received data read clock. The waveform storing section 23 reads out and outputs data of a modulated waveform corresponding to transmission data from an internal waveform memory in accordance with the received address signal. The D/A conversion section 24 converts the modulated waveform data input from the waveform storing section 23 into an, and outputs the analog signal as a modulated baseband signal.

The modulating section 21, when receiving the transmission start signal, generates an address signal for reading out a modulated waveform from the waveform memory. Thereby, the timing at which the modulated baseband signal is output is changed in units of a base clock, depending on the timing at which the transmission start signal is received. Also, typically, the base clock often has a frequency that is several times to several dozen times higher than a symbol frequency (the reciprocal of the symbol length). Therefore, the timing of outputting the modulated baseband signal can be adjusted in units of one-severalth to one-several-tenths of the symbol length.

Figure 7:
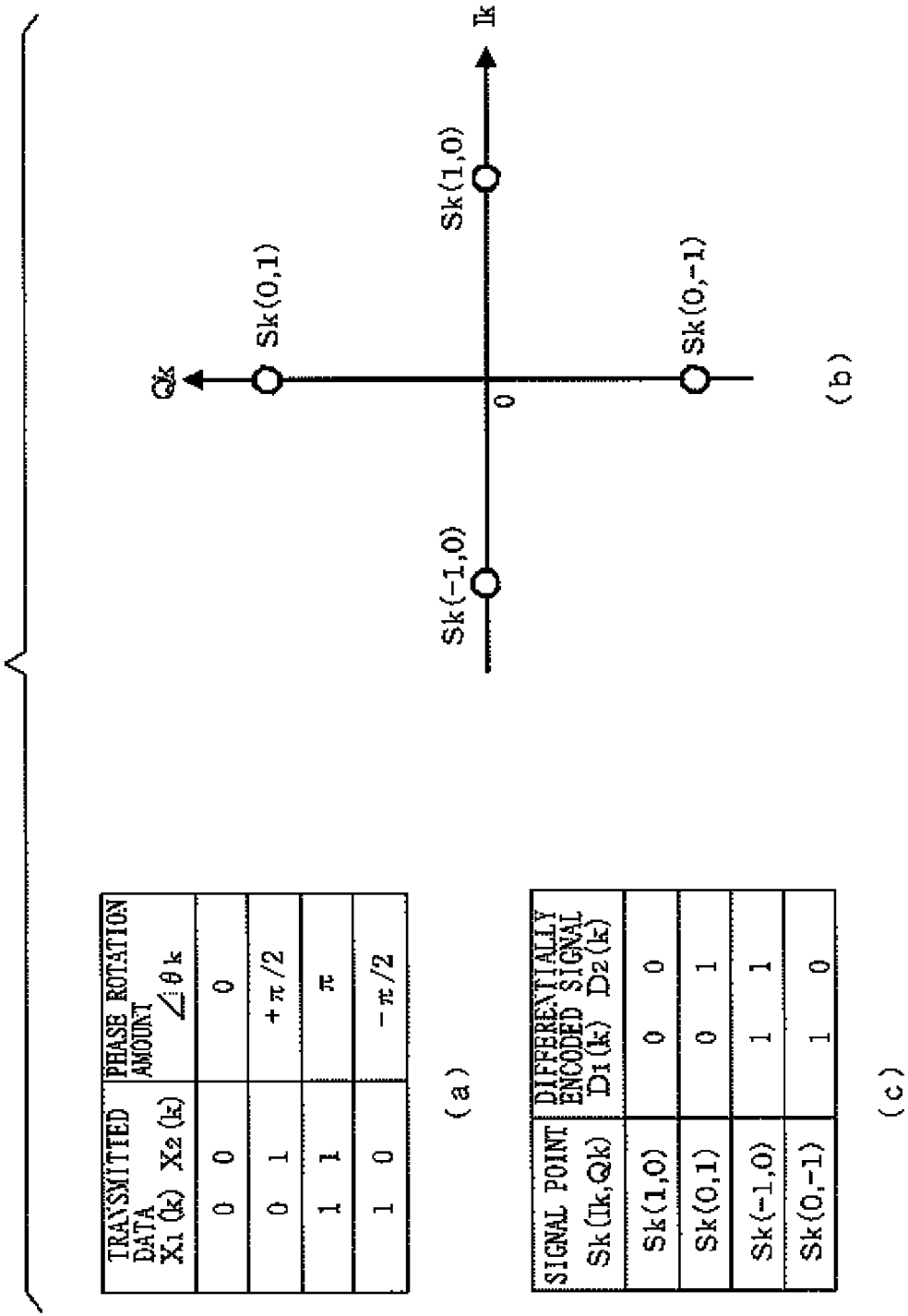
FIG. 7 is a block diagram showing an exemplary differential encoding rule and a signal space diagram of the wireless transmission system of the present invention.

The transmission signal for use in the wireless transmission system of the present invention, a method for generating the transmission signal, and a specific exemplary structure of the transmission signal will be described in greater detail with reference to FIGS. 7 and 8. FIG. 7 is a diagram showing an exemplary differential encoding rule and a signal space diagram of the wireless transmission system of the present invention. FIG. 8 is a diagram showing an exemplary internal configuration of each block of the modulating section 21 of FIG. 6. The modulating section 21, which stores a predetermined symbol waveform, outputs baseband modulated signals 122 and 123, depending on a differentially encoded signal 121.

Input transmission data (input bit sequence) is converted into a symbol format by serial-to-parallel conversion, and is subjected to differential encoding, thereby obtaining an in-phase axis signal I and a quadrature axis signal Q (differentially encoded signal 121) for each symbol. In general, differential encoding can be performed using phases the number of which is a power of two. Further, each adjacent symbol may be shifted by a predetermined amount in a clockwise or anticlockwise manner (so-called symmetric arrangement). Alternatively, differential amplitude phase modulation (DAPSK) in which information is also provided in an amplitude direction, depending on transmission data, may be used. Hereinafter, the present invention will be described by giving an example in which four-phase (asymmetric arrangement) differential encoding is performed. In this case, specifically, an in-phase axis signal $I_k$ and a quadrature axis signal $Q_k$ of a k-th symbol (k is an integer of 0 or more) are obtained using an in-phase axis signal $I_{k-M}$ and a quadrature axis signal $Q_{k-M}$ of a (k−M)-th symbol that is M-th symbol before the k-th symbol (M is an integer of 1 or more) by:

$$\begin{cases} I_k = I_{k-M} \cdot \cos\Delta\theta_k - Q_{k-M} \cdot \sin\Delta\theta_k \\ Q_k = I_{k-M} \cdot \sin\Delta\theta_k - Q_{k-M} \cdot \cos\Delta\theta_k \end{cases} \quad (2)$$

where $\Delta\theta_k$ represents a phase rotation amount.

Initially, in accordance with FIG. 7(a), the phase rotation amount $\Delta\theta_k$ of a set of two successive bits in transmission data (symbol format), $X_1(k)$ and $X_2(k)$, is determined. Next, a signal diagram of a signal point $S_k(I_k, Q_k)$ of the k-th symbol is determined by Expression (2) if an initial value $S_0(I_0, Q_0)$ is determined. This is shown in FIG. 7(b). Thereafter, from signal points $S_k(1, 0)$, $S_k(0, 1)$, $S_k(−1, 0)$ and $S_k(0, −1)$ of FIG. 7(b), a differentially encoded signal $(D_1(k), D_2(k))$ is obtained in accordance with FIG. 7(c).

In FIG. 8, the modulating section 21 comprises a base clock oscillator 1801, the read controlling section 22 including an L divider 1802, an L counter 1803, an M counter 1804, and shift registers 1805 and 1806, the waveform storing section 23, and the D/A conversion section 24 including D/A converters 1808 and 1809 and low-pass filters 1810 and 1811.

Figure 9:
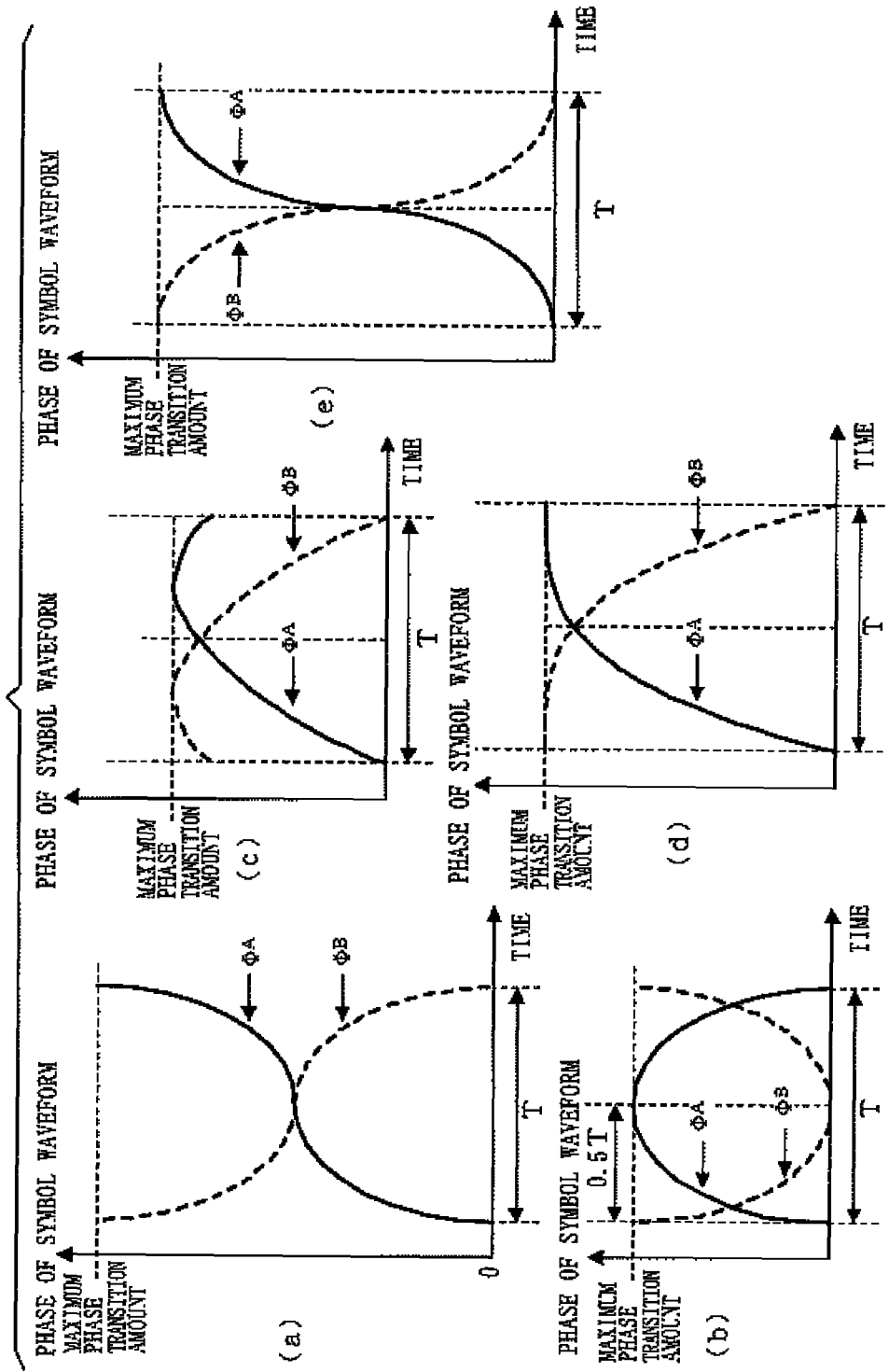
FIG. 9 is a schematic diagram showing exemplary phase transitions of symbol waveforms stored in the modulating section 21.

FIG. 9 shows various examples of a phase transition of a symbol waveform that are the basis of the baseband modulated signals 122 and 123 generated by the modulating section 21. Conditions for the symbol waveform are such that the second-order differential coefficient of the change is not always "zero" within a symbol. For example, if symbol waveforms used in the modulation/demodulating sections of different wireless stations have a combination of different changes such that a first symbol waveform has a phase transition indicated by a solid line and a second symbol waveform has a phase transition indicated by a dashed line in FIG. 9(a), a peculiar diversity effect described below appears. Note that FIGS. 9(a) to 9(e) are only examples of a phase transition. Any other phase transition may be used if the above-described conditions are satisfied. Also, the phase transition of the first symbol waveform and the phase transition of the second symbol do not necessarily need to be symmetric. In FIGS. 9(a) to 9(e), all combinations of solid lines and dashed lines, combinations of solid lines, or combinations of dashed lines may be used.

Also, a maximum of M types of symbol waveforms can be cyclically used for a transmission signal of one wireless station. The M types of symbol waveforms may repeatedly include the same symbol waveform. When M=1, a single type of symbol waveform is repeated. Note that, in order to the peculiar diversity effect described below, a symbol waveform used for a symbol corresponding to the same transmission data in different wireless stations need to be different from each other. When symbol waveforms of a plurality of wireless stations are distinguished from each other, the symbol waveforms may be described as W1, W2, . . . . When M=1, there is only one symbol waveform, which represents only itself. When M>1, then if M symbol waveform sequences are considered as W1, W2, . . . , a similar operational effect is obtained. Therefore, hereinafter, the term symbol waveforms W1, W2, . . . herein encompass symbol waveform sequences.

A phase transition $\Phi^A_m(t)$ of an m-th (1≤m≤M) symbol waveform of a baseband modulated signal generated by the modulating section 21 of a first wireless station, and a phase transition $\Phi^B_m(t)$ of an m-th symbol waveform of a baseband modulated signal generated by the modulating section 21 of a second wireless station different from the first wireless station, are represented by Expressions (3) and (4) below within a symbol having a symbol length T (0<t<T), when a waveform combination as shown in FIG. 9(a) is selected.

$$\Phi^A_m(t) = \begin{cases} (2\phi_{MAX}/T^2) \cdot t \cdot (T-t); & (0 < t \le T/2) \\ -(2\phi_{MAX}/T^2) \cdot t \cdot (T-t) + \phi_{MAX}; & (T/2 < t < T) \end{cases} \quad (3)$$

$$\Phi^B_m(t) = \begin{cases} -(2\phi_{MAX}/T^2) \cdot t \cdot (T-t) + \phi_{MAX}; & (0 < t \le T/2) \\ (2\phi_{MAX}/T^2) \cdot t \cdot (T-t); & (T/2 < t < T) \end{cases} \quad (4)$$

Here, a phase θ(t) that represents transmission data via differential encoding is represented using a step function U(t) by:

$$\theta(t) = \sum_{q=-\infty}^{\infty} \theta_q \cdot \{U(t-qT) - U(t-(q-1)T)\} \quad (5)$$

-continued

Note that $$U(t) \equiv \begin{cases} 1; & (t \geq 0) \\ 0; & (t < 0) \end{cases}$$

where $\theta_q$ represents the phase of a signal point in FIG. 7(b) for a q-th symbol (q is an integer).

Note that if it is assumed that the phase transition $\Phi^A_m(t)$ is defined only within $0<t<T$ and is zero in the other sections, a phase transition $\Psi^A(t)$ of the baseband modulated signal is represented by Expression (6) below.

$$\psi^A(t) = \sum_{p=-\infty}^{\infty} \sum_{m=1}^{M} \Phi^A_m(t - (pM + m - 1)T) + \theta(t) \quad (6)$$

Note that:

$$\Phi^A_m(t) \equiv 0; (t \leq 0, t \geq T)$$

Therefore, an in-phase modulated signal $Y^A_I(t)$ and a quadrature modulation signal $Y^A_Q(t)$ are represented by Expression (7) below from a phase transition $\Psi^A(t)$ of the baseband modulated signal.

$$\begin{cases} Y^A_I(t) = \cos\psi^A(t) \\ Y^A_Q(t) = \sin\psi^A(t) \end{cases} \quad (7)$$

Basically, a modulated signal having an RF band is obtained by performing quadrature modulation of a carrier with these signals. Note that the signal as it is has a broad band, and therefore, the band may be limited by a band limiting filter. In this case, the in-phase modulated signal $Y^A_I(t)$ and the quadrature modulation signal $Y^A_Q(t)$ after band limitation are represented by Expression (8) below, rather than Expression (7):

$$\begin{cases} Y^A_I(t) = \int_{-t_0}^{+t_0} \cos\psi^A(t-\tau) \cdot h(\tau)d\tau \\ Y^A_Q(t) = \int_{-t_0}^{+t_0} \sin\psi^A(t-\tau) \cdot h(\tau)d\tau \end{cases} \quad (8)$$

where h(t) represents an impulse response of the band limiting filter.

Also, similarly, in the modulating section 21 of the second wireless station, the phase transition $\Psi^B(t)$ of the baseband modulated signal is represented by Expression (9) below based on the phase transition $\Phi^B_m(t)$ of the symbol waveform of FIG. 9(a).

$$\psi^B(t) = \sum_{p=-\infty}^{\infty} \sum_{m=1}^{M} \Phi^B_m(t - (pM + m - 1)T) + \theta(t) \quad (9)$$

Note that:

$$\Phi^B_m(t) \equiv 0; (t \leq 0, t \geq T)$$

The in-phase modulated signal $Y^A_I(t)$ and the quadrature modulation signal $Y^A_Q(t)$ are represented by Expression (10) below.

$$\begin{cases} Y^B_I(t) = \int_{-t_0}^{+t_0} \cos\psi^B(t-\tau) \cdot h(\tau)d\tau \\ y^B_Q(t) = \int_{-t_0}^{+t_0} \sin\psi^B(t-\tau) \cdot h(\tau)d\tau \end{cases} \quad (10)$$

Note that the integration range $-t_0$ to $t_0$ of Expressions (8) and (10) is a range of spread of the impulse response h(t). Also, the band limiting filter may be of low-pass type, and can have various characteristics (cosine roll-off, root-Nyquist, Gauss, etc.) and parameters (cut-off, roll-off factor, etc.). Here, as an example, the impulse response h(t) of a cosine roll-off filter having a cut-off angular frequency of $\omega_0$ and a roll-off coefficient $\gamma$ is represented by Expression (11) below.

$$h(t) = \frac{(\omega_0/\pi) \cdot (\sin\omega_0 t / \omega_0 t)\cos\gamma\omega_0 t}{1 - (2\gamma\omega_0 t/\pi)^2} \quad (11)$$

The in-phase modulated signal $Y^A_I(t)$ and the quadrature modulation signal $Y^A_Q(t)$ are stored in the waveform storing section 23 in accordance with Expression (8). In the modulating section 21 of FIG. 8, as an example, the spread range $-t_0$ to $t_0$ of the impulse response h(t) of the band limiting filter is assumed to be from the previous symbol to the next symbol. In this case, the waveform storing section 23 calculates all transmission data patterns of the current symbol, the previous symbol and the next symbol, and stores respective modulated signal fragments. The input differentially encoded signal 121 is delayed by the shift register 1805 or 1806, and is input as a selection signal for the modulated signal fragments to the waveform storing section 23, where the differentially encoded signal 121 includes a k-th symbol, a (k−1)-th symbol (immediately previous to the k-th symbol) and a (k+1)-th symbol (immediately next to the k-th symbol).

The base clock oscillator 1801 oscillates a clock signal having a symbol frequency Fs, which is input as an operation clock to the shift register 1805 or 1806. The M counter 1804, which operates with the symbol frequency Fs, inputs M waveform selection signals 1823 to the waveform storing section 23. Thereby, the waveform storing section 23 can select a plurality of symbol waveforms, where M symbols are one cycle. The waveform storing section 23 is a memory that stores a waveform table of modulated signal fragments for each symbol, where L samples per symbol are stored for each modulated signal fragment. Using a clock having a frequency L·Fs output by the L divider 1802 as a read clock and a counter signal 1822 as a read address, signal points in a symbol are successively read out. Modulated signal on both the axes are converted into analog values by the D/A converters 1808 and 1809, respectively. Aliasing components are removed from the modulated signals by the low-pass filters 1810 and 1811, and the resultant modulated signals are output as the baseband modulated signals 122 and 123. The modulating sections 21 of other wireless stations have the same configuration and operation, though waveforms stored therein are different.

Note that, as shown in Expression (7), when band limitation is not performed, the shift registers 1805 and 1806 are not required, and the differentially encoded signal 121 is directly input to the waveform storing section 23. Also, when differential encoding with one-symbol delay is performed (M=1) or when only one type of symbol waveform is present, the M counter 1804 is not required.

Figure 10:
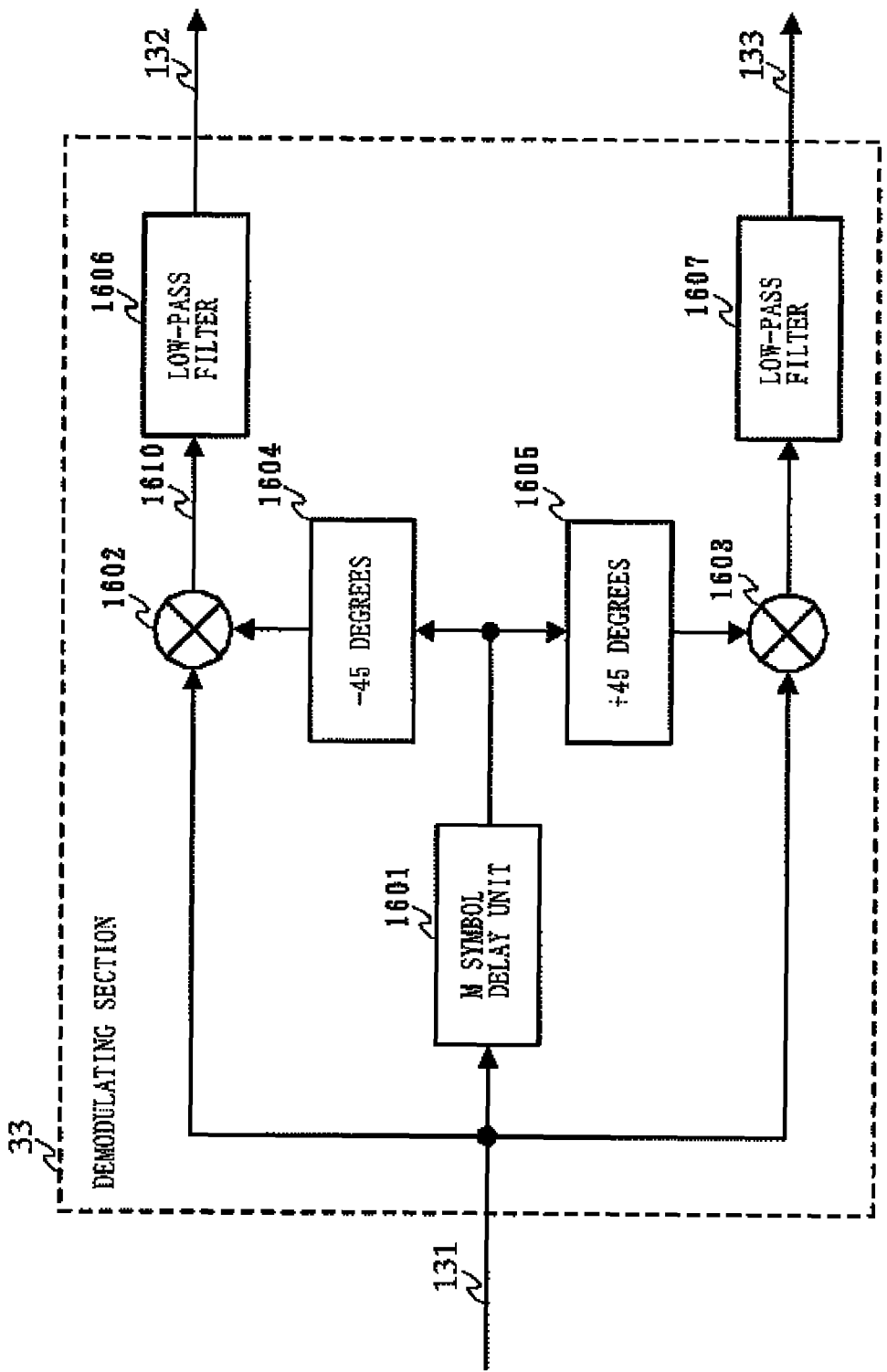
FIG. 10 is a diagram showing a detailed exemplary configuration of a demodulating section 33 of FIG. 5.

FIG. 10 is a block diagram showing a detailed exemplary configuration of the demodulating section 33 of FIG. 5. The demodulating section 33 comprises an M-symbol delay unit 1601, multipliers 1602 and 1603, a minus 45-degree phase shifter 1604, a plus 45-degree phase shifter 1605, and lowpass filters 1606 and 1607. The M-symbol delay unit 1601 delays a received signal by M symbol lengths. The low-pass filters 1606 and 1607 remove a frequency component two times higher than a carrier that is generated in the multipliers 1602 and 1603, and also plays a role in combining a plurality of detection outputs. Note that, in FIG. 10, the demodulating section 33 processes a received signal 131 that has been converted into a baseband by the RF section 32 previous thereto, or alternatively, may directly receive and process an RF-band received signal.

Next, a principle on which a transmission method performed by the thus-configured wireless transmission system of the first embodiment exhibits a peculiar diversity effect will be described. It is here assumed that, in FIG. 17, two management stations (hereinafter referred to as wireless stations A and B) each generate and transmit a transmission signal based on a first symbol waveform (or a M-length symbol waveform sequence) W1 and a second symbol waveform (or a M-length symbol waveform sequence) W2, and a receiving station receives these transmission signals.

Firstly, a case where the delay distribution of a propagation path is negligible will be described. Specifically, multipath (multiple-path propagation) occurs on propagation paths of signals transmitted from the wireless stations A and B, and a relative delay between multipath waves is negligible for a symbol length. This corresponds to, for example, a case where an arriving signal A from the wireless station A and an arriving signal B from the wireless station B have Rayleigh variations independent of each other, which is called flat fading in which a propagation path frequency characteristic within a transmission band is uniform. The phase difference α is a parameter that depends on a distance relationship between the wireless stations A and B and a receiving station as well.

FIG. 11 is a schematic diagram showing phases of the arriving signals A and B at a receiving station for each symbol. FIG. 11 shows phases of a (k−M)-th symbol, a (k−M+1)-th symbol, a k-th symbol, and a (k+1)-th symbol. Note that a phase of a signal point corresponding to transmission data is represented by $\theta_k$, a phase transition of an m-th symbol waveform of a transmission signal A (arriving signal A) of the wireless station A is represented by $\Phi^A_m(t)$, and a phase transition of an m-th symbol waveform of a transmission signal B (arriving signal B) of the wireless station B is represented by $\Phi^B_m(t)$.

The symbol waveform phase transition $\Phi^A_m(t)$ is added to the arriving signal A at the k-th symbol, where a constant phase $\theta_k$ in a symbol is a starting point. Similarly, the symbol waveform phase transition $\Phi^B_m(t)$ is added to the arriving signal B, where a combination phase of the phase $\theta_k$ at a signal point in the k-th symbol and a phase relationship α between the arriving signals is a starting point. The symbol waveform phase transition $\Phi^A_m(t)$ or $\Phi^B_m(t)$ that is the same as that of the k-th symbol is added to the (k−M)-th symbol that is an M-th symbol before the k-th symbol, where a phase $\theta_{k-M}$ of a signal point is a starting point. The demodulating section 33 performs delay (differential) detection in the k-th symbol and the (k−M)-th symbol.

FIG. 12 is a phase transition diagram schematically showing a phase relationship between the arriving signal A and the arriving signal B and a phase relationship between symbols. Note that this example shows a case where symbol waveforms of the transmission signal A (arriving signal A) and the transmission signal B (arriving signal B) perform a phase transition of FIG. 9(a).

In FIG. 12, a phase of the arriving signal A in the (k−M)-th symbol changes as shown by a phase transitional, and a phase of the arriving signal B changes as shown by a phase transition b1, where the starting point is a phase value obtained by shifting the starting point of the phase transitional by the phase difference α. In the k-th symbol, the phase of the arriving signal A changes as shown by a phase transition a2, where the starting point is a phase value obtained by shifting the starting point of the phase transitional in the (k−M)-th symbol by a phase $\Delta\theta_k$ due to differential encoding, and the phase of the arriving signal B changes as shown by a phase transition b2, where the starting point is a phase value obtained by shifting the starting point of the phase transition a2 by the phase difference α. Therefore, the phase transitions a2 and b2 in the k-th symbol are only shifted from the phase transitions a1 and b1 in the (k−M)-th symbol by the phase $\Delta\theta_k$ due to differential encoding. Therefore, if the k-th symbol is subjected to delay (differential) detection using the (k−M)-th symbol, the phase $\Delta\theta_k$ due to differential encoding is obtained, so that data can be demodulated.

Moreover, the phase relationship between the arriving signal A and the arriving signal B will be described with reference to a vector diagram.

Figure 13:
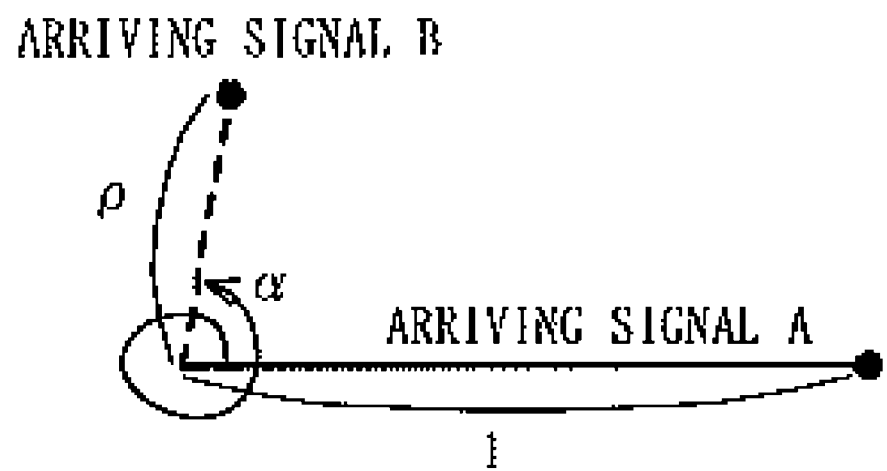
FIG. 13 is a diagram representing a phase relationship between the arriving signals A and B using vectors.

It is now assumed that, as shown in FIG. 13, a signal level of the arriving signal A is one, and a signal level of the arriving signal B is ρ, and a phase difference between the arriving signals is α.

Figure 14:
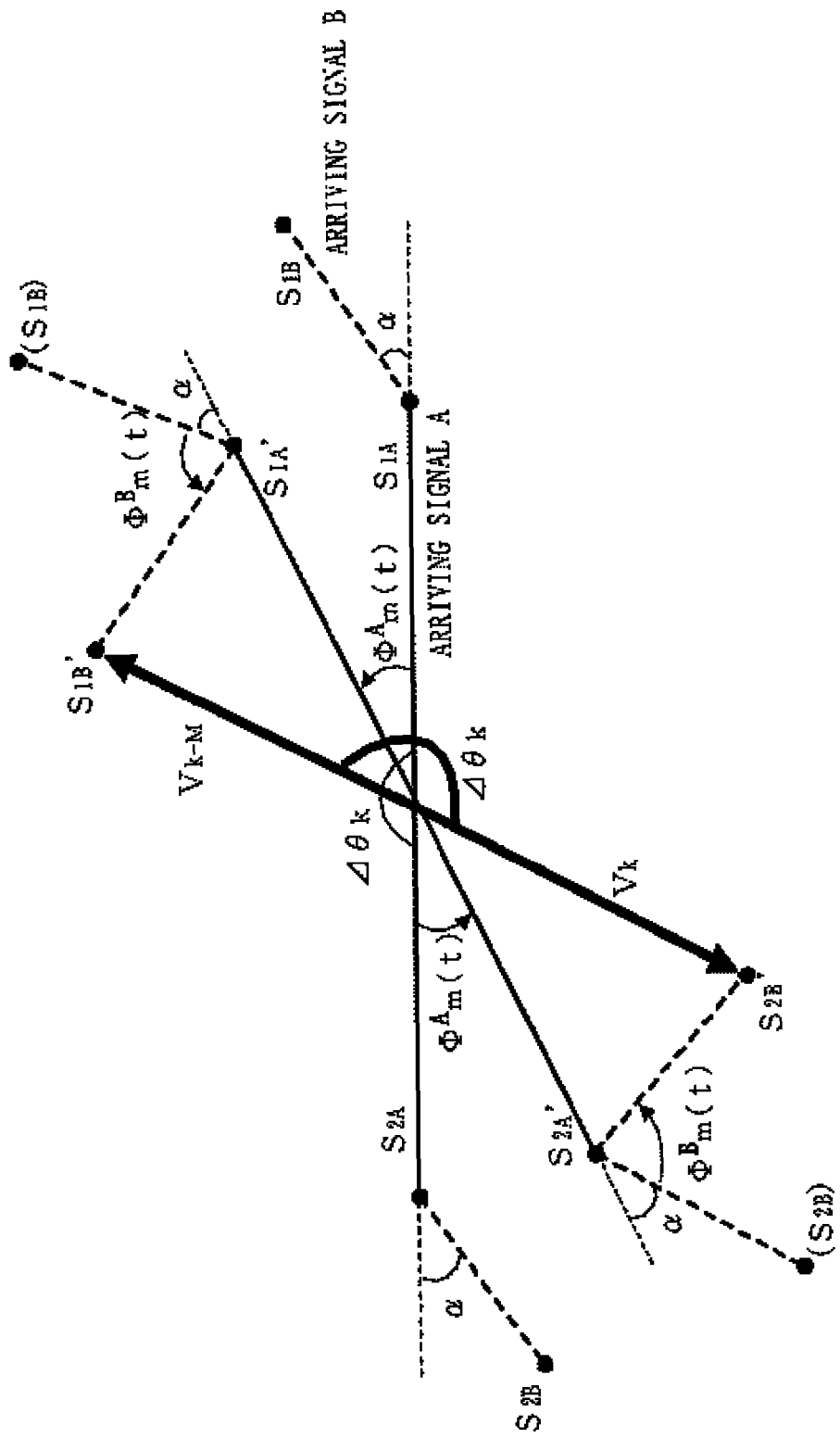
FIG. 14 is a diagram representing a phase relationship between the arriving signals A and B using vectors.

In this case, as shown in FIG. 14, in the (k−M)-th symbol, a phase of a vector $S_{1B}$ of the arriving signal B is different by α from a phase of a vector $S_{1B}$, of the arriving signal A. It is assumed that the phase of the arriving signal A varies depending on time and $\Phi^A_m(t)$, where the starting point is the vector $S_{1A}$, and the phase of the arriving signal A at any time t is a vector $S_{1A}'$. It is assumed that the phase of the arriving signal B varies depending on time and $\Phi^A_m(t)$, where the starting point is the vector $S_{1B}$, and the arriving signal B at a time t is a vector $S_{1B}'$. In this case, a vector of a received wave at the time t is $V_{k-M}$.

Similarly, in the k-th symbol, a phase of a vector $S_{2A}$ of the arriving signal A is different by $\Delta\theta_k$ from the phase of the vector $S_{1A}$ (here, a case where the phase difference $\Delta\theta_k$ between symbols to be detected is π is shown), and a phase of a vector $S_{2B}$ of the arriving signal B is different by α from the phase of the vector $S_{2A}$. It is assumed that the phase of the arriving signal A varies depending on time and $\Phi^A_m(t)$, where the starting point is the vector $S_{2A}$, and the phase of the arriving signal A at any time t is a vector $S_{2A}'$. It is assumed that the phase of the arriving signal B varies depending on time and $\Phi^B_m(t)$, where the starting point is the vector $S_{2B}$, and the arriving signal B at the time t is a vector $S_{2B}'$. In this case, a received wave vector at the time t is $V_k$.

As described above, since the phases of the arriving signal A and the arriving signal B are transitioned in the same manner in the (k−M)-th symbol and in the k-th symbol, the phase relationship between the two received wave vectors $V_k$ and $V_{k-M}$ is always $\Delta\theta_k$ at any time t.

Next, a phase transition of a symbol waveform in which a detection output is effectively obtained will be described.

From FIG. 14, the received wave vectors $V_{k-M}(t)$ and $V_k(t)$ at any time t are represented by:

$$\begin{cases} V_{k-M}(t) = S_{k-M} \cdot \{e^{j\Phi_m^A(t)} + \rho \cdot e^{j(\Phi_m^B(t)+\alpha)}\} \\ V_k(t) = S_k \cdot \{e^{j\Phi_m^A(t)} + \rho \cdot e^{j(\Phi_m^B(t)+\alpha)}\} \end{cases} \quad (12)$$

where $S_{k-M}$ and $S_k$ represent signal points in the (k−M)-th and k-th symbols, respectively.

Therefore, a detection output $D_k(t)$ by delay (differential) detection is represented by:

$$D_k(t) = V_k(t) \cdot V_{k-M}^*(t) \quad (13)$$

where * represents a complex conjugate.

Here, assuming that $\Phi^A{}_m(t)=u$ and $\Phi^B{}_m(t)+\alpha=v$, Expression (12) is represented by Expression (14) below.

$$\begin{aligned} D_k(t) &= S_k \cdot S_{k-M}^* \cdot \{\exp(j \cdot u) + \rho \cdot \exp(j \cdot v)\} \cdot \\ &\quad \{\exp(j \cdot u) + \rho \cdot \exp(j \cdot v)\}^* \\ &= |S_k|^2 \cdot \exp(j \cdot \Delta\theta_k) \cdot \{\cos(u) + j \cdot \sin(u) + \\ &\quad \rho \cdot \cos(v) + j \cdot \rho \cdot \sin(v)\} \cdot \{\cos(u) + \\ &\quad j \cdot \sin(u) + \rho \cdot \cos(v) + j \cdot \rho \cdot \sin(v)\}^* \\ &= |S_k|^2 \cdot \exp(j \cdot \Delta\theta_k) \cdot \{1 + \rho^2 + 2\rho \cdot \cos(u-v)\} \end{aligned} \quad (14)$$

Therefore, $D_k(t)$ is represented by Expression (15) below.

$$D_k(t)=|S_k|^2 \cdot \exp(j \cdot \Delta\theta_k) \cdot \{1+\rho^2+2\rho\cdot\cos(\Phi^A{}_m(t)-\Phi^B{}_m(t)-\alpha)\} \quad (15)$$

In Expression (15), the terms $\{1+\rho^2+2\rho\cdot\cos(\Phi^A{}_m(t)-\Phi^B{}_m(t)-\alpha)\}$ and $|S_k|^2$ are always non-negative, and the term $\exp(j\cdot\Delta\theta_k)$ indicates a detected signal corresponding to the phase $\Delta\theta_k$ carrying transmission data, thus indicating that a correct detection output is always obtained. Expression (15) is zero when the third term is zero, i.e., only at a moment when $\rho=1$ and the cos term is −1. As long as the phase difference $\Phi^A{}_m(t)-\Phi^B{}_m(t)$ between two symbol waveforms varies within a time interval of 0<t<T, any ρ and α always are not zero, and a detection output that is a combination of the arriving signal A and the arriving signal B does not completely disappear, which means that the diversity effect is obtained. Note that as the change amount increases, a plurality of effective detection outputs are obtained within 0<t<T in a symbol, so that a higher level of path diversity effect is obtained. Preferably, if the change amount is 2π or more, $\cos(\Phi^A{}_m(t)-\Phi^B{}_m(t)-\alpha)$ is inevitably one, so that t at which the detection output is maximum is inevitably present.

Therefore, in the wireless transmission system of this embodiment, if symbol waveforms of the modulating section 21 of the wireless station A and the modulating section 21 of the wireless station B (or symbol waveforms corresponding to the M-length symbol waveform sequences) have opposite increasing or decreasing directions of a phase transition in the same time region, such as, for example, the phase transitions $\Phi^A$ and $\Phi^B$ of FIG. 9(a), a high level of path diversity effect is obtained on the receiver's side.

Next, it will be described how a detected signal varies depending on the phase relationship between the arriving signal A and the arriving signal B in the receiving station.

FIG. 15 is a schematic diagram showing the phase relationship between the arriving signals A and B received by the receiving station when the delay distribution of a propagation path is negligible. FIGS. 15(a) to 15(d) show phase relationships in symbol waveform between the arriving signals A and B when α=zero degrees, 90 degrees, 190 degrees, and 270 degrees. The vertical axis of FIG. 15 indicates the phase of the k-th symbol of FIG. 12 within the range of 0 to 360 degrees, where the starting point of the phase transition a2 of the arriving signal A is zero degrees, and $\phi_{MAX}$=720 degrees in Expressions (3) and (4). Also, opposite phase points where the arriving signal A and the arriving signal B has opposite phases are indicated by marks X, and in-phase points having the same phase are indicated by marks O.

As shown in FIG. 15, when a delay is not present in a propagation path, an opposite-phase point where the amplitude of a received wave in which the vectors of the arriving signal A and the arriving signal B are combined is canceled to be zero, is a moment in one symbol irrespective of the magnitude of α. Therefore, by delay (differential) detection of the arriving signals A and B, the detection amplitude is proportional to the square of the received wave, and has substantially a similar shape. This is illustrated as a curve indicated by a solid line of FIG. 16. As indicated by the solid line of FIG. 16, an effective detection output whose polarity (positive polarity in FIG. 16) is always correct with respect to transmission data, is obtained. Also, a dashed line in FIG. 16 indicates a detection output after passage through the low-pass filters 1310 and 1811. By passage through the low-pass filters 1810 and 1811, a detection output in which effective outputs obtained at a plurality of time locations in a symbol are combined is obtained even if it becomes zero, i.e., is lost at a moment, so that the diversity effect is exhibited.

Next, a case where the delay distribution of a propagation path is negligible will be described.

Here, for the sake of simplicity, a two-wave arrival model will be discussed in which arriving signals from the two wireless stations A and B as shown in FIG. 17 each include two waves. A case where a direct wave and a delayed wave of the transmission signal A are received and a case where a direct wave and a delayed wave of the transmission signal B are received will be firstly discussed, and thereafter, a case where all four arriving waves are received will be discussed.

FIG. 18A is a schematic diagram showing changes in phase between a direct wave and a delayed wave of the transmission signal A for each symbol. Here, a phase difference at a reception point between carriers of a direct wave and a delayed wave is represented by $\beta_A$. The phase of a delayed wave in the k-th symbol is obtained by adding a phase transition $\Phi^A{}_m(t-\tau)$ of a symbol waveform of the transmission signal A that is obtained by delaying the direct wave by t to a combination phase of the phase $\theta_k$ of a signal point and the phase difference $\beta_A$ between signals, which depends on transmission data, as a starting point. Similarly, the phase of a delayed wave in the (k−M)-th symbol is obtained by adding a phase transition $\Phi^A{}_m(t-\tau)$ of the same transmission signal A as that of the k-th symbol to the phase $\theta_{k-M}$ of a signal point as a starting point.

Therefore, when delay (differential) detection is performed in the k-th symbol and the (k−M)-th symbol, an effective segment in which correct detection polarity is obtained and correct demodulated data is obtained is a region (ii) in the k-th symbol or a region (ii)' in the (k−M)-th symbol. Regions (i), (iii), (i)' and (iii)' before and after the regions (ii) and (ii)' are contaminated with different data signals in adjacent symbols, so that symbol-to-symbol interference occurs, and therefore, correct demodulated data is not necessarily obtained in these regions.

FIG. 18B is a schematic diagram showing changes in phase between a direct wave and a delayed wave of the transmission signal B for each symbol. The same principle as that described above is applied to the transmission signal B, except that the phase difference at a reception point between carriers of a direct wave and a delayed wave is replaced with $\beta_B$, and the phase transition of the symbol waveform of the transmission signal B that is obtained by delaying the direct wave by t is replaced with $\Phi^B_m(t-\tau)$. Although it has been assumed above that the delay difference between the direct wave and the delayed wave of the transmission signal A and the delay difference between the direct wave and the delayed wave of the transmission signal B is the same, i.e., $\tau$, they may be different. In this case, a similar improvement effect is obtained.

Figure 19:
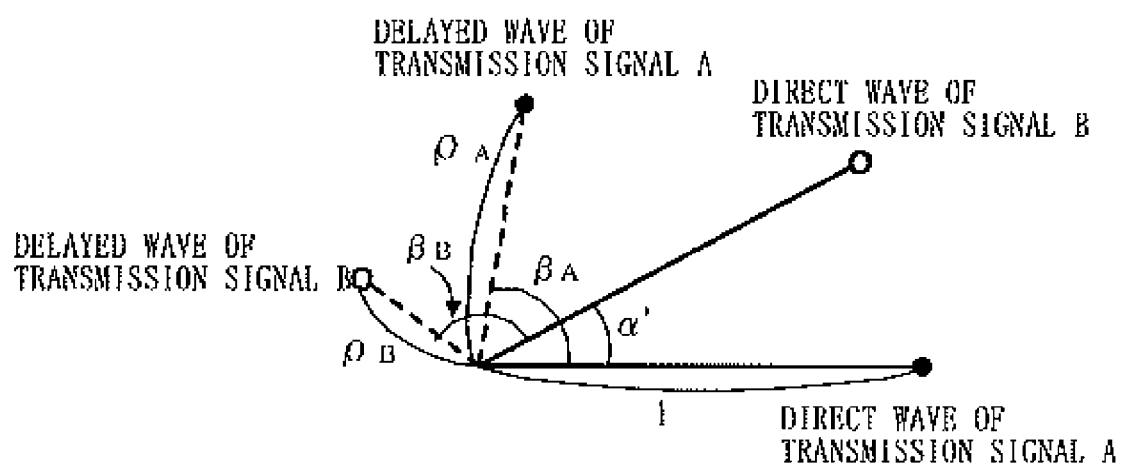
FIG. 19 is a diagram showing a phase relationship at a reception point between carriers of direct waves and delayed waves of the transmission signals A and B.

FIG. 19 is a diagram showing a phase relationship at a reception point between the carriers of the direct waves and delayed waves of the transmission signals A and B. In addition to $\beta_A$ and $\beta_B$, a phase difference between the carriers of the direct wave of the transmission signal A and the direct wave of the transmission signal B is represented by $\alpha'$. Also, the amplitudes of the delayed waves with respect to the direct waves of the transmission signals A and B are represented by $\rho_A$ and $\rho_B$. The amplitudes of the direct waves are assumed to be the same for the sake of simplicity since an operation and an improvement effect described below are not affected by whether or not the amplitudes of the direct waves are the same.

Figure 20A:
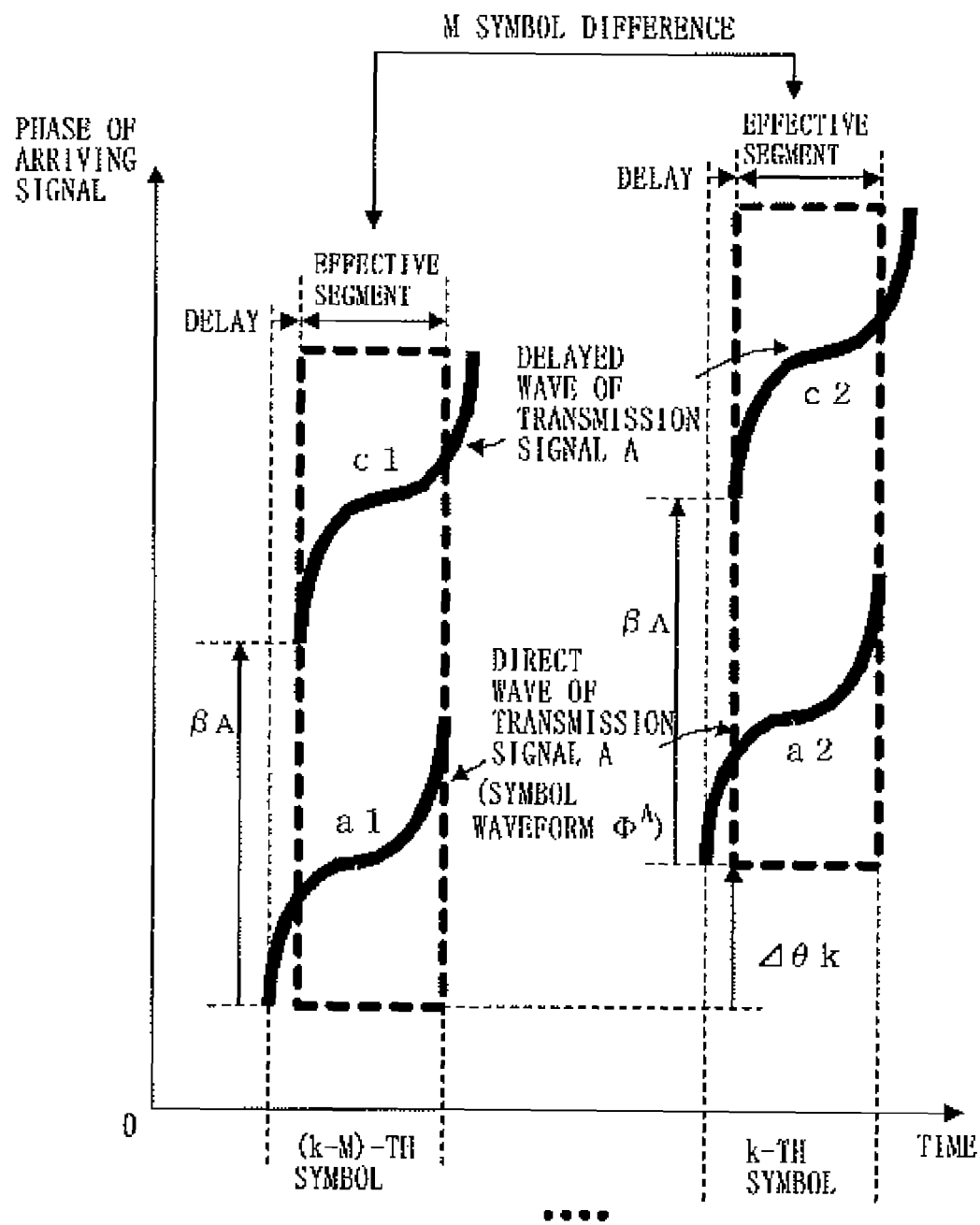
FIG. 20A is a phase transition diagram schematically showing a phase relationship between a direct wave and a delayed wave of the transmission signal A and a phase relationship between symbols.
Figure 20B:
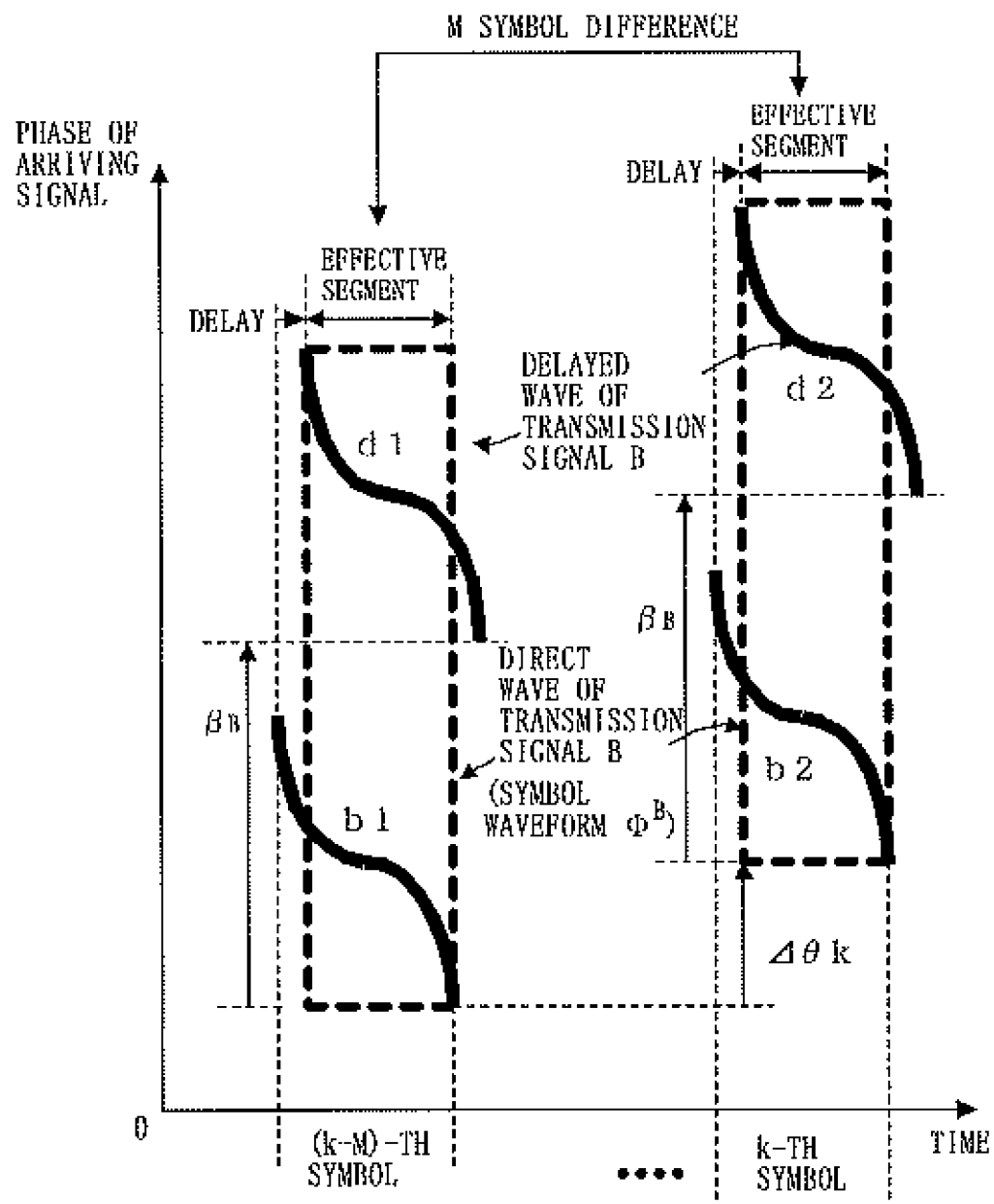
FIG. 20B is a phase transition diagram schematically showing a phase relationship between a direct wave and a delayed wave of the transmission signal B and a phase relationship between symbols.

FIG. 20A is a phase transition diagram schematically showing a phase relationship between the direct wave and the delayed wave of the transmission signal A and a phase relationship between symbols. Note that $\Phi^A$ of FIG. 9(a) is used as a symbol waveform of the transmission signal A. In FIG. 20A, the phase of the direct wave in the (k–M)-th symbol changes as shown by a phase transition a1, and the phase of the delayed wave transitions as shown by a phase transition c1, where a phase value obtained by shifting the starting point of the phase transitional by $\beta_A$ is a starting point. In the k-th symbol, the phase of the direct wave transitions as shown by a phase transition a2, where a phase value obtained by shifting the starting point of the phase transitional in the (k–M)-th symbol by $\Delta\theta_k$ due to differential encoding is a starting point, and the phase of the delayed wave transitions as shown by a phase transition c2, where a phase value obtained by shifting the starting point of the phase transition a2 by $\beta_A$ is a starting point. Therefore, a relationship between the phase transitions a1 and c1 in the (k–M)-th symbol and a relationship between the phase transitions a2 and c2 in the k-th symbol are such that one transition is shifted from the other by $\Delta\theta_k$ due to differential encoding. Therefore, if the k-th symbol is subjected to delay (differential) detection using the (k–M)-th symbol, $\Delta\theta_k$ due to differential encoding is obtained, so that data can be demodulated. This relationship is similarly applied to a phase transition diagram of FIG. 20B schematically showing a phase relationship between the direct wave and the delayed wave of the transmission signal B and a phase relationship between symbols.

Next, a phase relationship between the direct wave and the delayed wave of the transmission signal A will be described using a vector diagram.

FIG. 21A is a schematic diagram representing phase transitions, of the direct wave and the delayed wave of the transmission signal A using vectors. Here, only the effective segment (ii) or (ii)' of FIG. 18A will be discussed. FIG. 21A represents transmission data, and shows an example in which the phase difference $\Delta\theta_k$ between two symbols to be detected that are separated by M symbols is $\pi$, where a signal point in the (k–M)-th symbol is represented by $S_{1A}$ and a signal point in the k-th symbol is represented by $S_{2A}$.

In the (k–M)-th symbol, the phase of a vector $S_{1Ad}$ of the delayed wave is different by $\beta_A$ from the phase of the vector $S_{1A}$ of the direct wave. The phase of the direct wave varies depending on time and $\Phi^A_m(t)$, where the vector $S_{1A}$ is a starting point, and the direct wave at any time t is represented by a vector $S_{1A}'$. The phase of the delayed wave varies depending on time and $\Phi^A_m(t-\tau)$ where the vector $S_{1Ad}$ is a starting point, and the delayed wave at the time t is represented by a vector $S_{1Ad}'$. In this case, the vector of the received wave at the time t is $V^A_{k-N}$.

Similarly, in the k-th symbol, the phase of the vector $S_{2A}$ of the direct wave is different by $\Delta\theta_k$ from the phase of the vector $S_{1A}$, and the phase of a vector $S_{2Ad}$ of the delayed wave is different from by $\beta_A$ from the phase of the vector $S_{2A}$. The phase of the direct wave varies depending on time and $\Phi^A_m(t)$, where the vector $S_{2A}$ is a starting point, and the direct wave at any time t is represented by a vector $S_{2A}'$. The phase of the delayed wave varies depending on time and $\Phi^A_m(t-\tau)$, where the vector $S_{2Ad}$ is a starting point, and the delayed wave at a time t is represented by a vector $S_{2Ad}'$. In this case, a received wave vector at the time t is represented by $V^A_k$.

Thus, the phases of the direct wave and the delayed wave of the transmission signal A transition in the same manner between in the (k–M)-th symbol and in the k-th symbol, so that a phase relationship between the two received wave vectors $V^A_k$ and $V^A_{k-M}$ is always $\Delta\theta_k$ at any time t.

Figure 21B:
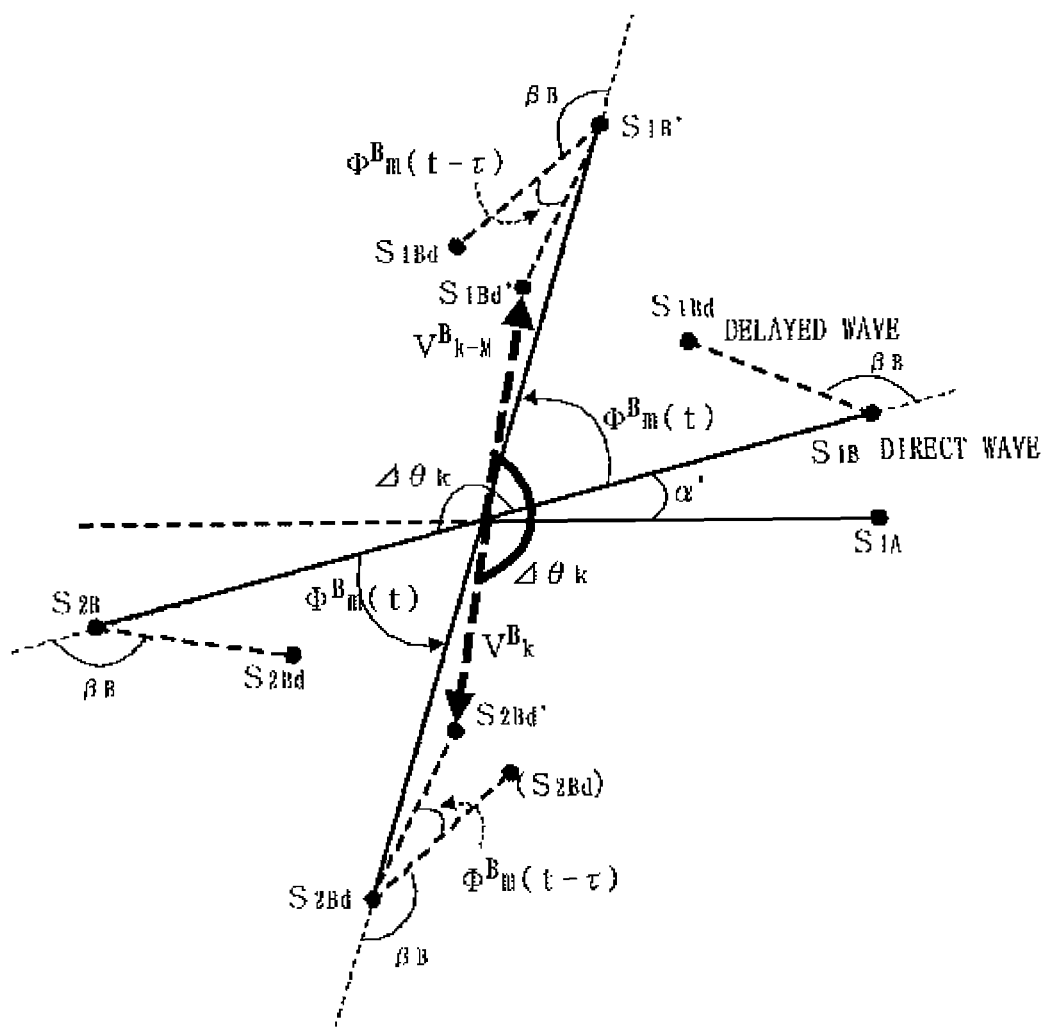
FIG. 21B is a schematic diagram representing phase transitions of a direct wave and a delayed wave of the transmission signal B using vectors.

FIG. 21B is a schematic diagram in which phase transitions of the direct wave and the delayed wave of the transmission signal B are represented by vectors. Also in this case, only the effective segment (ii) or (ii)' of FIG. 18B will be discussed. FIG. 21B also represents transmission data, an example in which the phase difference $\Delta\theta_k$ between two symbols to be detected that are separated by M symbols is $\pi$. The signal point $S_{1B}$ of the transmission signal B is present at a location obtained by rotating the signal point $S_{1A}$ of the (k–M)-th symbol of the transmission signal A by a phase difference $\alpha'$. The signal point $S_{2B}$ of the k-th symbol is present at a location obtained by rotating the signal point $S_{1B}$ by $\Delta\theta_k$.

In the (k–M)-th symbol, the phase of a vector $S_{1Bd}$ of the delayed wave is different by $\beta_B$ from the phase of the vector $S_{1B}$ of the direct wave. The phase of the direct wave varies depending on time and $\Phi^B_m(t)$, where the vector $S_{1B}$ is a starting point, and the direct wave at any time t is represented by a vector $S_{1B}'$. The phase of the delayed wave varies depending on time and $\Phi^B_m(t-\tau)$ where the vector $S_{1Bd}$ is a starting point, and the delayed wave at time t is represented by a vector $S_{1B}'$. In this case, the vector of the received wave at the time t is $V^B_{k-M}$.

Similarly, in the k-th symbol, the phase of the vector $S_{2B}$ of the direct wave is different by $\Delta\theta_k$ from the phase of the vector $S_{1B}$, and the phase of a vector $S_{2ABd}$ of the delayed wave is different by $\beta_B$ from the phase of the vector $S_{2B}$. The phase of the direct wave varies depending on time and $\Phi^B_m(t)$, where the vector $S_{2Bd}$ is a starting point, and the direct wave at any time t is represented by a vector $S_{2B}^1$. The phase of the delayed wave varies depending on time and $\Phi^B_m(t-\tau)$, where a vector $S_{2Bd}$ is a starting point, and the delayed wave at the a time t is represented by a vector $S_{2Bd}'$. In this case, a received wave vector at the time t is $V^B_k$. Thus, the phases of the direct wave and the delayed wave of the transmission signal B transition in the same manner between in the (k–M)-th symbol and in the k-th symbol, so that a phase relationship between the two received wave vectors $V^B_k$ and $V^B_{k-M}$ is always $\Delta\theta_k$ at any time T.

Figure 22:
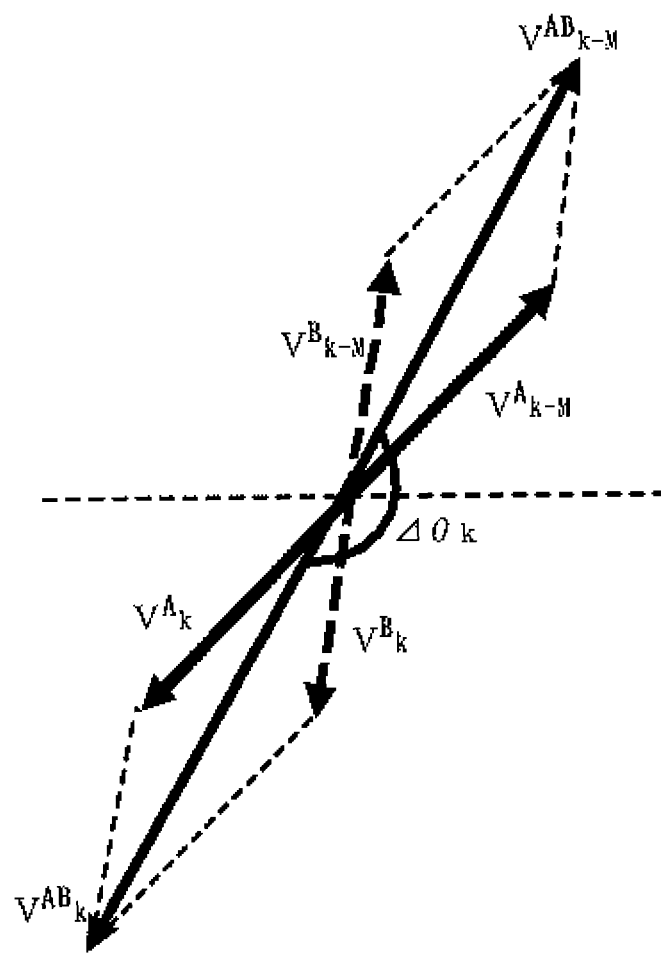
FIG. 22 is a schematic diagram showing phase transitions of all arriving waves using vectors.

Thus, when the four arriving waves of FIG. 17 are all present, a vector sum $V^{AB}_{k-M}$ of $V^A_{k-M}$ and $V^b_{k-M}$ is received in the (k–M)-th symbol, and a vector sum $V^{AB}_k$ of $V^A_k$ and $V^B_k$ is received in the k-th symbol as shown in FIG. 22. A phase difference between both the vector sums is still always $\Delta\theta_k$ at any time t within the effective segment. This means that unless both the vector $V^A_k$ and $V^B_k$ (or $V^A_{k-M}$ and $V^B_{k-M}$)

cancel each other or a direct wave and a delayed wave from each of two antennas cancel each other, so that the vectors $V^A_k$ and $V^B_k$ (or $V^A_{k-M}$ and $V^B_{k-M}$) simultaneously disappear, i.e., even if the vectors $V^A_k$ and $V^B_k$ (or $V^A_{k-M}$ and $V^B_{k-M}$) disappear for a moment, for the other moments a detection output obtained by delay (differential) detection of the received signal is always an output having a correct polarity corresponding to transmission data. In other words, as described in FIGS. 15 and 16, a detection output that may become zero for a moment, but is not zero for the other moments, is obtained. Further, by using a low-pass filter, a detection output in which effective outputs obtained at a plurality of time locations in an effective segment within a symbol are combined is obtained even if a portion of the detection output becomes zero, i.e., is lost, so that the path diversity effect is exhibited.

As described above, in the wireless transmission system of the first embodiment of the present invention, a plurality of wireless stations perform differential encoding with respect to the same transmission data, modulate the resultant data with different symbol waveforms, and transmit the resultant data, and a receiving station performs delay (differential) detection. Thereby, even in a wider delay range (difference in arrival timing), the effect of improving an error rate by a peculiar path diversity effect is obtained. As a result, as a delay tolerance range is increased by using different symbol waveforms, the maximum effective branch number also increases, under the same conditions, though it depends on, for example, a specific modulation parameter, such as band limitation or the like.

Figure 23:
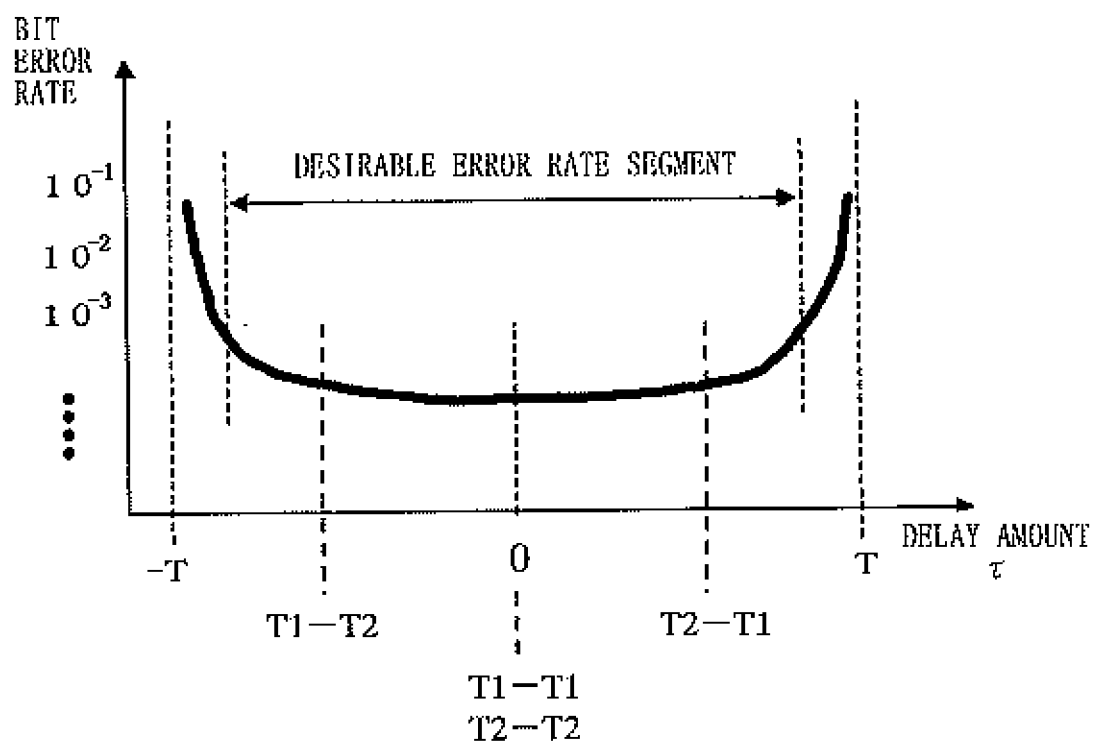
FIG. 23 is a diagram schematically showing a relationship between a bit error rate and a delay amount τ of a transmission method of the present invention.
Figure 58:
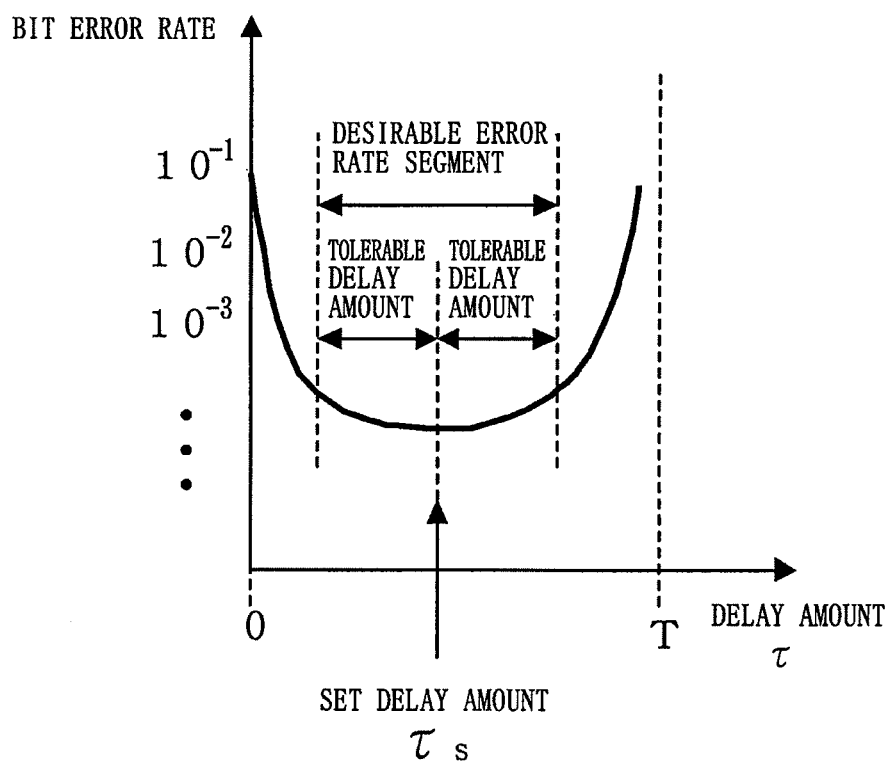
FIG. 58 is a diagram schematically showing a relationship between a bit error rate and a delay amount $\tau$ in a conventional transmission technique.
Figure 59:
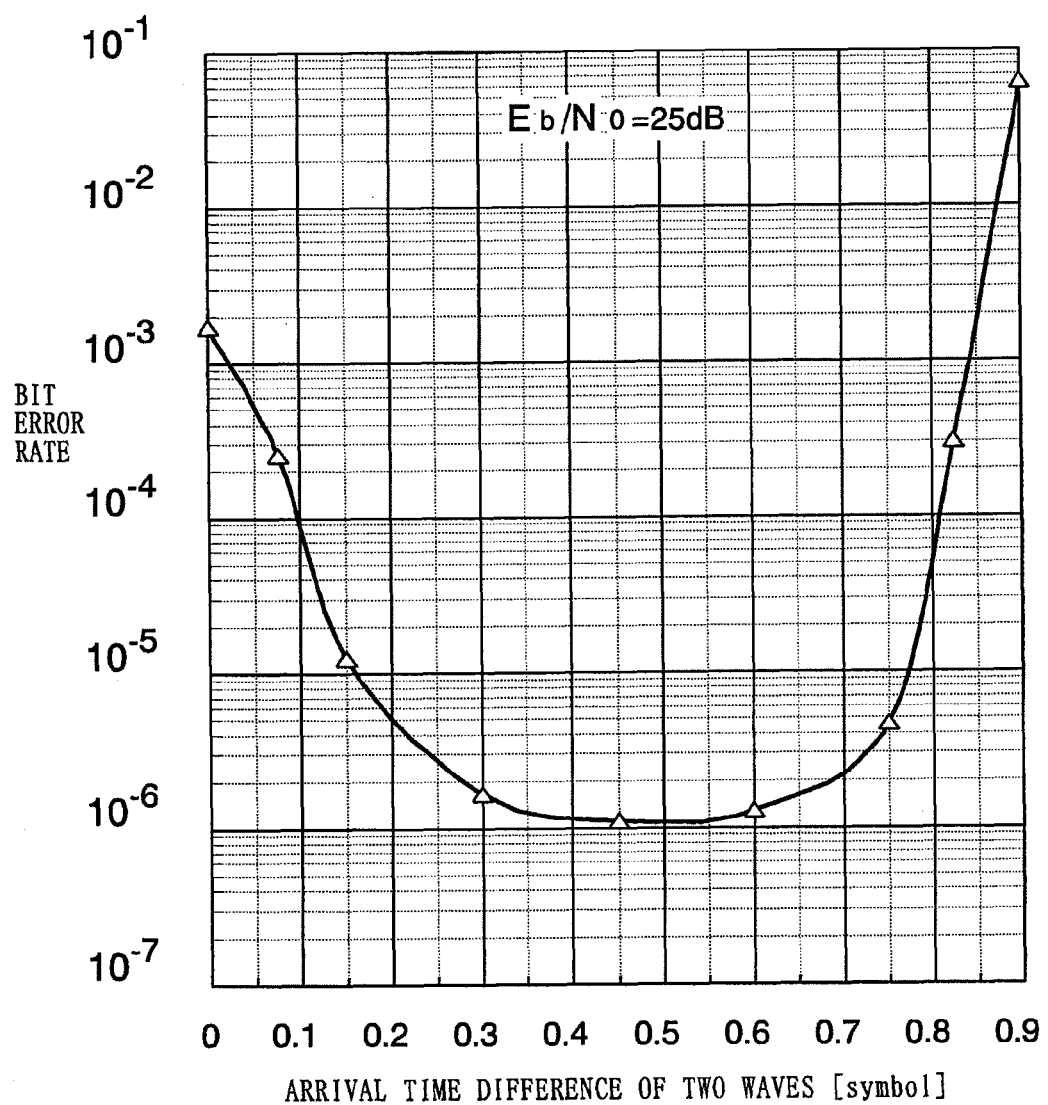
FIG. 59 is a diagram showing a bit error rate characteristic with respect to an arrival time difference between two waves when QPSK-VP is used.
Figure 60:
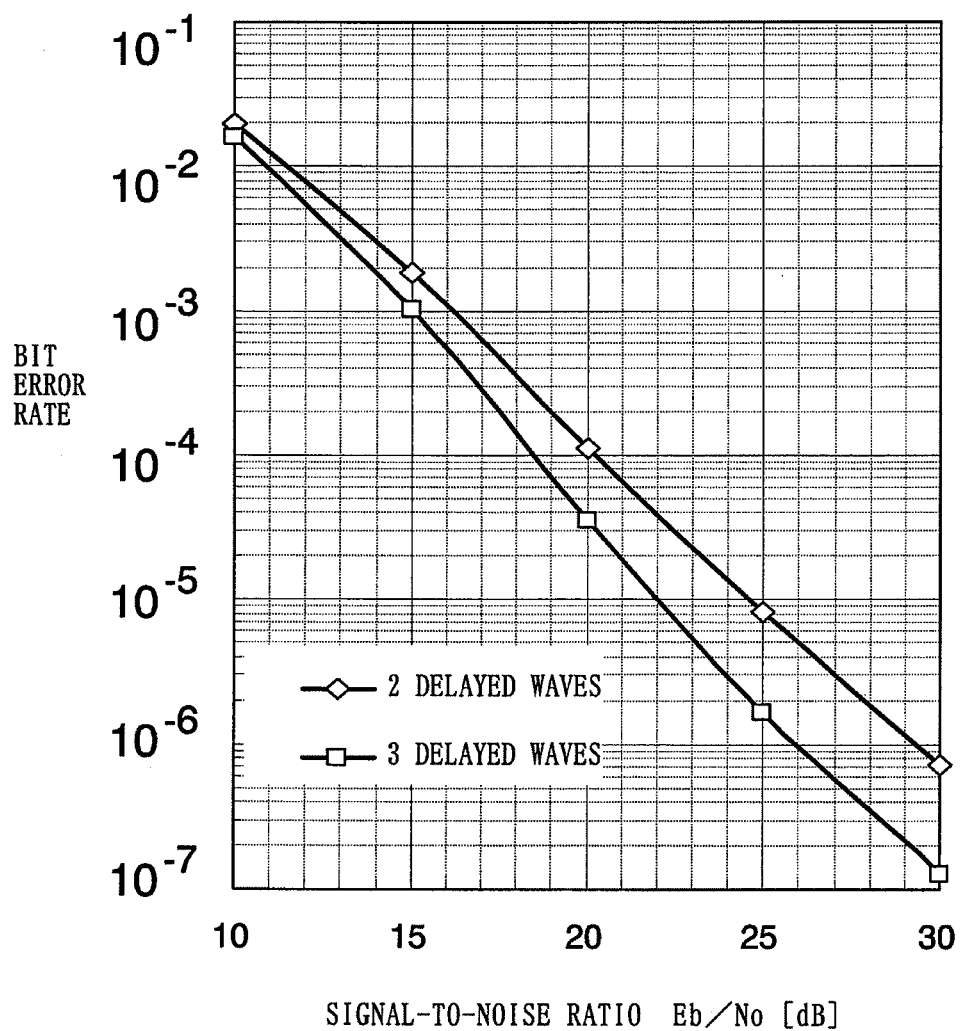
FIG. 60 is a diagram showing a bit error rate characteristic in the case of two waves and three waves in QPSK-VP.
Figure 61:
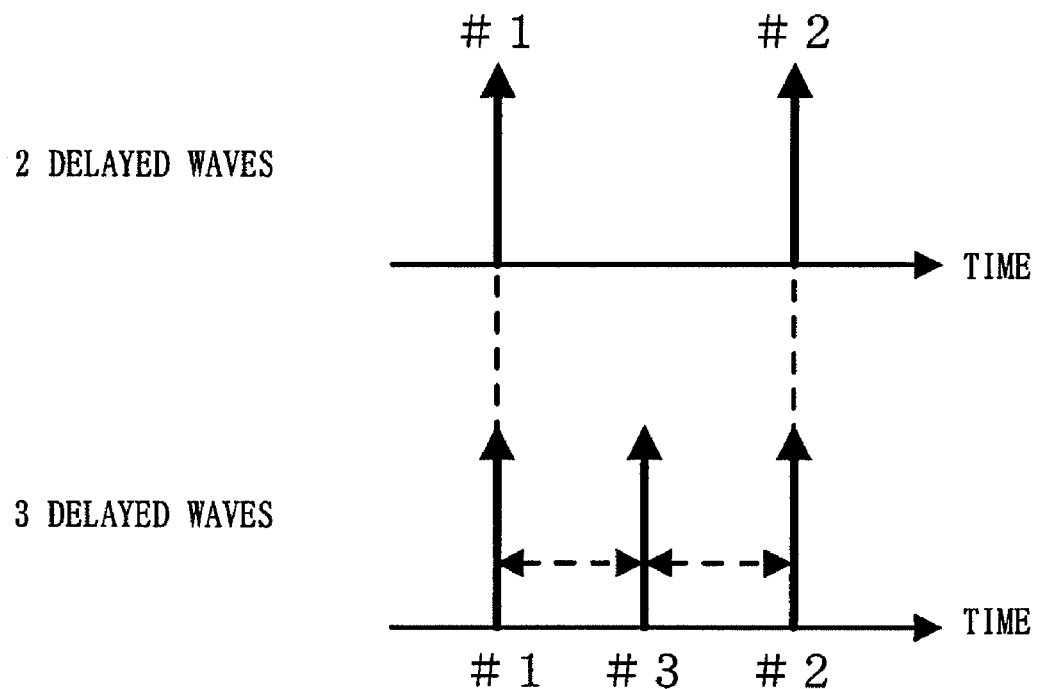
FIG. 61 is a diagram showing a time relationship between the two waves and three waves of FIG. 60.

FIG. 23 is a diagram schematically showing a relationship between the bit error rate and the delay amount τ of the transmission method of the present invention as is similar to FIG. 58. As the delay amount τ approaches the symbol length T (or −T), the effective segment decreases, and eventually, disappears, resulting in a deterioration in error rate, which is the same as in FIG. 58. FIG. 23 is different from FIG. 58 in that the error rate is improved when the delay amount τ is near zero. Therefore, in the transmission method of the present invention, as is different from Patent Document 1, it is not necessarily required to intentionally insert a predetermined delay between arriving signals. Rather, even if arriving timings are the same, a particular diversity effect is obtained. FIG. 23 illustrates this situation. As compared to FIG. 58, the delay resistance range is significantly improved.

As described above, by combining different symbol waveforms and arrival timings (delay differences), a higher level of path diversity effect can be obtained (the maximum effective branch number is increased).

Here, conditions for symbol waveforms and arrival timings that are required to utilize, to the maximum extent, the maximum effective branch number that is increased by using different symbol waveforms, thereby exhibiting the path diversity effect in the wireless transmission system, will be described. Hereinafter, it is assumed that two different symbol waveform (or symbol waveform sequences) W1 and W2 are present in the wireless transmission system, and arrival timings corresponding to the maximum effective branch number for the symbol waveforms are T1 and T2.

A relationship between the timings T1 and T2, and a tolerable delay amount (desirable error rate segment) is preferably set as shown in FIG. 23. Specifically, if T2>T1, three arrival time differences T1−T2, 0(T1−T1 or T2−T2) and T2−T1 are generated, and these need to be within the tolerable delay amount. Also, if the arrival time difference is T1−T2 and T2−T1, the path diversity effect is obtained even when the same symbol waveforms are used (see FIG. 58).

When the arrival time difference is 0, signals having different symbol waveforms are required.

In this case, the maximum effective branch number increased by using the different symbol waveforms is four, so that a pair of a symbol waveform and an arrival timing needs to be selected from four pairs W1T1, W1T2, W2T1 and W2T2. Specifically, when the number of wireless stations performing simultaneous transmission is smaller than or equal to the maximum effective branch number (in this case, four), the wireless stations need to perform transmission using different ones of these four pairs. Also, even when the number of wireless stations performing simultaneous transmission exceeds the maximum effective branch number, no pairs other than these four pairs are created, and four of the wireless stations use different ones of the four pairs, and the other wireless stations need to select any of the four pairs for transmission.

Figure 24:
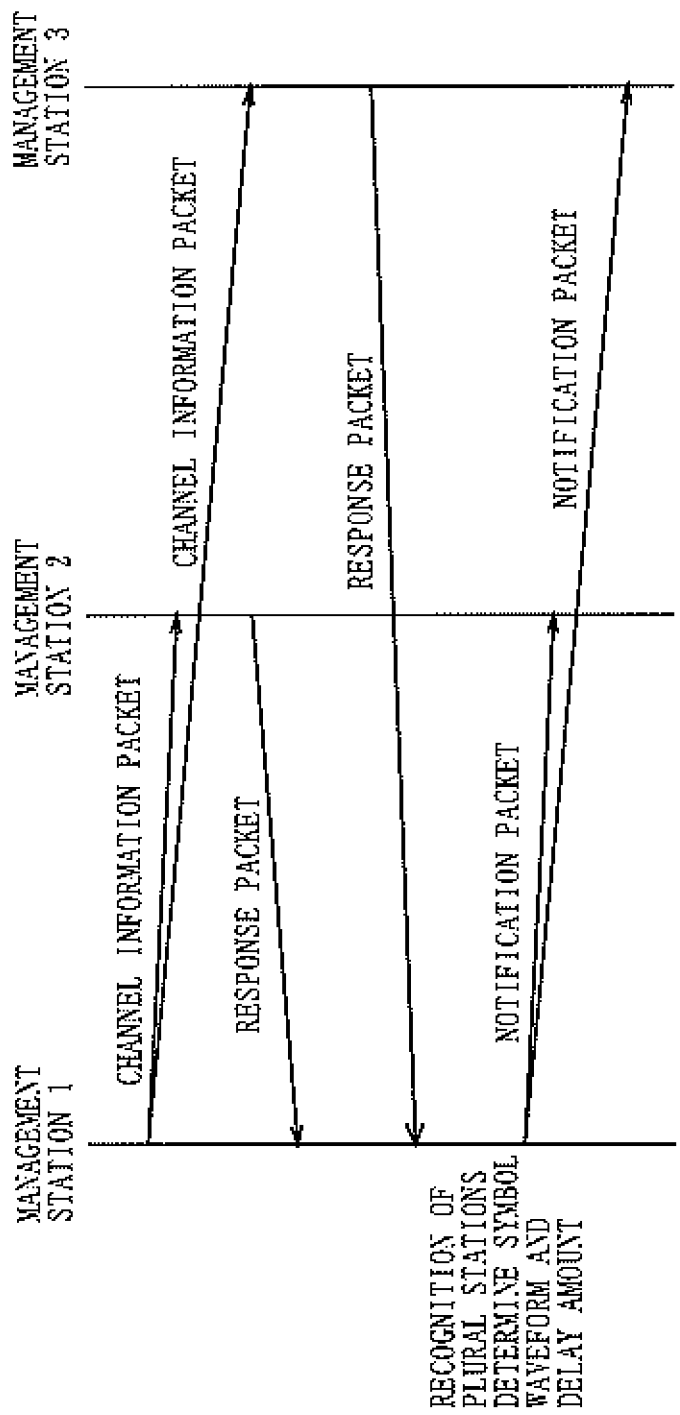
FIG. 24 is a sequence diagram showing an outline of operations of management stations 1 to 3.

FIG. 24 is a sequence diagram showing an outline of an operation of the management stations 1 to 3 having the above-described configuration.

Firstly, channel information packet transmitted by the management station 1 is received by the management stations 2 and 3. The management stations 2 and 3 transmit a response packet to the management station 1. The management station 1, when receiving the response packet, determines a symbol waveform and a delay amount that are to be used the management stations 2 and 3 when the management stations 2 and 3 perform multi-station simultaneous transmission of a broadcast packet where the management station 1 serves as a source management station. The management station 1 then notifies the management stations 2 and 3 of the determined symbol waveform and delay amount using a notification packet. Thus, the channel information packet is considered as a packet for requesting multi-station simultaneous transmission.

Figure 25:
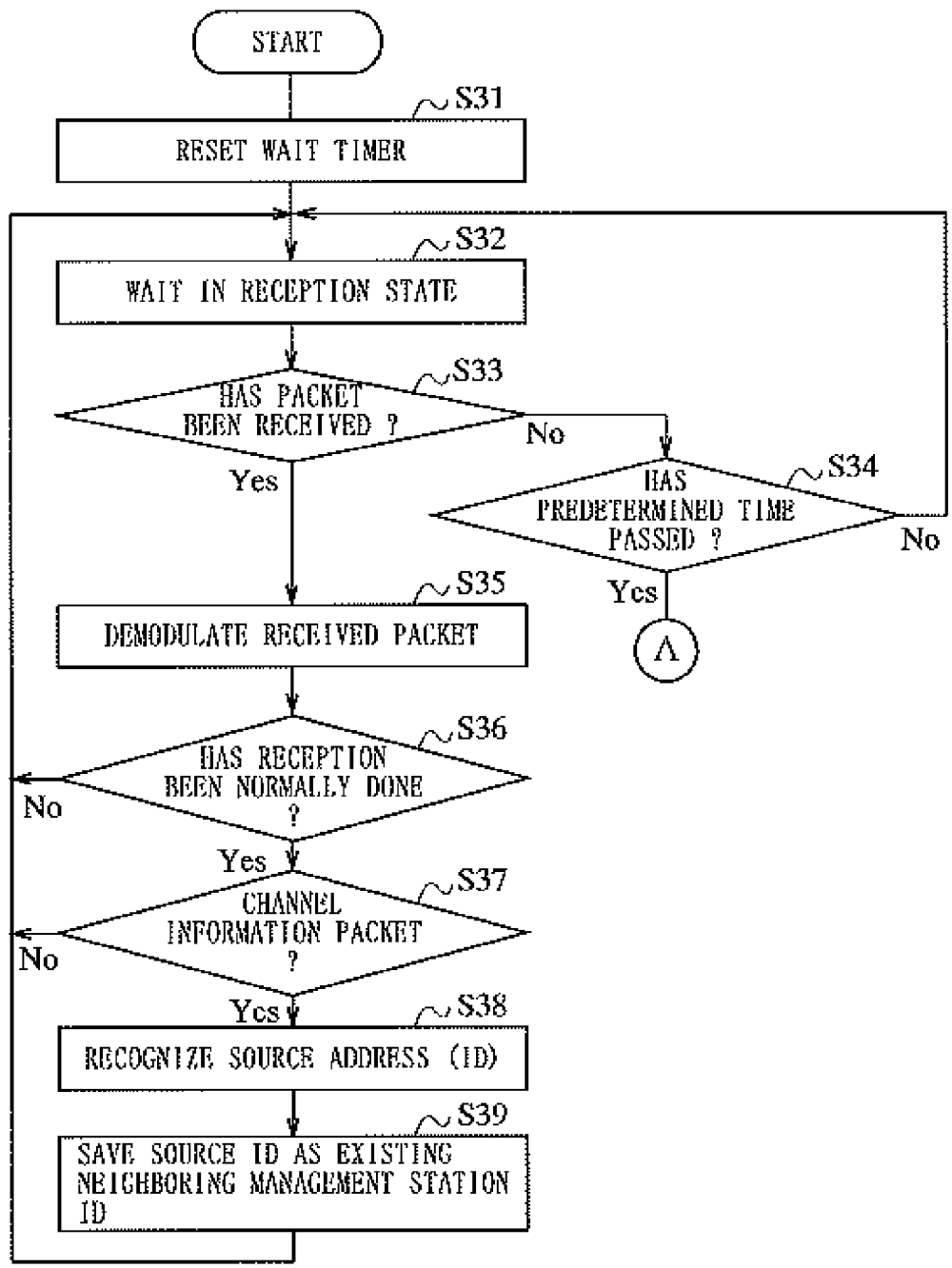
FIG. 25 is a flowchart showing an operation of the management station 1 in an existing neighboring management station search mode.

FIG. 25 is a flowchart showing an operation of the management station 1 in an existing neighboring management station search mode shown in FIG. 5. The existing neighboring management station search mode is, for example, a mode where system construction is newly started when, for example, power is turned ON.

The management station 1 waits for reception of a packet for a predetermined time in the existing neighboring management station search mode, and determines whether or not any management station capable of performing relay transmission (neighboring management station) is present. The management station 1 resets a wait timer for waiting for reception of a packet for the predetermined time (step S31), and waits in a receive state (Step S32). Thereafter, if a packet is received until the predetermined time elapses (steps S33 and S34), the management station 1 demodulates the received packet (step S35). Specifically, the demodulating section 33 demodulates a received baseband signal which has been received by the antenna 31 and frequency-converted by the RF section 32. The resultant signal is referred to as demodulated data.

The packet determining section 34 performs CRC check with respect to the demodulated data to determine whether or not the packet has been normally received (step S36). If the packet has not been normally demodulated, the management station 1 waits in the receive state again (step S32). On the other hand, if the packet has been normally demodulated, the packet determining section 34 references the packet identifier of the received packet to determine whether or not the received packet is a channel information packet (step S37).

If the received packet is not a channel information packet, the management station 1 waits in the receive state again (step S32). On the other hand, if the received packet is a channel information packet, the management station 1 recognizes the source address (source ID) of the received packet, and passes the source address to the symbol wave form/delay amount determining section 36 (step S38). The symbol waveform/delay amount determining section 36 stores the received source ID as an ID (existing neighboring management station ID) of the neighboring management station which has existed before the management station 1 (step S39).

Figure 26:
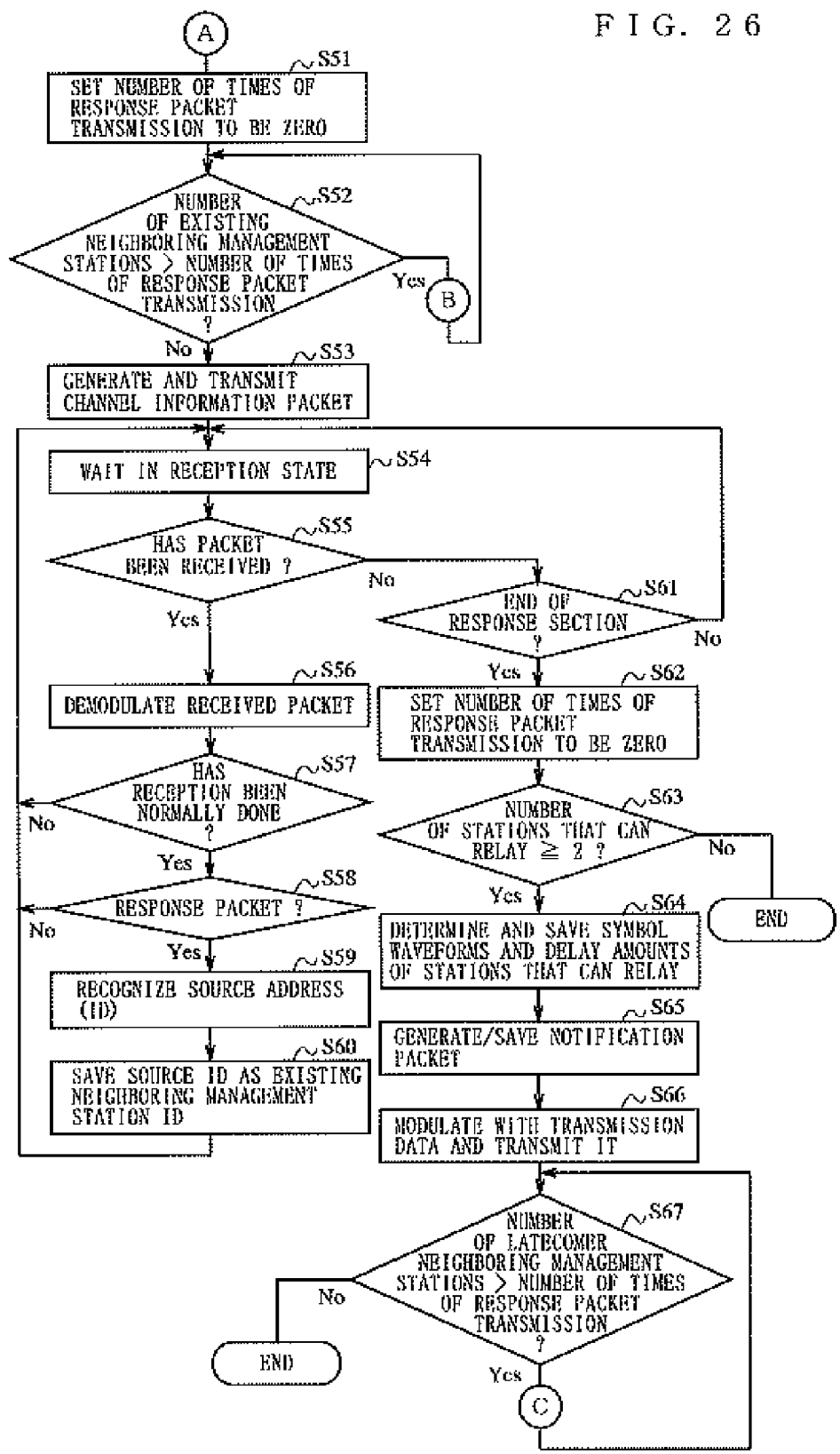
FIG. 26 is a flowchart showing an operation of the management station 1 after the end of a neighboring management station search mode.

On the other hand, at step S34, when the predetermined time has elapsed, the process goes to step S51 shown in FIG. 26.

FIG. 26 is a flowchart showing an operation of the management station 1 after the existing neighboring management station search mode ends.

In the management station 1, the symbol wave form/delay amount determining section 36 sets the number of times of transmission of a response packet (response packet transmission count) to be zero (step S51), and determines whether or not the number of existing neighboring management stations is larger than the response packet transmission count (step S52). If the number of existing management stations is smaller than the response packet transmission count, the symbol wave form/delay amount determining section 36 instructs the transmission packet processing section 40 to generate a channel information packet. The transmission packet processing section 40 generates and passes a channel information packet to the modulating section 21. The modulating section 21 generates a modulated signal from the channel information packet, and transmits the modulated signal via the RF section 32 and the antenna 31 (step S53).

Thereafter, the management station 1 is in the receive state, waiting for a response packet transmitted from another management station (step S54). The management station 1 determines whether or not a packet has been received until the end of the response zone. If a packet has been received and then normally demodulated, the packet determining section 34 determines whether or not the received packet is a response packet. If the received packet is a response packet, the symbol wave form/delay amount determining section 36 stores a source ID included in the response packet as a neighboring management station ID. Since the operations in steps S56 to S60 are similar to those in steps S35 to S39 of FIG. 25 and will not be described in detail.

On the other hand, in step S61, when the response zone has been completed and a waiting time for reception of a response packet has elapsed, the symbol wave form/delay amount determining section 36 sets the response packet transmission count of the response packet to be zero (step S62). Thereafter, the symbol wave form/delay amount determining section 36 determines whether or not the number of stations capable of relaying is two or more (step S63). Specifically, the symbol wave form/delay amount determining section 36 determines the number of relaying-capable stations that have made a response in the response zone based on the number of neighboring management station IDs that have been stored in the response zone. If the number of relaying-capable stations is less than two (No in step S63), the management station 1 ends the process. On the other hand, if the number of relaying-capable stations is two or more (Yes in step S63), the symbol wave form/delay amount determining section 36 determines a symbol waveform and a delay amount that are to be assigned to a station capable of relaying a broadcast packet, records the symbol waveform and the delay amount into the record table 37, and passes the ID of the relaying-capable station and the determined symbol waveform and delay amount to the transmission packet processing section 40 and instructs the transmission packet processing section 40 to generate a notification packet (step S64).

The transmission packet processing section 40 generates and passes a notification packet to the modulating section 21 (step S65). The modulating section 21 generates a modulated signal from the notification packet and transmits the modulated signal via the RF section 32 and the antenna 31 (step S66). The symbol wave form/delay amount determining section 36 compares the number of neighboring management station IDs stored during the response zone with the number of existing neighboring management station IDs obtained in the existing neighboring management station search mode, recognizes the number of management stations generated after the management station 1 (latecomer neighboring management stations), and determines whether or not the number of latecomer neighboring management stations is larger than the response packet transmission count (step S67). If the number of latecomer neighboring management stations is smaller than the response packet transmission count (No in step S67), the management station 1 ends the process. On the other hand, if the number of latecomer neighboring management stations is larger than the response packet transmission count (Yes in step S67), the management station 1 goes to an operation of step S81 shown in FIG. 28.

Figure 27:
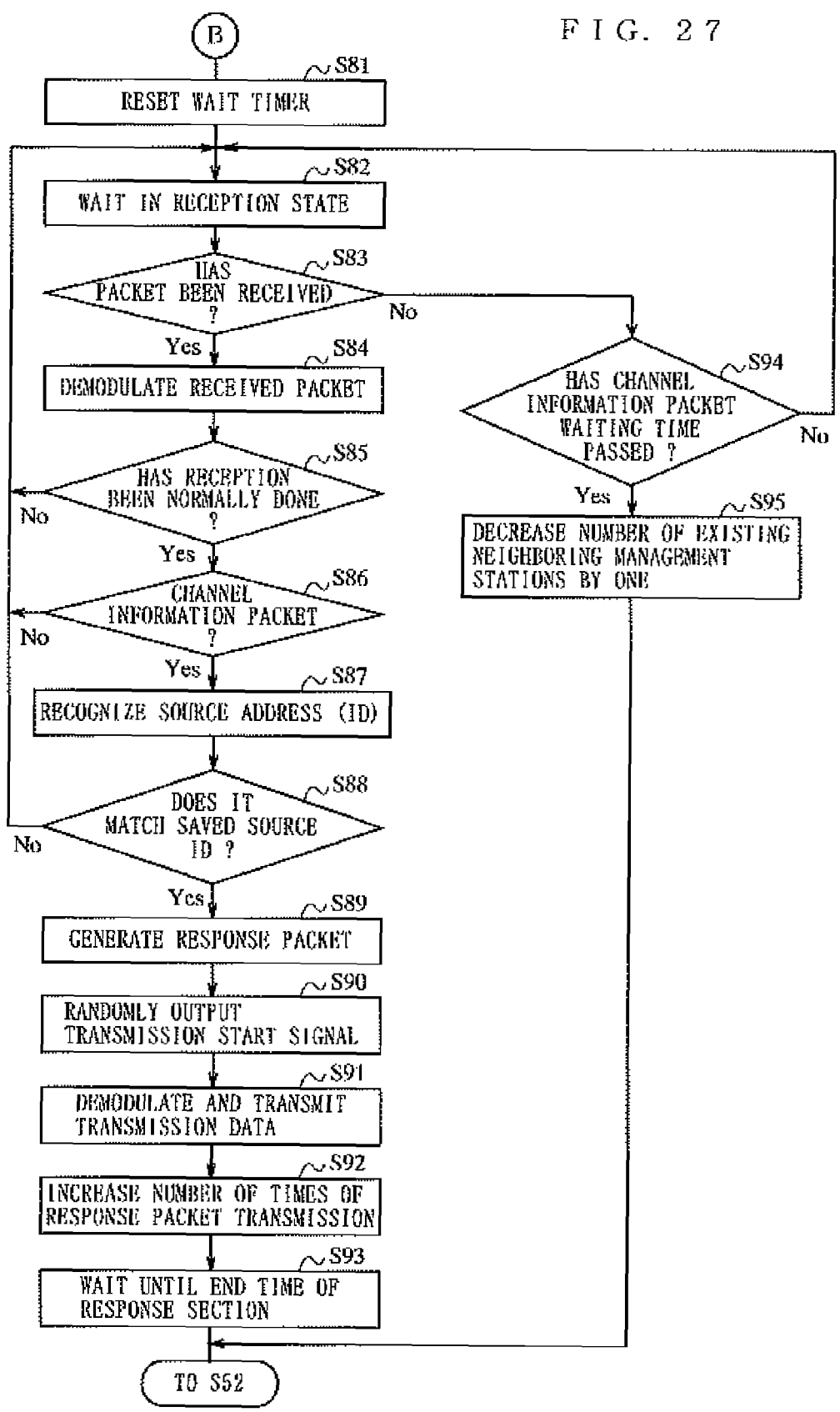
FIG. 27 is a flowchart showing an operation of the management station 1 when the number of existing neighboring management stations is larger than the number of times of transmission of a response packet.

On the other hand, if the number of existing neighboring management stations is larger than the response packet transmission count in step S52, the management station 1 goes to the operation of step S81 shown in FIG. 27.

FIG. 27 is a flowchart showing an operation of the management station 1 when the number of existing neighboring management stations is larger than the response packet transmission count.

The management station 1 resets the wait timer (step S81), and waits for reception of a packet (step S82) until the waiting time of a channel information packet elapses (No in step S94). If a packet is received (Yes in step S83), the demodulating section 33 demodulates the packet (step S84), and the packet determining section 34 performs CRC check with respect to the demodulated data. If the packet has been normally received (step S83), the packet determining section 34 references the packet identifier of the packet to determine whether or not the received packet is a channel information packet (step S86). If the received packet is not a channel information packet, the management station 1 returns to a waiting state (step S82).

On the other hand, if the received packet is a channel information packet, the packet determining section 34 recognizes the source management station ID (step S87), and passes the source management station ID to the symbol wave form/delay amount determining section 36. The symbol wave form/delay amount determining section 36 determines whether or not the received source management station ID matches any already stored existing neighboring management station ID (step S88). If the source management station ID does not match any already stored existing neighboring management station ID, the management station 1 returns to the reception waiting state (step S82). If the source management station ID matches any already stored existing neighboring management station ID, the symbol wave form/delay amount determining section 36 instructs the transmission packet processing section 40 to generate a response packet.

The transmission packet processing section 40 generates and stores a response packet (step S89). On the other hand, the transmission timing controlling section 38 generates a transmission start signal at a random timing, and passes the transmission start signal to the modulating section 21 (step S90).

The modulating section 21, when receiving the transmission start signal, reads out the transmit data of the response packet to generate a modulated signal. The modulated signal generated by the modulating section 21 is transmitted as a wireless signal via the RF section 32 and the antenna 31 (step S91). Thereafter, the symbol wave form/delay amount determining section 36 increments the response packet transmission count by one (step S92). Thereafter, the management station 1 waits until the end time of the response zone (step S93), and returns to the operation of step S52 shown in FIG. 26.

On the other hand, if a channel information packet has not been received from an existing neighboring management station even when the channel information packet waiting time has elapsed (Yes in step S94), the symbol wave form/delay amount determining section 36 decrements the stored number of existing neighboring management stations by one (step S95). Thereafter, the management station 1 returns to the operation of step S52 shown in FIG. 26.

Figure 28:
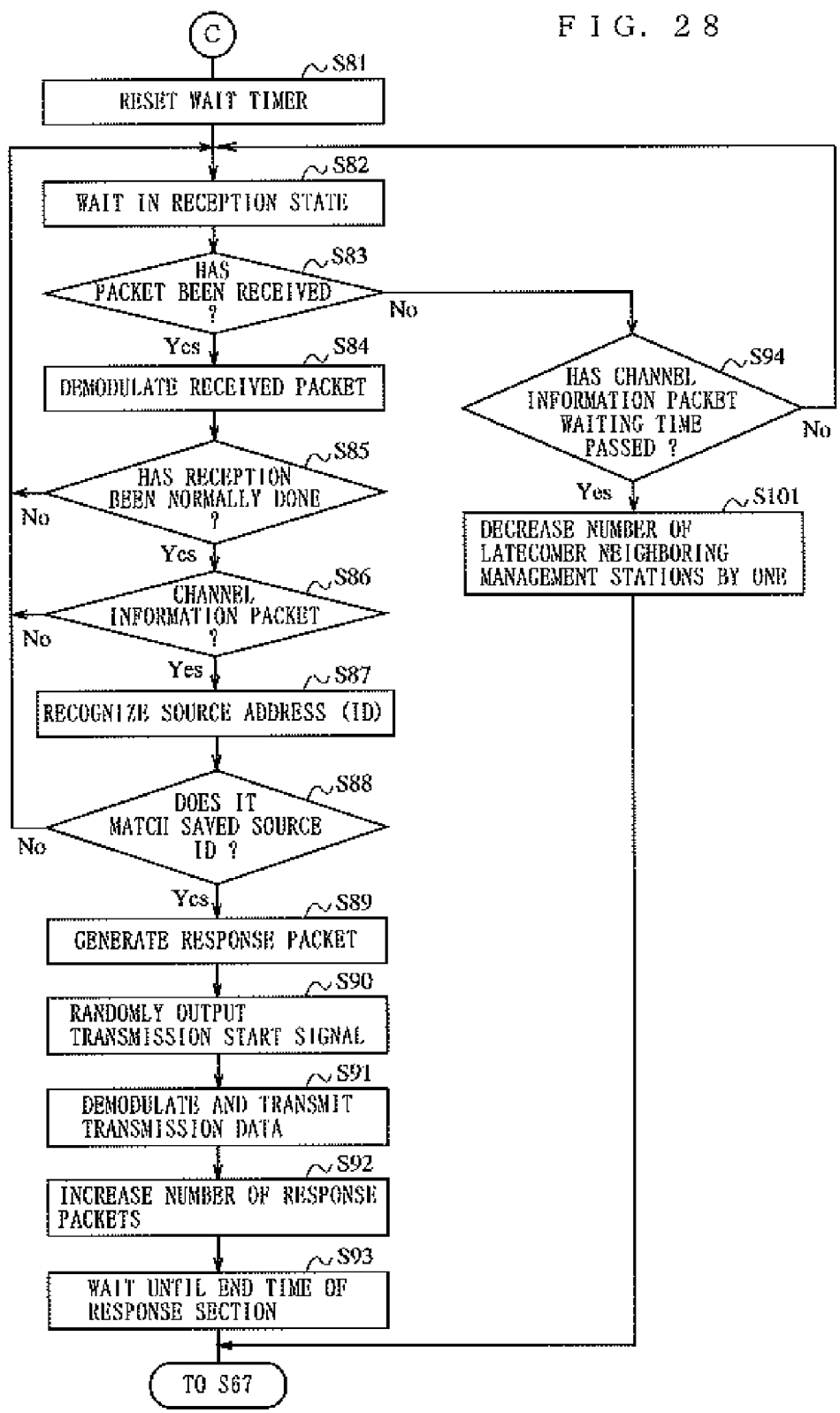
FIG. 28 is a flowchart showing an operation of the management station 1 when the number of latecomer neighboring management stations is larger than the number of times of transmission of a response packet.

FIG. 28 is a flowchart showing an operation of the management station 1 when the number of latecomer neighboring management stations is larger than the response packet transmission count.

In step S88 shown in FIG. 28, the symbol wave form/delay amount determining section 36 determines whether or not the received source management station ID matches any already stored neighboring management station ID. If the source management station ID does not match any already stored neighboring management station ID, the management station 1 returns to step S82. If the source management station ID matches any already stored neighboring management station ID, the management station 1 instructs the transmission packet processing section 40 to generate a response packet. Since the other operations in steps S81 to S94 shown in FIG. 28 are similar to those of the steps indicated by the same symbols of FIG. 27 and will not be described. If a channel information packet has not been received from the neighboring management stations whose IDs have already been stored even when the channel information packet waiting time has elapsed (Yes in step S94), the symbol wave form/delay amount determining section 36 decrements the stored number of latecomer neighboring management stations by one (step S101). The management station 1 then returns to the operation of step S67 shown in FIG. 26. Although the operation of the management station 1 has been heretofore described with reference to the flowcharts of FIGS. 25 to 28, the management stations 2 and 3 also operate in a similarly manner to that of the management station 1.

Figure 29:
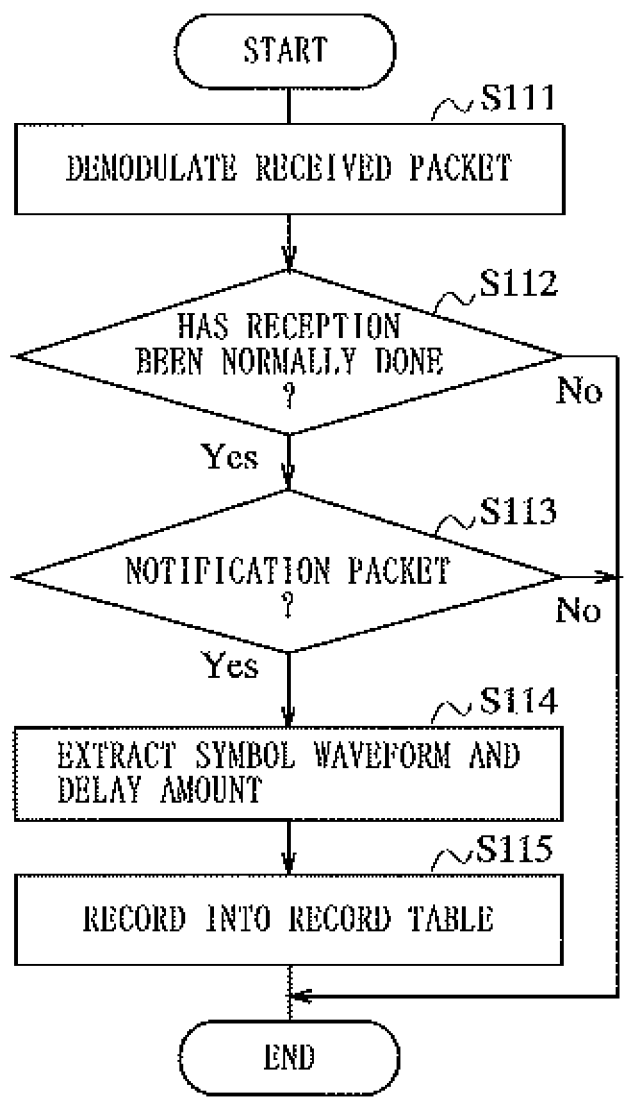
FIG. 29 is a flowchart showing an operation of the management station 2 that has received a notification packet.

FIG. 29 is a flowchart showing an operation of the management station 2 which has received the notification packet transmitted in step S66 of FIG. 26.

Initially, the symbol wave form/delay amount determining section 36 determines whether or not the packet that has been demodulated by the demodulating section 33 and has been determined that it has been normally received by the packet determining section 34 is a notification packet (steps S111 to S113). If the received packet is a notification packet, the symbol wave form/delay amount determining section 36 extracts a symbol waveform and a delay amount from the packet and records the symbol waveform and the delay amount into the record table 37 (steps S114 and S115). Although the operation of the management station 2 has been described in FIG. 29, the management stations 1 and 3 also operate in a manner similar to that of the management station 2.

Figure 30:
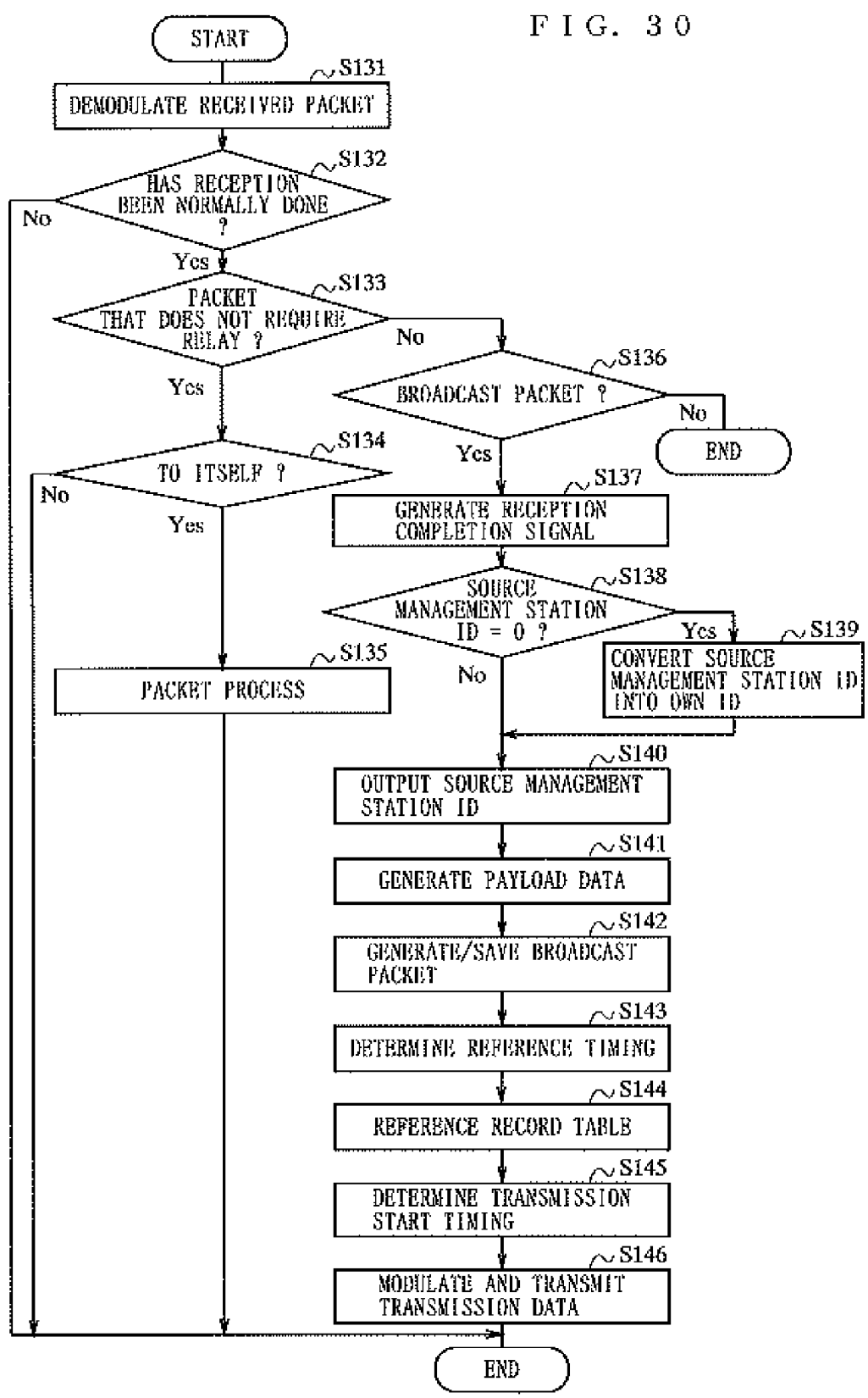
FIG. 30 is a flowchart showing an operation of the management station 1 during packet reception after a symbol waveform and a delay amount to be assigned to each management station is determined.

FIG. 30 is a flowchart showing an operation of the management station 1 during packet reception after a symbol waveform and a delay amount to be assigned to each management station has been determined by the operations of FIGS. 26 to 29.

In the management station 1, the demodulating section 33 demodulates a received baseband signal which has been received by the antenna 31 and output from the RF section 32 (step S131). The resultant baseband signal is referred to as demodulated data. The packet determining section 34 performs CRC check with respect to the demodulated data to determine whether or not a packet has been normally received (step S132). If the packet has not been normally demodulated, the management station 1 ends the process. On the other hand, if the packet has been normally demodulated, the packet determining section 34 references the packet identifier of the received packet to determine whether or not the packet does not need to be relayed (step S133).

If the received packet is a packet that does not need to be relayed, the packet determining section 34 references the destination address of the packet to determine whether or not the packet is addressed to the management station 1 (step S134). If the packet is not addressed to the management station 1, the management station 1 ends the process. If the packet is addressed to the management station 1, the packet determining section 34 passes the demodulated data to the own-packet processing section 35. The management station 1 performs a predetermined processing with respect to the demodulated data in the own-packet processing section 35 (step S135), and then ends the process.

On the other hand, in step S133, if the received packet is not a packet that does not need to be relayed, the packet determining section 34 references the packet identifier to determine whether or not the received packet is a broadcast packet (step S136). If the received packet is not a broadcast packet, the management station 1 ends the process. On the other hand, if the received packet is a broadcast packet, the packet determining section 34 generates a reception completion signal, and then passes the reception completion signal along with the identifier of the packet to the transmission timing controlling section 38 (step S137).

Thereafter, the packet determining section 34 references the source ID of the packet to determine whether or not the source management station ID is zero (step S138). If the source management station ID is not zero, the packet determining section 34 outputs the source management station ID to the transmission timing controlling section 38 (step S140). On the other hand, if the source management station ID is zero, the packet determining section 34 converts the source management station ID to the ID of the management station 1 (step S139), and outputs the converted ID as a source management station ID to the transmission timing controlling section 38 (step S140).

Also, the packet determining section 34 extracts data (the unique word and thereafter) shown in FIG. 2 from the demodulated data as payload data, and passes the payload data in which the source management station ID is optionally converted to the ID of the management station 1, to the transmission packet processing section 40 (step S141). The transmission packet processing section 40 adds a predetermined header to the payload data to generate and store a broadcast packet (step S142).

The transmission timing controlling section 38, when receiving a reception completion signal, determines a reference timing (step S143). Thereafter, the symbol wave form/delay amount determining section 36 references the record table 37 (step S144), notifies the modulating section 21 of a symbol waveform to be selected using a waveform bank selection signal, and determines a timing that is delayed from the reference timing by a delay amount assigned to the management station 1, as a transmission start timing (step S145). The transmission timing controlling section 38, when the transmission start timing arrives, generates and passes a transmission start signal to the modulating section 21. The modulating section 21, when receiving the transmission start signal, reads out the transmit data of a broadcast packet to generate a modulated signal. The modulated signal generated by the modulating section 21 is transmitted as a wireless signal via the RF section 32 and the antenna 31 (step S146).

Although the operation of the management station 1 has been described in FIG. 30, the management stations 2 and 3 also operate in a manner similar to that of the management station 1. Also, in step S139, since single station transmission of a broadcast packet is performed if the source management station ID is rewritten, the transmission timing controlling section 38 may generate a transmission start signal using a predetermined reference timing as a transmission start timing.

Figure 31C:
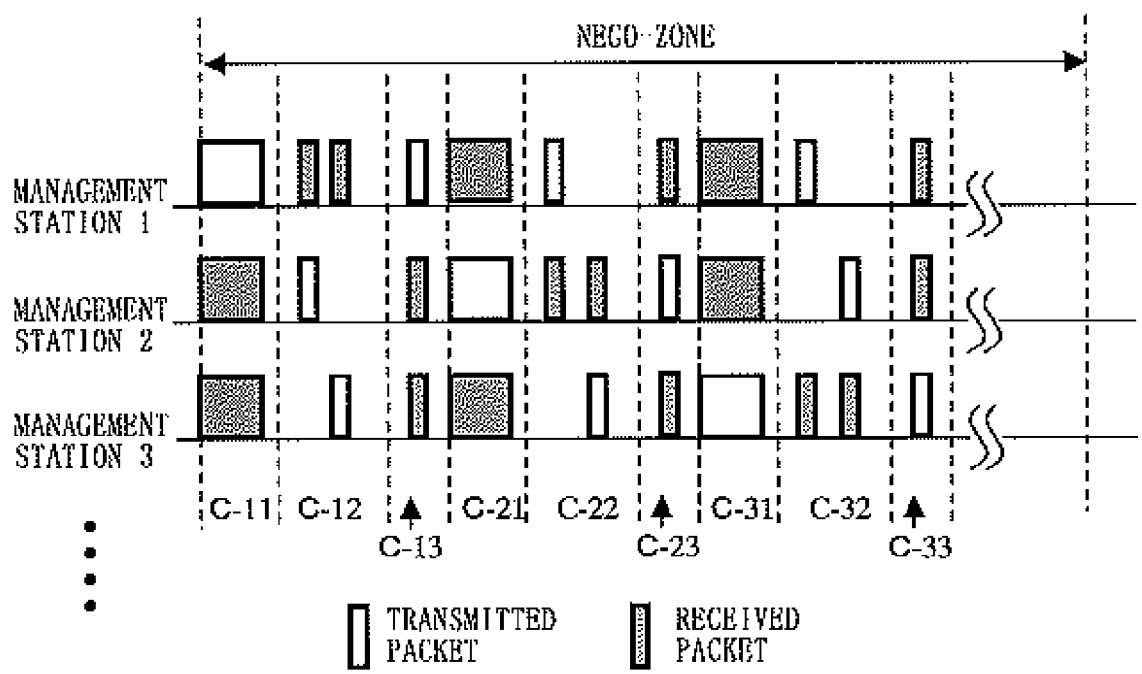
FIG. 31C is a diagram showing an exemplary negotiation procedure performed by the management station of the first embodiment.
Figure 32A:
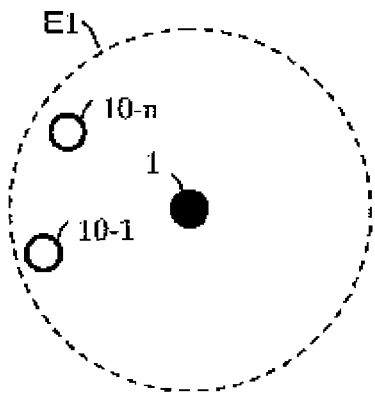
FIG. 32A is a diagram showing a configuration of a wireless transmission system corresponding to FIG. 31A.
Figure 32B:
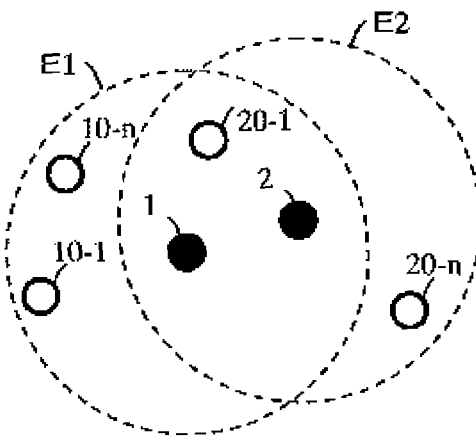
FIG. 32B is a diagram showing a configuration of a wireless transmission system corresponding to FIG. 31B.
Figure 32C:
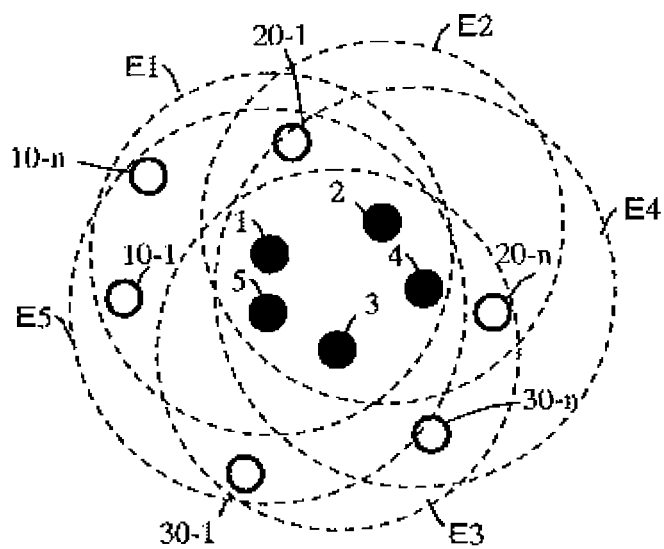
FIG. 32C is a diagram showing a configuration of a wireless transmission system corresponding to FIG. 31C.

FIGS. 31A to 31C are diagrams showing examples of a negotiation procedure from when one wireless system is generated to when the system configuration of FIG. 1 is created. FIGS. 32A to 32C are diagrams showing positional relationships between the management stations 1 to 3 and the terminal station 11 in the system configurations of FIG. 31A to 31C. Hereinafter, referring to FIGS. 31A to 31C and FIGS. 32A to 32C, a procedure in which the management stations 1 to 3 of FIG. 5 negotiate with each other to determine a symbol waveform and a delay amount to be assigned to each management station, will be described. Note that, in FIGS. 31A to 31C, an a packet indicating a procedure when the management stations 2 and 3 receive a channel information packet in the existing neighboring management station search mode, is not shown.

Firstly, if only the wireless transmission system of the management station 1 is present, the management station 1 transmits a channel information packet in a nego-zone by the procedure shown in FIG. 26 (FIGS. 31A and 32A).

Next, if the management station 2 capable of constructing a wireless transmission system is generated within the communication area E1 of the management station 1, the management station 2 observes the common channel for a predetermined period and searches for an existing neighboring management station by the procedure shown in FIG. 25. The predetermined period is, for example, one cycle time of a nego-zone or more. Thereafter, when receiving the channel information packet transmitted by the management station 1 (FIG. 31B: B-11), the management station 2 generates a response packet for notifying the neighboring stations that the channel information packet has been normally received, by the procedure shown in FIG. 27, and transmits the response packet within the predetermined response zone (FIG. 31B: B-12).

The management station 1 receives the response packet transmitted from the management station 2 in the response zone, and recognizes the number of relaying-capable stations by the procedure shown in FIG. 26 (FIG. 31B: B-12). In this case, since management stations that exist in the wireless transmission system are the management stations 1 and 2, i.e., two management stations, the number of response packets that are received by the management station 1 within the response zone is one. Therefore, since multi-station simultaneous transmission cannot be performed upon relay transmission of a broadcast packet, the management station 1 does not need to particularly determine a transmission timing of the management station 2. In this case, a broadcast packet transmitted from the management station 1 is received by the management station 2, and is simply relayed and transmitted by a single station at the reference timing T0 after time T1 previously defined by the system.

Based on a channel information packet received from the management station 1, the management station 2 determines a channel to be used in its own system such that interference with the management station 1 can be avoided. Thereafter, the management station 2 transmits a channel information packet by the procedure shown in FIG. 26 (FIG. 31B: B-21) a predetermined time after the end of the response zone (FIG. 31B: B-11, B-12). By the procedure shown in FIG. 28, the management station 1, when receiving the channel information packet transmitted by the management station 2 (FIG. 31B: B-21), transmits a response packet in the response zone (FIG. 31B: B-22). The management station 2 reaffirms that the management station 1 is present by receiving the response packet in the response zone (FIG. 31B: B-22). Thereafter, the management stations 1 and 2 transmit and receive a channel information packet and a response packet to and from each other in nego-zones provided regularly.

Next, as shown in FIGS. 32B and 32C, a case where the management station 3 capable of constructing a wireless transmission system is newly generated within the communication areas E1 and E2 formed by the management stations 1 and 2, will be described.

Initially, the management station 3 observes the common channel for a predetermined period, and searches for an existing neighboring management station by the procedure shown in FIG. 25. Thereafter, the management stations 2 and 3 receive a channel information packet transmitted from the management station 1 (FIG. 31C: C-11). By the procedure shown in FIG. 27, the management station 3 generates a response packet with respect to the channel information packet transmitted by the management station 1. Note that the management station 2 also generates a response packet in this zone. In the response zone, the management stations 2 and 3 transmit the response packets at random timings (FIG. 31C: C-12). FIG. 32C shows a case where management stations 4 and 5 are similarly generated. Note that communication areas of the management stations 4 and 5 are represented by E4 and E5.

The management station 1, when receiving response packets transmitted by the management stations 2 to 5 in a response zone, determines symbol waveforms and delay amounts to be assigned to the management stations 2 to 5 by the procedure shown in FIG. 26, and records the symbol waveforms and the delay amounts on the record table 37. Thereafter, in a zone immediately after the end of the response zone and until a channel information packet of another management station is transmitted, the management station 1 generates and transmits a notification packet including the determined symbol waveforms and delay amounts to the management stations 2 to 5 (FIG. 31C: C-13). The management stations 2 to 5, when receiving the notification packet transmitted by the management station 1, each extract the symbol waveforms and the delay amounts assigned to itself and the other stations during multi-station simultaneous transmission, by the procedure shown in FIG. 29, and record the symbol waveforms and the delay amounts into the record table 37 (FIG. 31C: C-13). Note that, in FIG. 31C, the packets transmitted and received by the management stations 1 to 3 are representatively shown and the packets transmitted and received by the management stations 4 and 5 are not shown.

Next, the management stations 1 and 3 receive the channel information packet transmitted by the management station 2 by the procedure shown in FIGS. 28 and 27, respectively (FIG. 31C: C-21). Thereafter, in C-22 and C-23 shown in FIG. 31C, by a procedure similar to that in C-12 and C-13 shown in FIG. 31C, a symbol waveform and a delay amount during multi-station relay transmission of a transmission packet of the management station 2 are recorded into the record table 37 of each management station. Next, the management stations 1 and 2 receive a channel information packet transmitted from the management station 3 by the procedure shown in FIG. 28 (FIG. 31C: C-31). Thereafter, by a procedure similar to that in C-12 and C-13 of FIG. 31C, a symbol waveform and a delay amount during multi-station relay transmission of a transmission packet of the management station 3 are recorded into the record table 37 of each management station (FIG. 31C: C-32 and C-33). Such a procedure is similarly performed with respect to the management stations 4 and 5. Thereafter, the management stations 1 to 5 transmit and receive channel information packets and response packets to and from each other in nego-zones provided regularly.

Figures 33A, 33B:
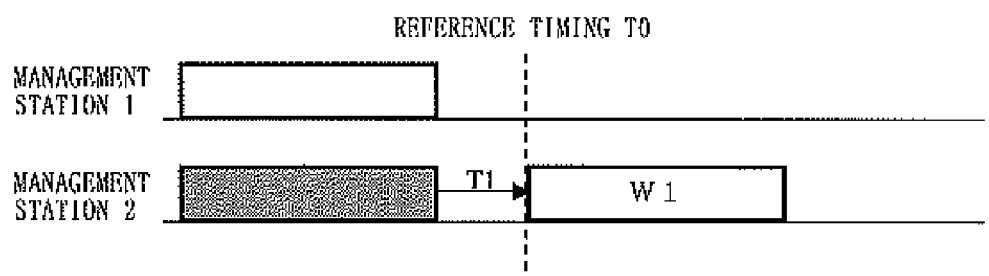
FIG. 33A is a diagram showing a structure of a record table held by the management station of the first embodiment.
FIG. 33B is a diagram showing an exemplary multi-station simultaneous transmission timing in the first embodiment.

FIG. 33A is a diagram showing a structure of the record table 37 that is held by the management stations 1 to 5. It is, for example, assumed that if the management station 1 is a packet source, the management station 2, when relaying and transmitting a packet, uses a symbol waveform W1 and sets a reference timing T0 delayed by T1 from the packet of the source to be a transmission start timing. On the other hand, the management station 3, when relaying and transmitting a packet, uses the symbol waveform W1 and sets a timing delayed by T2 from the packet of the source (i.e., a timing delayed by the delay amount τ(T2−T1) from the reference timing T0) to be a transmission start timing. Note that the delay amount τ is an appropriate value that provides the path diversity effect on the receiver's side, i.e., a value not less than a predetermined delay resolution and not more than a predetermined maximum delay. Similarly, the management station 4 uses a symbol waveform W2 and sets the reference timing T0 to be a transmission start timing, and the management station 5 uses the symbol waveform W2 and sets a timing delayed by the delay amount τ from the reference timing T0 to be a transmission start timing.

Thus, if the same symbol waveform is caused to arrive at a wireless station on the receiver's side at timings T1 and T2 delayed by the appropriate delay τ and different symbol waveforms are used for arriving waves at the same timing, the maximum path diversity effect corresponding to the four combinations can be obtained. Thus, the symbol wave form/delay amount determining sections 36 of the management stations 1 to 5 recognize a management station capable of performing multi-station simultaneous transmission, determines a plurality of symbol waveforms and delay amounts when the recognized management station performs multi-station simultaneous transmission, and notifies other management stations of the symbol waveforms and the delay amounts. These other management stations store the notified symbol waveforms and delay amounts into the record tables.

FIG. 33B is a diagram showing a transmission/reception timing of a packet when only the management station 2 relays and transmits a broadcast packet transmitted by the management station 1 in the positional relationship shown in FIG. 32B. The management station 2, when relaying and transmitting a packet, transmits the packet without giving a delay amount from the reference timing T0. Any symbol waveform may be used. In FIG. 33B, W1 is shown as an example.

Figure 33C:
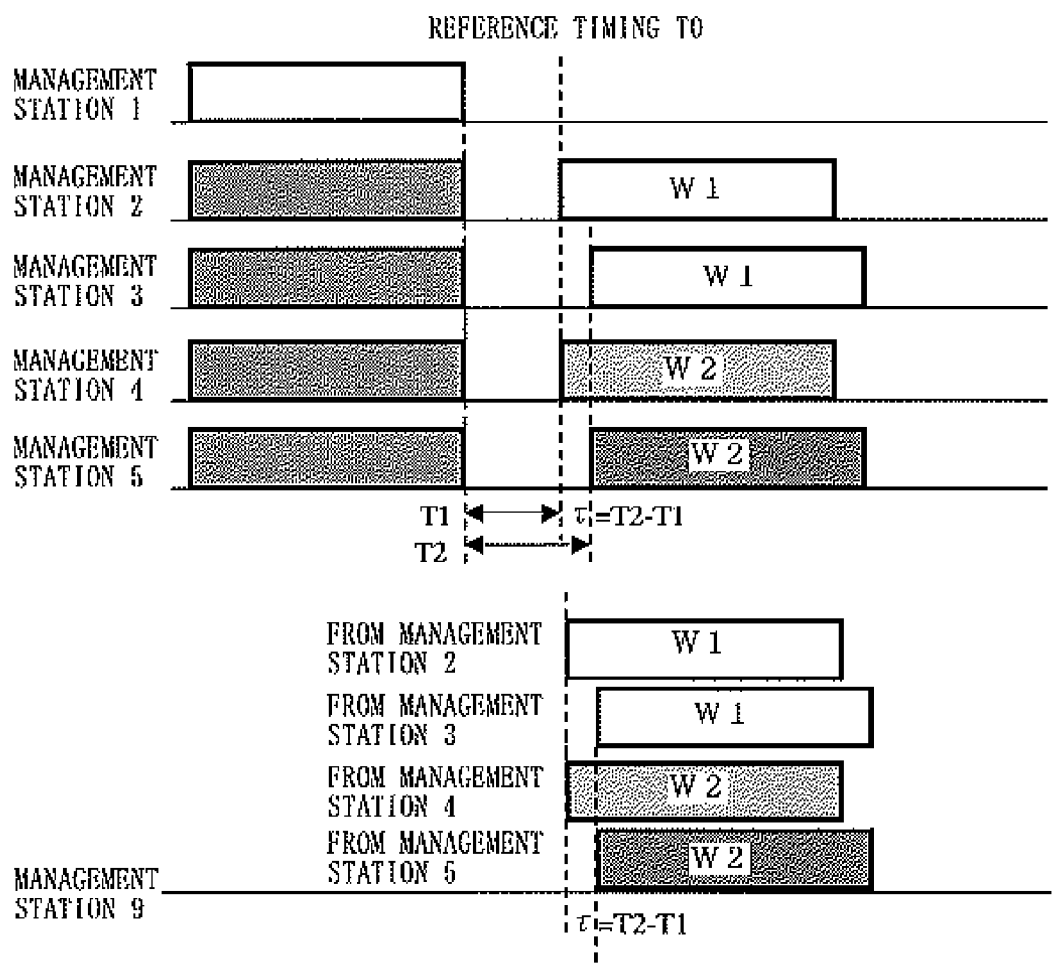
FIG. 33C is a diagram showing an exemplary multi-station simultaneous transmission timing in the first embodiment.

FIG. 33C is a diagram showing a transmission/reception timing of a packet when the management stations 2 and 3 relay and transmit a broadcast packet transmitted by the management station 1 in the positional relationship shown in FIG. 32C. The management stations 2 to 5 perform multi-station simultaneous transmission of a broadcast packet in accordance with the delay amount record table of FIG. 33A.

As shown in FIG. 33C, the transmission start timing of the management stations 2 and 4 is the reference timing T0, and the transmission start timing of the management stations 3 and 5 is a timing after the delay amount τ elapses from the reference timing T0. Since the management stations 2 to 5 are located so close to each other that the propagation time can be ignored as compared to the delay amount τ, packets transmitted from two management stations using the same symbol waveform arrive at a receiving station (for example, the management station 9) with a value very close to an appropriate transmission time difference τ which can provide the path diversity effect. Therefore, the receiving station can provide a path diversity effect having the maximum effective branch number for each symbol waveform (here, two paths), and by using different symbol waveforms, obtains a maximum diversity effect having an increased number of four paths, thereby receiving a packet more reliably.

As described above, according to the first embodiment, each management station perform negotiation before multi-station simultaneous transmission is performed to determine a symbol waveform and a transmission timing for the management station during multi-station simultaneous transmission. A plurality of delay amounts used for determination of transmission timings are set so that a difference between each delay amount may be a predetermined delay resolution or more, and a difference between the maximum and minimum values of the delay amounts may be a predetermined maximum delay, for each symbol waveform. Therefore, even when a positional relationship between management stations changes or the number of management stations that perform multi-station simultaneous transmission changes because a management station moves, data simultaneously transmitted from multiple stations is received by a receiving station with an arrival time difference that can reliably provide the path diversity effect. In addition, a path diversity effect having a maximum number of branches increased by multiplication by the number of different symbol waveforms, is obtained. Therefore, in a multi-station simultaneous transmission system in which a plurality of wireless stations arranged close to each other transmit the same data, the path diversity effect can be obtained to the maximum extent and with reliability even when a positional relationship between wireless stations or the number of wireless stations that perform multi-station simultaneous transmission of data changes.

Note that, in the first embodiment, if at least one management station (for example, the management station 1) among management stations determines a combination of a symbol waveform and a delay amount from a reference timing that are to be used for multi-station simultaneous transmission in a wireless transmission system, depending on a response packet with respect to a channel information packet transmitted by itself or other stations, it is possible to cause the management stations 2 to 5 to perform multi-station simultaneous transmission of data whose source is the management station 1.

Also, in the first embodiment, a system has been described in which there exists an exchange region existing regardless of the availability of multi-station simultaneous transmission between management stations, such that management stations transmit a channel information packet in a negotiation zone and return a response packet with respect to the packet. In this system, as one example, channel information confirmation zones of C-12, C-22 and C-32 of FIG. 31C, in which a response packet is returned with respect to a channel information packet, are used as a multi-station situation confirmation zone for confirming how many other management stations can perform relay transmission when a management station performs transmission. Also, it has been assumed and described that a response packet with respect to a channel information packet is also used as a response packet for confirming situations of multiple stations to determine a combination of a symbol waveform and a delay amount from a reference timing that are used during the multi-station transmission of each management station. Here, it is also possible to transmit a multi-station simultaneous transmission request packet for searching for a management station capable of performing simultaneous transmission within a negotiation zone, to provide a separate region in which a response packet is returned with respect to the packet, and to appropriately set a symbol waveform and a transmission timing of each management station during multi-station simultaneous transmission by a procedure similar to that described above. However, as compared to such a method, according to the first embodiment, each management station also uses a negotiation packet that is used in a negotiation zone regardless of multi-station transmission, as a multi-station simultaneous transmission request packet and its response packet, or for setting of a combination of a symbol waveform and a delay amount from a reference timing that are used during multi-station simultaneous transmission, thereby suppressing a reduction in transmission efficiency that is caused by setting separately.

Also, in the first embodiment, it has been assumed and described that a plurality of management stations located in a mutual communication area certainly relay and transmit a broadcast packet transmitted from another management station. Here, each management station may not perform relay transmission at its own inconvenience, though it can receive a broadcast packet. In this case, information indicating whether or not relay transmission can be performed may be included in the response packet described above.

Although it has been assumed and described in the first embodiment that the number of management stations capable of communicating with each other is five, the number of management stations may be six or more. Even in this case, a symbol waveform and a delay amount of each management station can be determined by repeating the procedures of C-11 to C-13, C-21 to C-23 and C-31 to C-33 of FIG. 31C the number of management stations.

Figure 34:
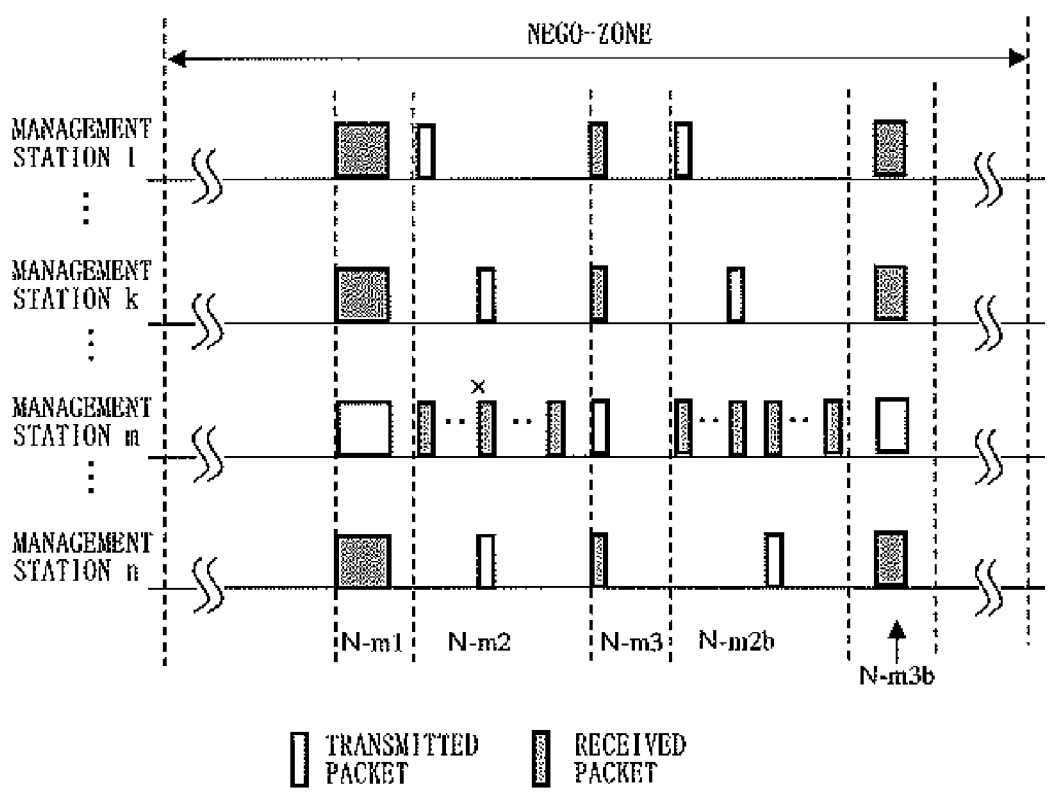
FIG. 34 is a diagram showing transmission and reception timings of packets when response packets collide with each other.

Also, in the first embodiment, each management station that has received a channel information packet transmits a response packet at a random timing in a response zone. Therefore, response packets may rarely collide with each other in the response zone. FIG. 34 is a diagram showing transmission and reception timings of packets when response packets collide with each other. As shown in FIG. 34, if response packets transmitted by a plurality of management stations collide with each other in a response zone of N-m2, a packet may not be normally received. In this case, for example, a management station m that has transmitted a channel information packet may transmit a response packet retransmission request packet immediately after the end of a response zone as in N-m3 of FIG. 34, and a management station capable of performing relay transmission to the management station m may transmit a response packet again at a random timing. By repeating this procedure until the management station that has transmitted the channel information packet can normally receive response packets of all management stations capable of performing relay transmission, symbol waveforms and delay amounts to be assigned to all management stations that relay a packet transmitted by a management station can be determined. Note that, in order to avoid a situation such that negotiation among all the management stations is not completed in a nego-zone due to successive collisions, it is desirable to put an upper-limit onto the number of times of retransmission of a response packet.

Note that when the number of response packets from neighboring management stations that has been normally received, in a response section exceeds the maximum number of effective branches that allow the path diversity effect, where the maximum effective branch number is increased by multiplication by the combinations of a symbol waveform and a timing, then if an intermediate timing value is provided in addition to a timing for each symbol waveform (here, T1 and T2), a deterioration conversely occurs. In such a case, an overlapping timing may be provided from pairs of a symbol waveform and a delay amount. Alternatively, in such a case, it is desirable that the management station m that has transmitted a channel information packet does not transmit a response packet retransmission request packet even when collision of response packets occurs in a response zone. In this case, the management station m may transmit a notification packet including a symbol waveform and a delay amount only to a neighboring management station(s) that has normally received the channel information packet. Thus, for a management station that determines a symbol waveform and a delay amount, if the number of management stations capable of performing multi-station simultaneous transmission is larger than the multiplied maximum effective branch number, the number of wireless stations determined to be capable of multi-station simultaneous transmission may be smaller than or equal to the maximum effective branch number. Note that a management station which has received a notification packet, if a symbol waveform and a delay amount with respect to the management station are not present in the packet, may not perform relay transmission of a broadcast packet even when the broadcast packet is received from a management station which has transmitted the notification packet.

Although it has also been assumed and described in the first embodiment that a management station manages a terminal station existing in its own communication area, the management station may just have capability to manage a terminal station, and a terminal station to be managed by the management station may not necessarily exist. This is because, for example, during a process in which a management station newly constructs a wireless transmission system, a terminal station may not exist in a communication area formed by the management station.

Moreover, a data sequence that is sent by multi-station simultaneous transmission by a plurality of management stations may not necessarily require perfect matching, and a portion thereof for which transmission characteristics are improved by performing multi-station simultaneous transmission to increase the reliability of data transmission may be the same.

Variation of First Embodiment

It has been assumed and described in the first embodiment that each management station transmits a symbol waveform/delay amount notification packet every time it receives a response packet from other management stations. Here, transmission of a symbol waveform and a delay amount may be performed only when a management station is newly generated or when an existing management station disappears. In this variation, each management station generates a symbol waveform/delay amount notification packet only when a management station is newly generated or when an existing management station disappears. Note that management stations 1 to 5 have a configuration similar to that of the first embodiment, and therefore, FIG. 5 will be referenced.

Figure 35:
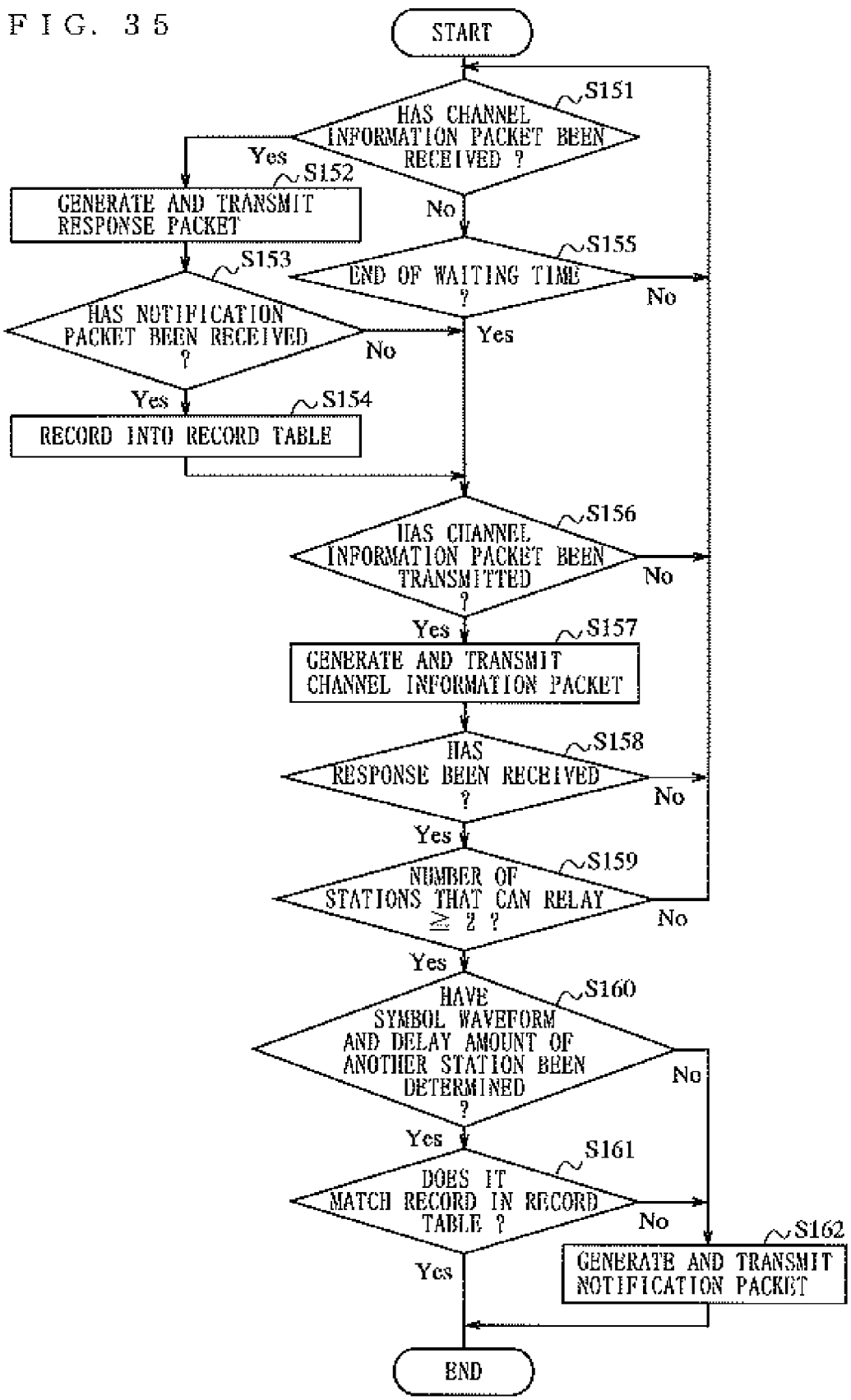
FIG. 35 is a flowchart showing an operation of a management station 1 according to a variation of the first embodiment.

FIG. 35 is a flowchart showing an operation of the management station 1 according to a variation of the first embodiment of the present invention. Initially, the management station 1 determines whether or not a channel information packet has been received from another management station (step S151). If a channel information packet has not been received, the management station 1 determines whether or not a predetermined waiting time has elapsed (step S155). If the waiting time has not elapsed, the process returns to the operation of step S151. On the other hand, if the waiting time has elapsed, the management station 1 goes to an operation of step S156.

On the other hand, in step S151, if a channel information packet has been received, the management station 1 generates and transmits a response packet (step S152). Thereafter, the management station 1 determines whether or not a notification packet including a symbol waveform and a delay amount has been received (step S153). If the notification packet has been received, the management station 1 extracts a neighboring management station ID and the symbol waveform and the delay amount from the notification packet and record them into the record table 37 (step S154), and goes to the operation of step S156.

The management station 1 determines whether or not to transmit a channel information packet (step S156). Here, if a symbol waveform and a delay amount are not recorded in the record table 37, the management station 1 recognizes, in step S156, that only one existing neighboring management station is present, and determines to transmit a channel information packet. On the other hand, if a symbol waveform and a delay amount are recorded in the record table 37, the management station 1 recognizes, in step S156, that two or more existing neighboring management stations are present, and determines not to transmit a channel information packet until a channel information packet will be received from all other management stations recorded in the record table 37.

When determining to transmit a channel information packet, the management station 1 generates and transmits a channel information packet (step S157), and determines whether or not a response packet has been received (step S158). If a response packet has not been received in a response zone, the management station 1 returns to the operation of step S151. On the other hand, if a response packet has been received, the management station 1 determines whether or not the number of relaying-capable stations is two or more from the number of received response packets (step S159). If the number of relaying-capable stations is one or less, the management station 1 returns to the operation of step S151.

On the other hand, if the number of relaying-capable stations is two or more, the management station 1 determines whether or not symbol waveforms and delay amounts of other management stations have been determined where the management station 1 serves as a source management station (step S160). If the symbol waveforms and delay amounts of other management stations have already been determined, the management station 1 determines whether or not a management station ID recorded in the record table matches the ID of a relaying-capable station obtained from the source ID of the response packet received in step S158 (step S161). If both IDs match each other, the management station 1 ends the process. If not, the management station 1 generates and transmits a notification packet to other management stations (step S162). Also, in step S160, if the symbol waveforms and delay amounts of other management stations have not been determined, the management station 1 similarly generates a notification packet in step S162.

As described above, according to the variation of the first embodiment of the present invention, even if two or more relaying-capable stations are present, only when the symbol waveforms and delay amounts of other management stations have not been yet determined or when the ID of a management station of a source of a response packet is different from any ID recorded in the record table, the management station generates and transmits a notification packet. Specifically, only when the symbol waveforms and delay amounts of other management stations are first determined or when the recorded ID of a stored neighboring management station is different from the source ID of the received response packet due to an increase/decrease or an exchange of a neighboring management station, a notification packet is transmitted. In the first embodiment, since it is necessary to prepare an area, such as C-13, C-23 and C-33 of FIG. 31C, for transmitting a notification packet within a negotiation zone, a reduction in transmission efficiency due to determination of a symbol waveform and a delay amount during multi-station simultaneous transmission occurs to slight extent. According to this variation, however, since it is not necessary to prepare an area for transmitting a notification packet within a negotiation zone each time, a reduction in transmission efficiency is suppressed as compared to the first embodiment.

Second Embodiment

A wireless transmission system according to a second embodiment of the present invention is different from the first embodiment in that, after a management station transmits a packet, when other management stations relay and transmit the packet, the source management station also transmits the same packet again.

FIGS. 36A and 36B are diagrams showing exemplary multi-hop transmission in the wireless transmission system of the second embodiment of the present invention. As shown in FIGS. 36A and 36B, a management station 1 that is a source management station, after transmitting a packet to be relayed and transmitted to management stations 2 to 4, retransmits this packet to a destination station. Note that since the configurations of the wireless transmission system and the management station of the second embodiment are similar to those of the first embodiment, FIGS. 1A and 1B and FIG. 5 will be referenced.

A management station that relays and transmits a packet sets a timing after a predetermined time T1 has elapsed since completion of reception of a broadcast packet as a reference timing T0. Also, a management station that is a source management station of a packet sets a timing after the predetermined time T1 has elapsed since transmission of a packet as a reference timing T0. These two reference timings are the same.

Figure 37A:
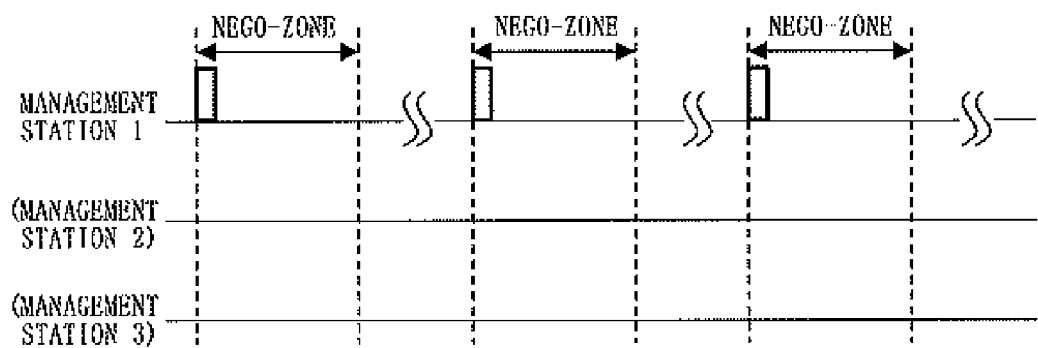
FIG. 37A is a diagram showing an exemplary negotiation procedure performed by a management station of the second embodiment.
Figure 37B:
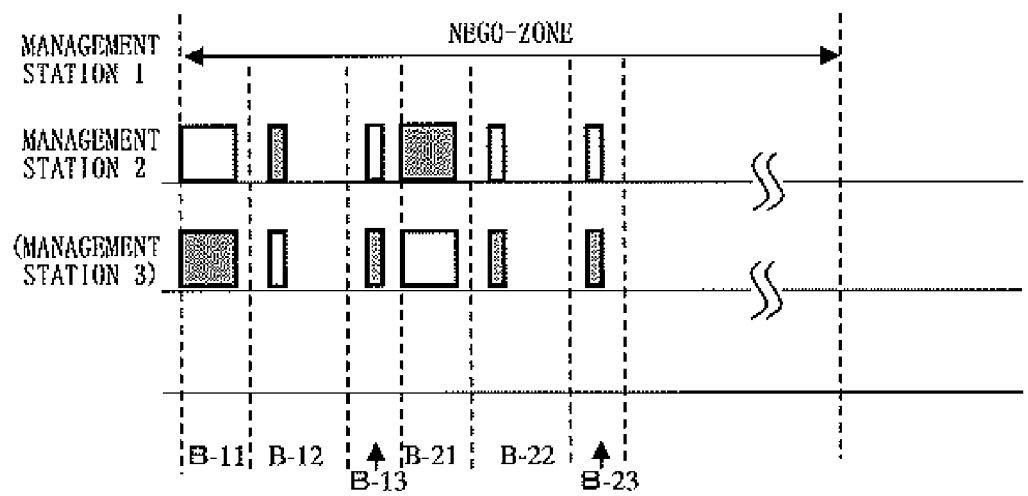
FIG. 37B is a diagram showing an exemplary negotiation procedure performed by the management station of the second embodiment.
Figure 37C:
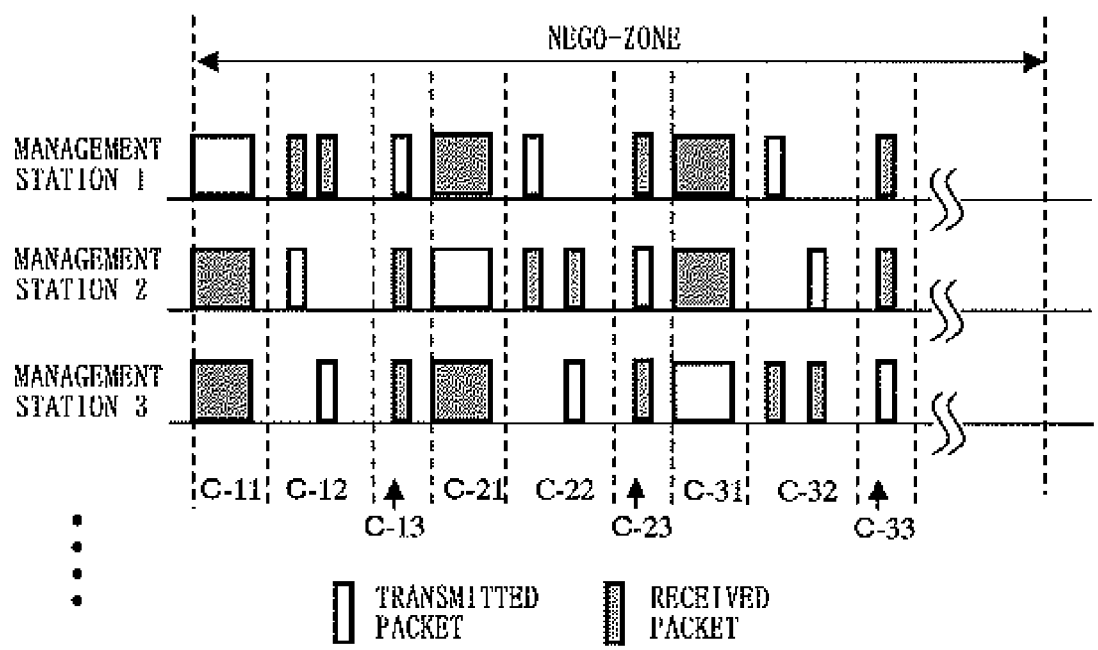
FIG. 37C is a diagram showing an exemplary negotiation procedure performed by the management station of the second embodiment.

FIGS. 37A to 37C are diagrams showing an exemplary negotiation procedure performed by the management station of the second embodiment. Since a change of the system configuration will be described by use of an example similar to that of the first embodiment, FIGS. 32A to 32C will be referenced. Hereinafter, referring to FIGS. 32A to 32C and FIGS. 37A to 37C, an operation and a procedure of each management station until the management stations 1 to 4 of the second embodiment negotiate with each other to determine a symbol waveform and a delay amount of each management station during multi-station simultaneous transmission will be described, focusing on a difference between the first and second embodiments.

Firstly, as shown in FIG. 32A, an operation of the management station 1 when only the system of the management station 1 exists is similar to that of the first embodiment.

The operation of the management stations 1 to 4 of the second embodiment differs from that of the first embodiment in the operation of step S63 in the flowchart shown in FIG. 26. The management stations 1 to 3 of the second embodiment determine in step S63 whether or not the number of relaying-capable stations is one or more. If the number of relaying-capable stations is one or more, the process goes to the operation of step S64 and thereafter, and a notification packet including a symbol waveform and a delay amount is generated and transmitted. Since the other operations are similar to those of the first embodiment, FIGS. 26 to 30 will be referenced.

If the system configuration changes from a state shown in FIG. 32A to a state shown in FIG. 32B, the management station 2 that newly constructs a system, when receiving a channel information packet transmitted by the management station 1, generates a response packet, and transmits the response packet in a response zone (FIG. 37B: B-12). The management station 1 recognizes that the number of management stations capable of relaying and transmitting a transmission packet of the management station 1 is one, based on neighboring station information notified of by the end time of the response zone.

In the first embodiment, if only one relaying-capable management stations is present, symbol waveforms and delay amounts assigned to other management stations are not determined. In the second embodiment, since the management station that is also a source management station retransmits a packet, multi-station simultaneous transmission can be performed during relay transmission even when only one relaying-capable management stations is present. Therefore, in the management station 1, the symbol wave form/delay amount determining section 36 determines a delay amount of the management station 2 as a timing T2 that is shifted by an appropriate amount τ from the reference timing, and records the delay amount into the record table 37 and notifies the transmission packet processing section 40 of the delay amount. Also, in this case, the symbol wave form/delay amount determining section 36 also determines a symbol waveform and a delay amount to be assigned to the management station 1.

Thereafter, the management station 1 transmits a notification packet including the determined symbol waveform and delay amount to the management station 2 in a zone extending immediately after the end of a response zone and until a channel information packet of the management station 2 is transmitted (FIG. 37B: B-13). This point is different from the first embodiment. In the second embodiment, the operation and procedure of FIG. 31C are already performed in the state of FIG. 32B, and each management station determines a symbol waveform and a delay amount to be given to a packet during multi-station simultaneous transmission. The operations and the procedures after B-13 shown in FIG. 37B are the same as those after C-13 shown in FIG. 31C of the first embodiment, except that a symbol waveform and a delay amount to be assigned to the management station 1 are determined during multi-station simultaneous transmission, and a notification packet including these values is transmitted at B-13 and B-23 of FIG. 37B, and will not be described in detail.

Next, a case where the system configuration changes from the state of FIG. 32B to the state of FIG. 32C is similar to that in the first embodiment (FIG. 37C), except that a symbol waveform and a delay amount to be assigned to a source management station itself are determined as a transmission timing during multi-station simultaneous transmission, and will not be described.

Figures 38A, 38B:
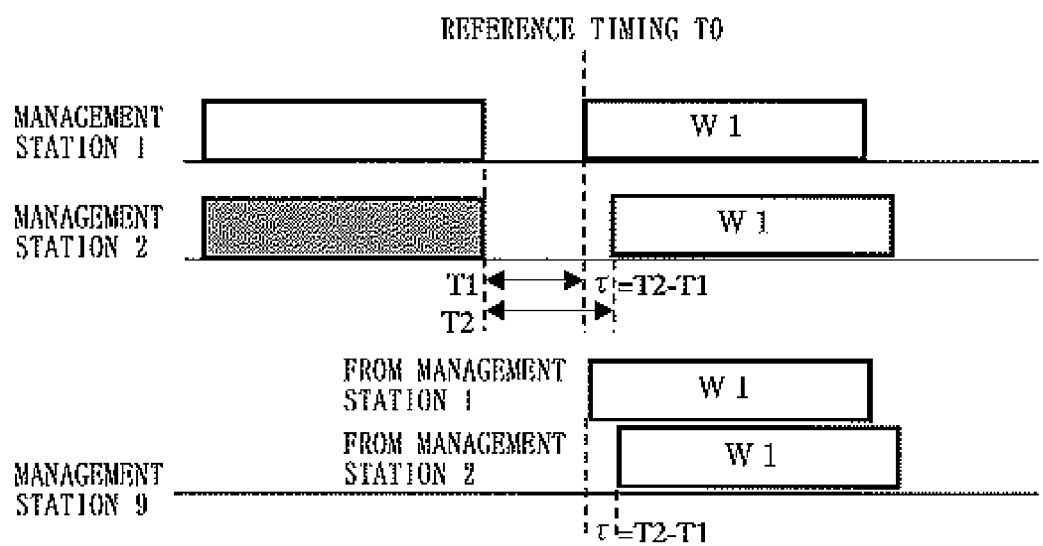
FIG. 38A is a diagram showing an exemplary structure of a record table held by the management station of the second embodiment.
FIG. 38B is a diagram showing an exemplary multi-station simultaneous transmission timing in the second embodiment.

FIG. 38A is a diagram showing an exemplary record table when the management stations 1 and 2 in the positional relationship of FIG. 32B set a symbol waveform and a delay amount by the procedure shown in FIG. 37B.

The management stations 1 and 2 reference the record table shown in FIG. 38A to determine a symbol waveform and a delay amount to be given to a packet when other stations relay and transmit the packet. For example, if the management station 1 is a source management station of a packet, the management station 2, when relaying and transmitting the packet received from the management station 1, transmits the packet with a symbol waveform W1 and at a timing T2 that is delayed by τ from the reference timing T0.

Figure 38C:
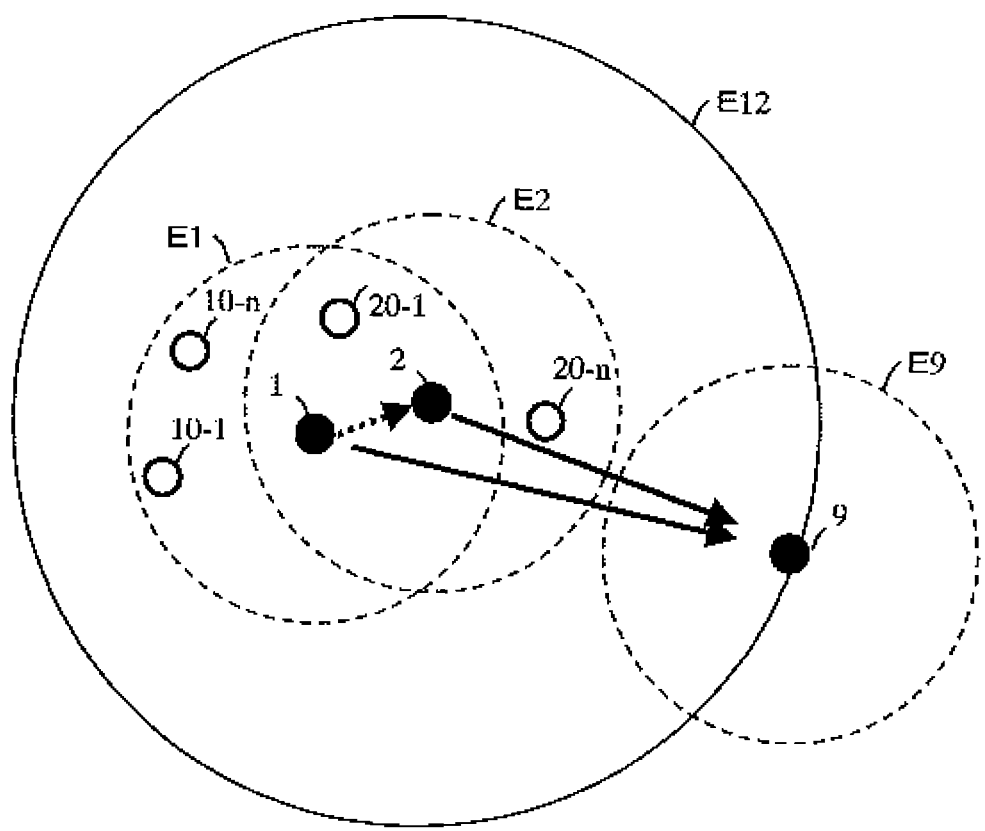
FIG. 38C is a diagram showing how multi-station simultaneous transmission is performed in the second embodiment.

FIG. 38B is a diagram showing transmission timings of a broadcast packet where, in the management stations 1, 2 and 9 having a positional relationship shown in FIG. 38C, the broadcast packet is transmitted from the management station 1, is relayed by the management station 2, and reaches the management station 9. It is here assumed that the management stations 1 and 2 hold the record table of FIG. 38A.

As shown in FIG. 38B, the management station 2, when receiving the broadcast packet transmitted from the management station 1, determines a transmission start timing by a procedure similar to that of the first embodiment. The management station 1 sets the reference timing T0 that is a timing after a predetermined time T1 elapses from the timing when the broadcast packet is transmitted, as a transmission timing, and transmits the broadcast packet at the transmission timing. The management stations 1 and 2 are located so close to each other that a propagation time can be ignored as compared to an appropriate time difference that can provide the path diversity effect. Therefore, the management station 9 receives the packets transmitted from the two management stations with an arrival time difference having a value very close to the appropriate transmission time difference τ that provides the path diversity effect. Therefore, the management station 9 can obtain the path diversity effect to the maximum extent.

Figures 39A, 39B:
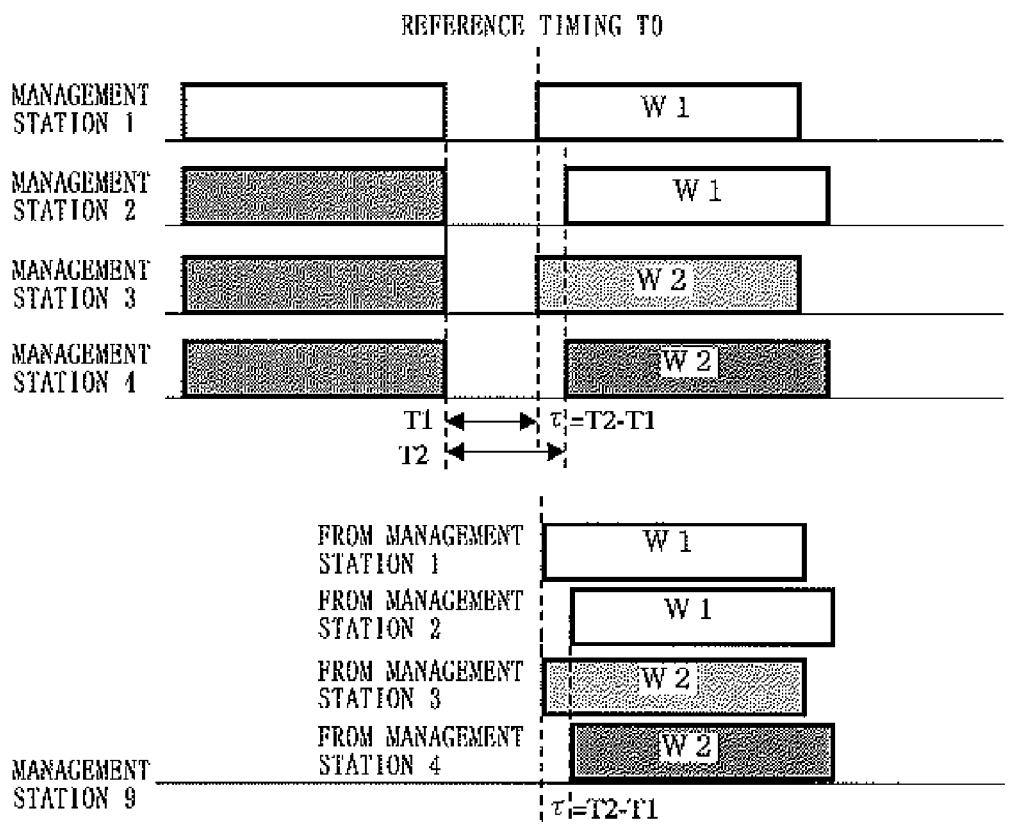
FIG. 39A is a diagram showing an exemplary structure of a record table held by the management station of the second embodiment.
FIG. 39B is a diagram showing an exemplary multi-station simultaneous transmission timing in the second embodiment.

FIG. 39A is a diagram showing an exemplary record table when the management stations 1 to 4 in the positional relationship shown in FIG. 36B set a symbol waveform and a delay amount by the procedure shown in FIG. 37C. Note that, also in the second embodiment, the wireless transmission system will be described as a system in which the maximum number of effective branches per symbol waveform contributing to the path diversity effect is two (timings T1 and T2), and there are two symbol waveforms (W1 and W2).

FIG. 39B is a diagram showing a timing when the management stations 1 to 4 in the positional relationship shown in FIG. 36B perform multi-station simultaneous transmission of a broadcast packet in accordance with the record table shown in FIG. 39A.

As shown in FIG. 39B, the management station 1 that is a source of a broadcast packet sets a timing after a predetermined time T1 elapses from a timing when the broadcast packet is transmitted, as a reference timing T0. The management station 1 transmits a broadcast packet using the symbol waveform W1 at the reference timing as a transmission start timing. The management station 2 transmits the broadcast packet transmitted from the management station 1 at a timing delayed by a delay amount τ from the reference timing T0 as a transmission start timing, using the symbol waveform W1. The management station 3 transmits the broadcast packet at the reference timing T0 as a transmission start timing, using the symbol waveform W2. The management station 4 transmits the broadcast packet at a timing delayed by a delay amount τ from the reference timing T0 as a transmission start timing, using the symbol waveform W2.

Since the management stations 1 to 4 are located so close to each other that the propagation time can be ignored as compared to the appropriate time difference τ that can provide the path diversity effect, any two of the packets transmitted from the four management stations arrive at the management station 9 with an appropriate time difference. Specifically, for the same symbol waveform, packets arrive at a wireless station on the receiver's side at the timings T1 and T2 that are shifted from each other by the appropriate delay t, and for different symbol waveforms, packets arrive at the same timing. Thus, a maximum path diversity effect corresponding to four combinations can be obtained. Therefore, the management station 9 can obtain the path diversity effect to the maximum extent.

As described above, according to the second embodiment of the present invention, each management station determined as a management station capable of performing multi-station simultaneous transmission also determines a symbol waveform and a delay amount given to its own data, and a source management station retransmits a broadcast packet. Therefore, even when only one relaying-capable management station is present, multi-station simultaneous transmission can be performed by providing an appropriate time difference, so that the path diversity effect can be obtained to the maximum extent and with reliability. Also, even when the number of relaying-Capable is smaller than the maximum number of effective branches that contribute to the path diversity effect, a large level of the path diversity effect can be obtained as compared to the wireless transmission system of the first embodiment.

The case where the number of management stations capable of communicating with each other is four has been described in the second embodiment. Even if the number of management stations capable of communicating with each other is five or more, an appropriate delay amount during multi-station simultaneous transmission can be reliably set with respect to each management station by repeating the procedure of C-11 to C-13, C-21 to C-23, and C-31 to C-33 shown in FIG. 37C the number of stations. Note that when the number of management stations exceeds the maximum effective branch number increased by multiplication by the number of symbol waveforms, then if an intermediate timing value is provided in addition to a timing for each symbol waveform (here, T1 and T2) as in the first embodiment, a deterioration conversely occurs. In such a case, an overlapping timing may be provided from pairs of a symbol waveform and a delay amount. Alternatively, the number of wireless stations that are determined to be capable of broadcasting may be caused to be smaller than or equal to the multiplied maximum effective branch number.

Third Embodiment

A wireless transmission system according to a third embodiment is different from the second embodiment in that a delay amount given to a packet that a source management station capable of performing multi-station simultaneous transmission relays and transmits during relay transmission is previously determined to be a value appropriately shifted from a reference timing T0. Except for this, the configurations of the wireless transmission system and the management station, and the negotiation procedure of channel information between systems are similar to those of the first and second embodiments.

Figures 40A, 40B:
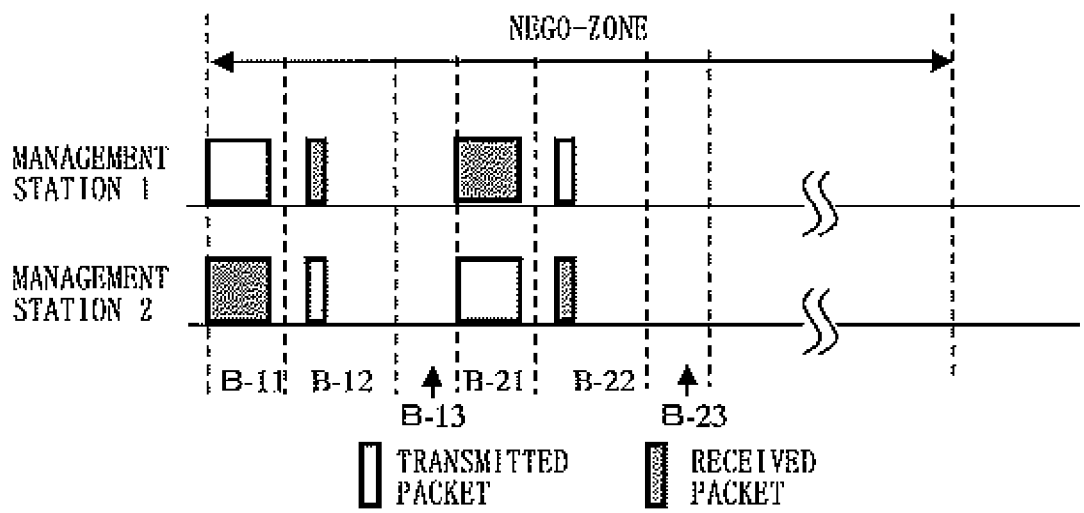
FIG. 40A is a diagram showing an exemplary multi-station simultaneous transmission timing in a third embodiment.
FIG. 40B is a diagram showing an exemplary structure of a record table held by a management station of the third embodiment.

FIG. 40A is a diagram showing an exemplary negotiation procedure that is performed by a management station of the third embodiment, from the system configuration shown in FIG. 32A where one wireless system is generated to the system configuration shown in FIG. 32B. The management station of the third embodiment is different from that of FIG. 378 in that a notification packet is not transmitted in zones B-13 and B-23.

Each management station, when causing other stations to relay and transmit a broadcast packet, previously holds a symbol waveform and a delay amount to be given to the packet when this management station (source management station) retransmits the packet. For example, each management station, when this management station is a source management station of the packet, retransmits the packet with the default symbol waveform W1 at a timing delayed by a delay amount τ from the reference timing T0 that is after a predetermined time T1 from the end of the source packet (after a predetermined time T2 from the end of the source packet) or with the symbol waveform W2 instead of W1 at the reference timing T0. Therefore, as shown in FIG. 40A, each management station (here, the management station 1) that causes the other management stations to perform relay transmission does not generate a notification packet.

The management station 2 for relay transmission that does not receive a notification packet, when relaying and transmitting a broadcast packet, transmits the broadcast packet with the default symbol waveform W1 without giving a delay amount to the broadcast packet. Specifically, the management station 2 uses the predetermined reference timing T0 as a transmission start timing during relay transmission. Therefore, when the management station 2 relays and transmits a broadcast packet and the management station 1 retransmits the packet, packets arriving at the management station 9 have an arrival time difference of τ or have the same arrival timing but different symbol waveforms. Therefore, since the arrival timings or the symbol waveforms differ from each other, the management station 9 can normally receive a packet while the path diversity effect is exhibited to the maximum extent.

FIG. 40B is a diagram showing an exemplary record table when the management stations 1 and 2 in the positional relationship shown in FIG. 32B determine a symbol waveform and a delay amount by the procedure shown in FIG. 40A. When the management stations 1 and 2 retransmit a broadcast packet, a symbol waveform and a delay amount to be given to the packet are previously set. Therefore, when only one management station capable of relaying and transmitting a broadcast packet is present, each management station can determine and hold the record table shown in FIG. 40B even when the management station does not transmit a notification packet.

As described above, according to the third embodiment, when two management station capable of relaying and transmitting a packet are present, including a source management station, the source management station determines a delay amount given to its own packet as a value appropriately shifted from the reference timing, or changes a symbol waveform while holding the reference timing, thereby causing other management stations as well as the source station to perform relay transmission at the reference timing and with a default symbol waveform, without giving a symbol waveform and a delay amount to the other management stations. Therefore, since it is not necessary to prepare a zone for transmitting/receiving a notification packet, the path diversity effect can be reliably exhibited while suppressing a reduction in transmission efficiency as compared to the method of the second embodiment.

Note that the case where the number of management stations is two has been described in the third embodiment. Here, when the number of management stations is three or more, then if an intermediate timing value is provided, a deterioration may conversely occur. Therefore, the third embodiment is useful since all additional management stations have a combination of the same symbol waveform (default) and the same delay amount (timing). FIG. 41 is a diagram showing an exemplary record table held by a management station. Also in this case, each management station can optimally determine a symbol waveform and a delay amount that the management station gives to a packet, without transmitting a notification packet to other management stations. As a result, since it is not necessary to prepare a zone for transmitting/receiving a notification packet, the path diversity effect can be reliably exhibited while suppressing a reduction in transmission efficiency as compared to the method of the second embodiment.

Note that, in order to exhibit the path diversity effect to the maximum extent, management stations other than a source management station also need to appropriately shift a transmission start timing or change a symbol waveform. In this case, a notification packet may be transmitted in a procedure similar to that shown in FIG. 37C of the second embodiment, and a record table shown in FIG. 42 may be included in each management station, for example. In the third embodiment, however, since a symbol waveform and a delay amount to be assigned to the source management station are previously defined as W2 and T1, a notification packet does not need to include data indicating the delay amount of the source management station. Therefore, a notification packet length can be slightly reduced as compared to the second embodiment. Therefore, the zone for transmitting a notification packet shown in C-13 or C-23 of FIG. 37C can be slightly reduced. Therefore, the path diversity effect can be obtained to the maximum extent while suppressing a reduction in transmission efficiency as compared to the second embodiment.

Fourth Embodiment

In the first embodiment, a response packet with respect to a channel information packet is received only by a source management station of the channel information packet. In contrast to this, in a fourth embodiment, a management station other than the source of a channel information packet also receives a response packet transmitted by another management station. Except for this, the configurations of a wireless transmission system and the block configuration of a management station, and the negotiation procedure of a channel information between systems are similar to those of the first embodiment, and will not be described.

Hereinafter, referring to FIGS. 32A to 32C and FIGS. 43A to 43C, a procedure in which the management stations 1 to 5 of the fourth embodiment negotiate with each other to determine a symbol waveform and a delay amount that each management station gives to a packet during multi-station simultaneous transmission will be described, focusing on a difference between the first and fourth embodiments.

Figure 43A:
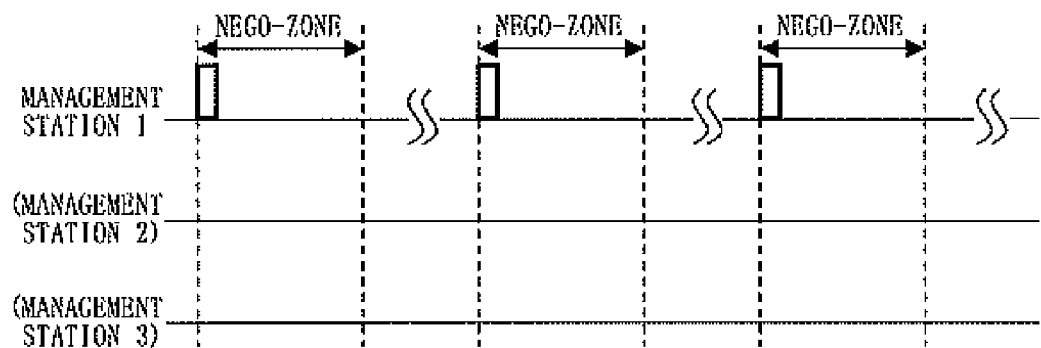
FIG. 43A is a diagram showing an exemplary negotiation procedure performed by a management station of a fourth embodiment.
Figure 43B:
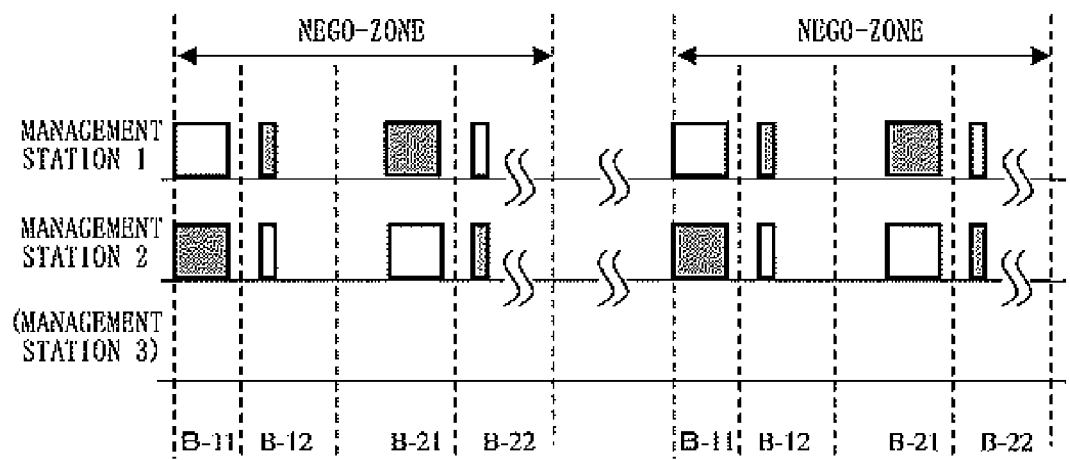
FIG. 43B is a diagram showing an exemplary negotiation procedure performed by the management station of the fourth embodiment.
Figure 43C:
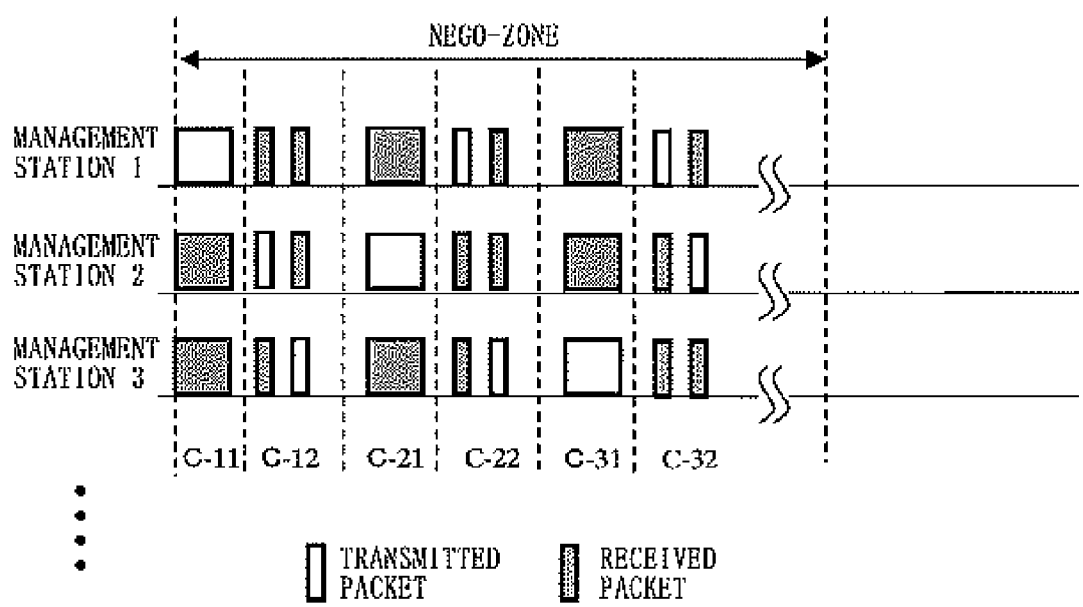
FIG. 43C is a diagram showing an exemplary negotiation procedure performed by the management station of the fourth embodiment.

FIGS. 43A to 93C are diagrams showing an exemplary negotiation procedure after one wireless transmission system is generated and until the system configuration shown in FIGS. 1A and 1B is established. FIGS. 43A to 43C correspond to FIGS. 32A to 32C, and show transmission/reception timings of packets in management stations.

Firstly, the operation of the management stations 1 to 5 having the system configuration shown in FIG. 32A or 32B is similar to that of the first embodiment.

Next, when the system configuration changes from the state of FIG. 32B to the state of FIG. 32C, the management station 3 that newly constructs a system, when receiving a channel information packet transmitted from the management station 1, generates a response packet, and transmits the response packet at a random timing (FIG. 43C: C-11). In this response zone, the management station 2 also generates a response packet and transmits the response packet at a random timing. The management stations 4 and 5 operate similarly.

The management station 1 receives response packets transmitted from the management stations 2 to 5. Further, in this response zone, the management station 2 receives the response packet transmitted by the management station 3, and the management station 3 receives the response packet transmitted by the management station 2. In this manner, the management stations receive a response packet from each other. This is a difference from the first embodiment.

Thereby, for example, in the management station 2, the symbol wave form/delay amount determining section 36 can recognize the management station 3 as a neighboring management station, without receiving a channel information packet from the management station 3. Similarly, the management station 3 also memorizes not only the management station 1 but also the management station 2 as neighboring management stations. In addition, the management stations 4 and 5 operate similarly.

Thus, the management stations 2 to 5, by receiving the response packets transmitted by the other management stations with respect to a channel information packet transmitted by the management station 1, each recognize that the number of management stations capable of relaying and transmitting a broadcast packet transmitted by the management station 1 is four including itself. Each management station, when the management station 1 is a source management station, determines symbol waveforms and delay amounts to be assigned to the management stations. Note that each management station determines symbol waveforms and delay amounts to be assigned to the management stations in accordance with a predetermined symbol waveform/delay amount determination rule, so that the same delay amount is assigned to the same management station.

Next, the management stations 1 and 3 receive a channel information packet transmitted from the management station 2 (FIG. 43C: C-21). Thereafter, in a procedure similar to that in C-12 of FIG. 43C, each management station determines a symbol waveform and a delay amount when relaying and transmitting a transmission packet of the management station 2, and records the symbol waveform and the delay amount into the record table 37 (FIG. 43C: C-22).

Thus, each management station individually determines a symbol waveform and a delay amount. Therefore, since it is not necessary to prepare an area for transmitting a notification packet as in the first embodiment (FIG. 31C: C-13), a reduction in transmission efficiency can be suppressed.

Note that, in this embodiment, it may be assumed as the symbol waveform/delay amount determination rule that, successive numbers may be given to a plurality of candidate pairs of a symbol waveform and a delay amount with respect to a reference timing, that are predetermined, depending on the number of management stations capable of performing relay transmission obtained from neighboring station information notified of by the end time of a response zone, and the maximum number of effective branches that contribute to the path diversity effect. The candidate pairs are sequentially given to management stations in order of when a response packet is transmitted, with the earliest first.

For example, when the maximum number of effective branches that contribute to the path diversity effect is four, it is assumed that if there are four pairs of a symbol waveform and a delay amount, i.e., W1T1, W1T2, W2T1 and W2T2, the pairs are sequentially assigned to the management stations in order of when a response packet is transmitted, with the earliest first. In accordance with this symbol waveform/delay amount determination rule, when, as shown in FIG. 43C, the management stations 2 to 5 sequentially return a response packet with respect to a channel information packet of the management station 1, the management station 1 and 3 to 5 sequentially return a response packet with respect to a channel information packet of the management station 2, and the management stations 1, 2, 4 and 5 sequentially return a response packet with respect to a channel information packet of the management station 3, the record table of FIG. 33A is held in each management station as in the first embodiment. Note that the symbol waveform/delay amount determination rule is not limited to this. For example, the pairs may be sequentially given in order of when a response packet is transmitted, with the latest first, or in order of the ID number of a management station that transmits a response packet.

The case where the number of management stations capable of communicating with each other is four has been described in the fourth embodiment. Even if the number of management stations capable of communicating with each other is five or more, an appropriate symbol waveform and delay amount during multi-station simultaneous transmission can be reliably set with respect to each management station by repeating the procedure of C-11 to C-13, C-21 to C-23, and C-31 to C-33 shown in FIG. 93C the number of stations. In this case, the pairs of a symbol waveform and a delay amount, W1T1, W1T2, W2T1 and W2T2, may be repeated in a cyclic manner (i.e., the last pair is followed by the first).

It has been assumed in the first to fourth embodiments that the nego-zones are regularly provided on the common channel. Alternatively, only when a management station is newly generated or an existing management station disappears, that management station may transmit a negotiation request to an existing management station so that a nego-zone is provided. In any case, negotiation is necessarily performed when the number of management stations changes, i.e., when the station number changes. Therefore, according to the present invention, multipath with an appropriate arrival time difference can be generated during multi-station simultaneous transmission for each symbol waveform even when the station number changes, thereby making it possible to reliably exhibit the path diversity effect.

Also, it has been assumed in the first to fourth embodiments that one channel is previously defined as the common channel, and a newly generated management station initially observes the common channel. The common channel may not be previously defined to be one channel. For example, a management station that initially exists may exclusively define one of a plurality of communication channels as the common channel for negotiating with another management station subsequently generated, or a communication channel used for communication with its own terminal may also be used as the common channel. Note that, in that case, a management station initially performs channel search for recognizing which of a plurality of communication channels is the common channel in combination with search for a neighboring management station.

It also has been assumed and described in the first to fourth embodiments that the reference timing T0 is a timing after the predetermined time T1 has elapsed since a timing when a management station completed reception of a broadcast packet. Here, a timing after the predetermined time T1 has elapsed since a timing when a management station detected a unique word included in a packet may be set as the reference timing T0. Alternatively, by using a beacon signal for synchronizing management stations, a timing after the predetermined time has elapsed since a timing when reception of the beacon signal was completed may be set as the reference timing. Alternatively, each management station may obtain the reference timing from time information obtained from a wireless-controlled clock, or each management station may have a GPS (Global Positioning System) to obtain the reference timing from time information included in a GPS signal.

It has also been assumed in the first to fourth embodiments that, as shown in FIGS. 33A, 39A and 42, symbol waveforms and delay amounts assigned to all management stations are recorded in the record table 37 that is held by each management station that performs multi-station simultaneous transmission. Here, each management station may record only a symbol waveform and a delay amount assigned to itself into the record table. Thereby, memory capacity required for storing the record table can be reduced. Therefore, even when the number of stations capable of performing multi-station simultaneous transmission increases, an increase in memory capacity required for storing the record table can be suppressed.

Note that when there is any available space in the memory capacity of a management station, it is desirable to provide, as the record table, the same record table that records symbol waveforms and delay amounts of all management stations as shown in FIGS. 33A, 39A and 42A to each management station, as shown the exemplary record table of the first to fourth embodiments. This is because even when the number of management stations that constitute a wireless system is reduced as shown from FIG. 44A to FIG. 44B, then if a symbol waveform/timing change rule of the remaining management stations is previously defined, the transmission timing of each management station can be appropriately determined without transmitting a notification packet described in the first to third embodiments. Thereby, the maximum path diversity effect can be reliably exhibited while suppressing a reduction in transmission efficiency without the need of an area for transmitting a notification packet. This will be described below.

Figure 44A:
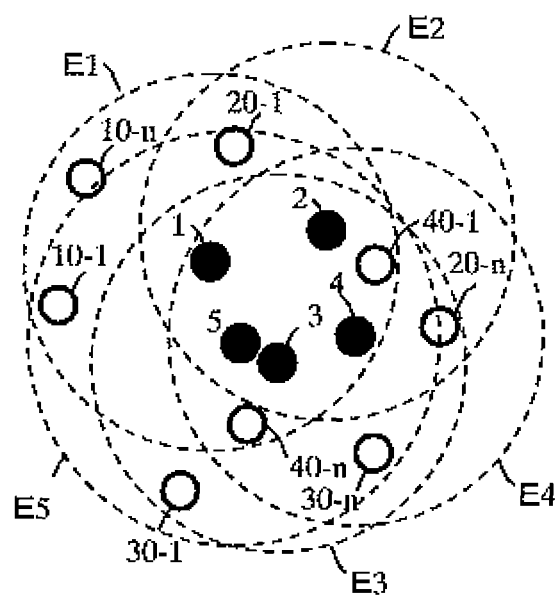
FIG. 44A is a diagram showing an exemplary change of a wireless transmission system configuration according to the fourth embodiment.
Figure 44B:
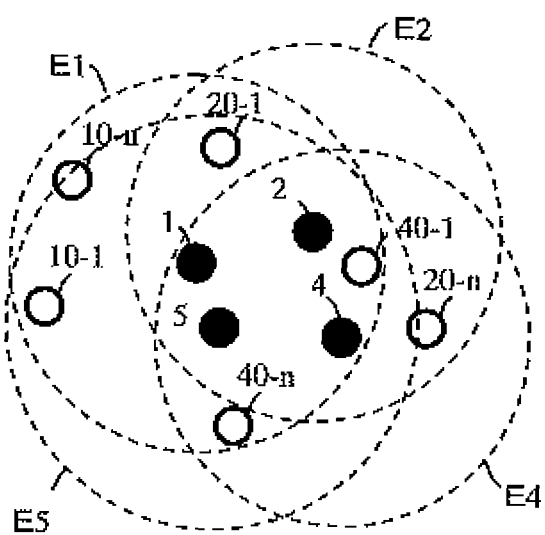
FIG. 44B is a diagram showing an exemplary change of the wireless transmission system configuration of the fourth embodiment.

A case will be described as an example where a system configuration shown in FIG. 44B is provided by removing one management station from a system configuration shown in FIG. 44A in which five management stations exist. Note that, in the systems shown in FIGS. 44A and 94B, a case will be described as an example where the maximum effective branch number increased by multiplication by the number of symbol waveforms is four. Also, it is assumed that each management station holds a record table shown in FIG. 45A similar to that of FIG. 33A of the first embodiment, during configuration of the system of FIG. 44A.

In this system, the symbol waveform/timing change rule when the number of management stations is reduced will be previously defined as follows, for example.

(1) A case where the number of remaining management stations in the system is larger than or equal to the maximum number of effective branches that can contribute to the path diversity effect (hereinafter abbreviated as a maximum tolerable number), the maximum effective branch number being increased by multiplication by the number of symbol waveforms When a management station to which the same symbol waveform and delay amount as those of a management station that has disappeared from the system are assigned exists, the symbol waveform and delay amount assigned to each management station is not changed.

When a management station to which the same symbol waveform and delay amount as those of a management station that has disappeared from the system are assigned does not exist, a plurality of management stations to which a combination of the same symbol waveform and the same delay amount is assigned exists among the remaining management stations in the system. Therefore, a symbol waveform and a delay amount assigned to a management station with a large management station ID among the management stations to which the same symbol waveform and the same delay amount are assigned are changed to the symbol waveform and delay amount assigned to the management station that has disappeared from the system.

(2) A case where the number of remaining management stations in the system is less than the maximum tolerable number When a plurality of management stations to which the same symbol waveform and the same delay amount are assigned exist among management stations remaining in the system, a combination of a symbol waveform and a delay amount assigned to a management station with a large management station ID among the management stations to which the same symbol waveform and the same delay amount are assigned are changed to a symbol waveform and a delay amount assigned to a management station that has disappeared from the system.

When a management station to which the same symbol waveform and the same delay amount are assigned does not exist among the same symbol waveform and the same delay amount are assigned, a symbol waveform and a delay amount assigned to each management station are not changed.

In accordance with the above-described rules (1) and (2), for example, even when the number of management stations is reduced from five to four as shown from FIG. 99A to FIG. 94B, each management station can independently change the same record table (e.g., when the management station 3 has disappeared and the number of management stations is reduced, a change can be made as shown from FIG. 45A to FIG. 45B).

Also, as described above, in the system that prevents the station number from increasing without limitation (e.g., if the number of management stations exceeds the maximum tolerable number, transmission is performed where the station number is equal to the maximum tolerable number), a timing change rule when the number of management stations is reduced is previously defined as follows.

(3) A case where the number of remaining management stations in the system is larger than or equal to the maximum tolerable number A combination of a symbol waveform and a delay amount assigned to a management station with a largest management station ID among management stations that have not participated in multi-station simultaneous transmission though it has capability to perform multi-station simultaneous transmission among the remaining management stations in the system, is changed to a combination of a symbol waveform and a delay amount assigned to a management station with a largest management station ID among the reduced number of management stations.

In accordance with the above-described rule (3), for example, when each management station having the system configuration shown in FIG. 44A holds the record table shown in FIG. 45A, then even if the number of management stations is reduced from five to four as shown in FIG. 44B, each management station can independently change the record table held by itself.

Figures 46, 47:
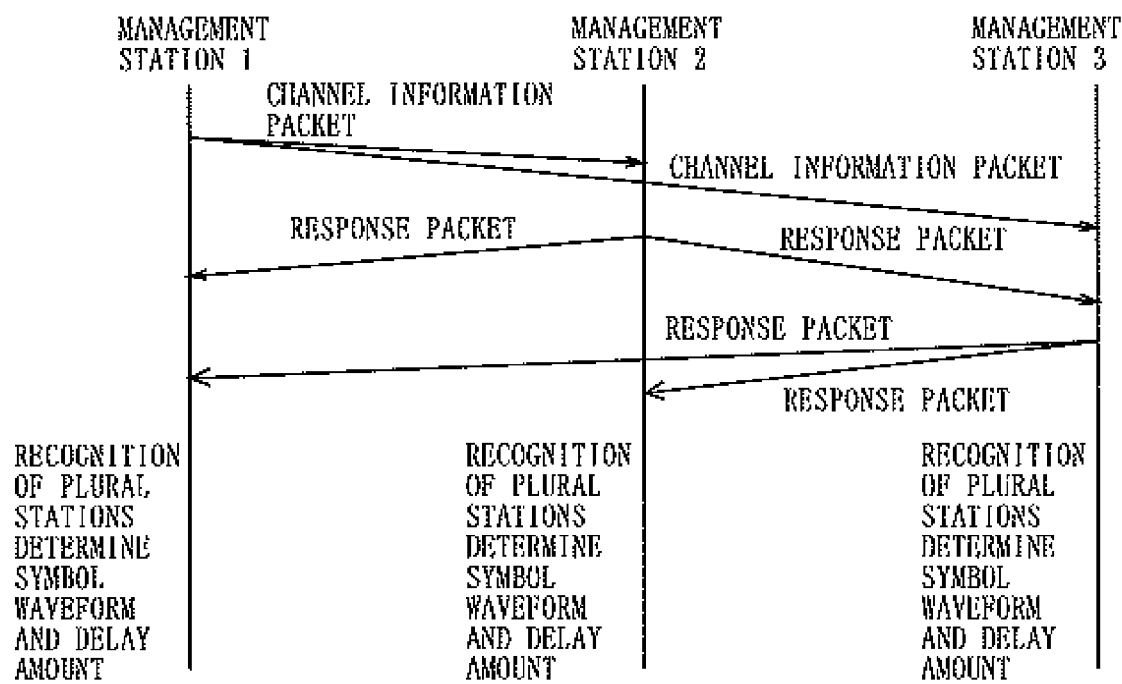
FIG. 46 is a diagram showing an exemplary structure of a record table held by the management station of the fourth embodiment.
FIG. 47 is a sequence diagram showing an outline of an operation performed by the management station of the fourth embodiment.
Figure 48A:
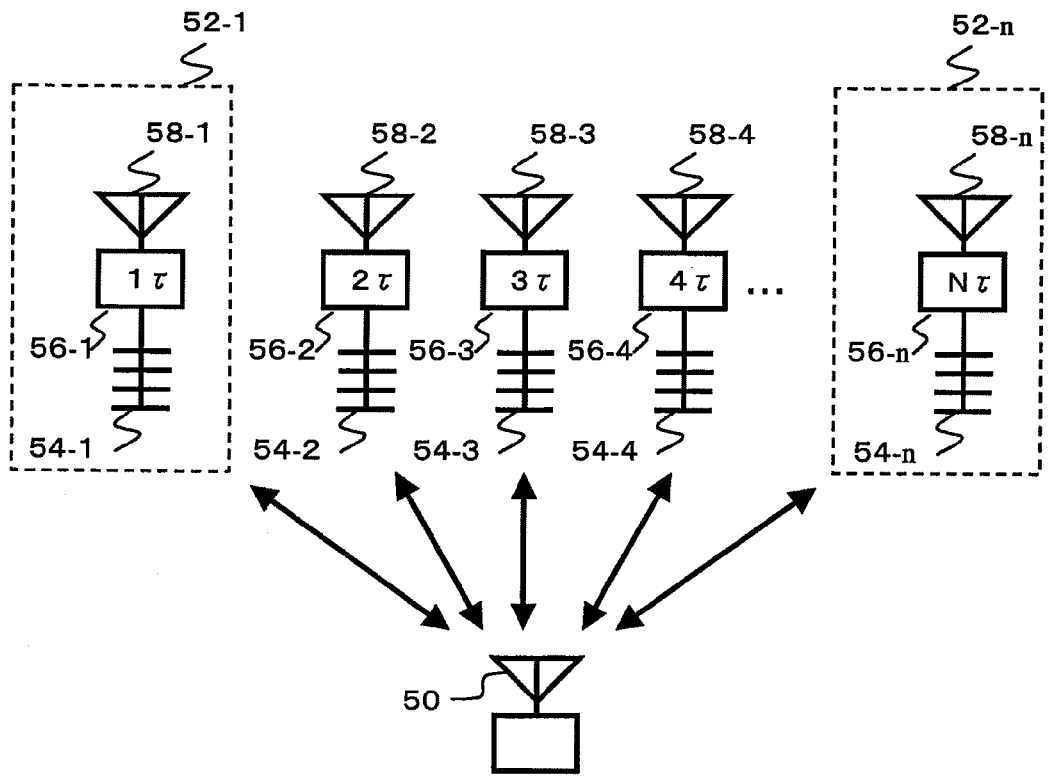
FIG. 48A is a diagram showing a configuration of a conventional multi-station simultaneous transmission system described in Patent Document 1.
Figure 48B:
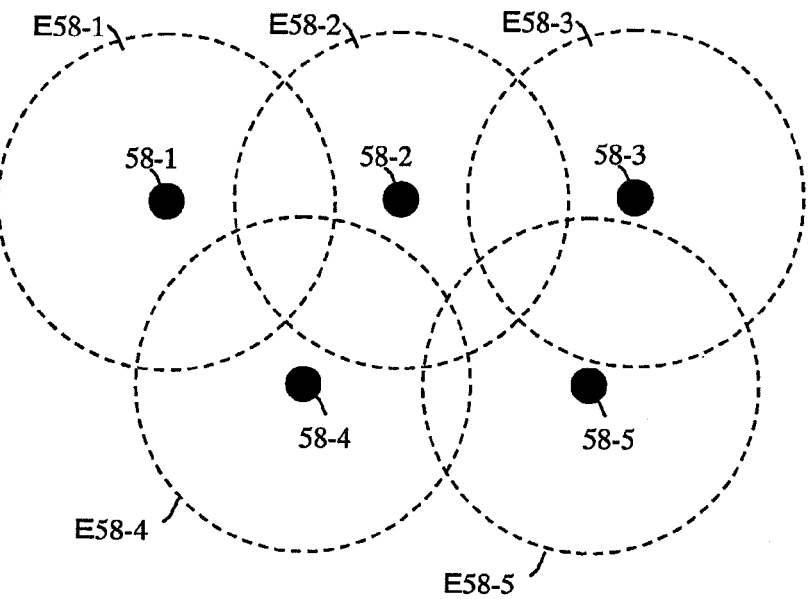
FIG. 48B is a diagram showing the configuration of the conventional multi-station simultaneous transmission system described in Patent Document 1.
Figure 49:
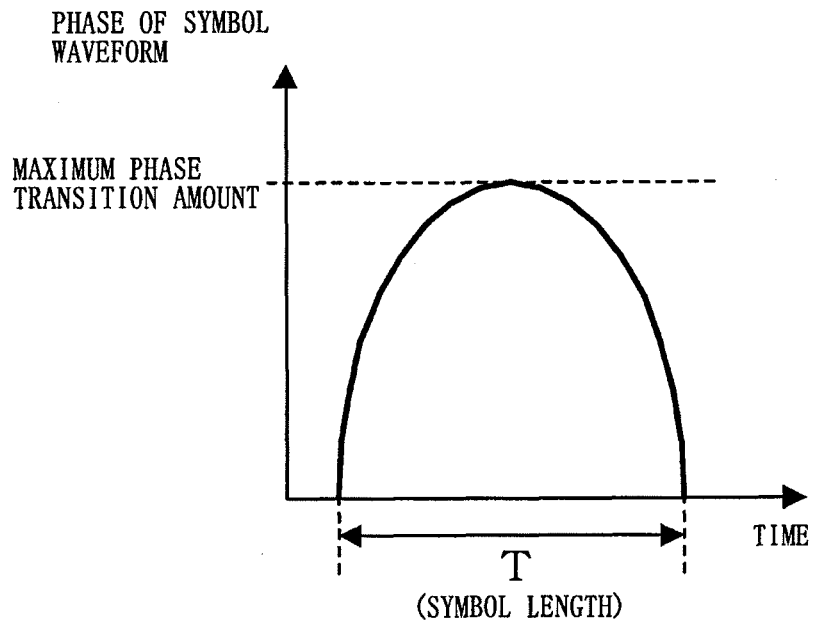
FIG. 49 is a schematic diagram showing a phase transition of a conventional symbol waveform.
Figure 50:
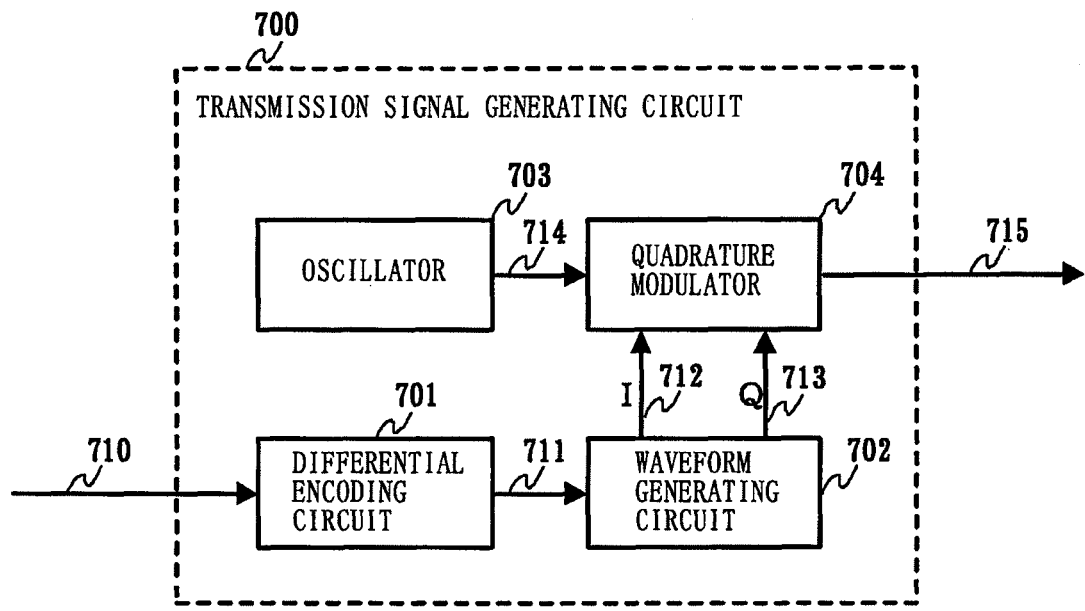
FIG. 50 is a diagram showing a configuration of a transmission signal generating circuit described in Patent Document 2.
Figure 51:
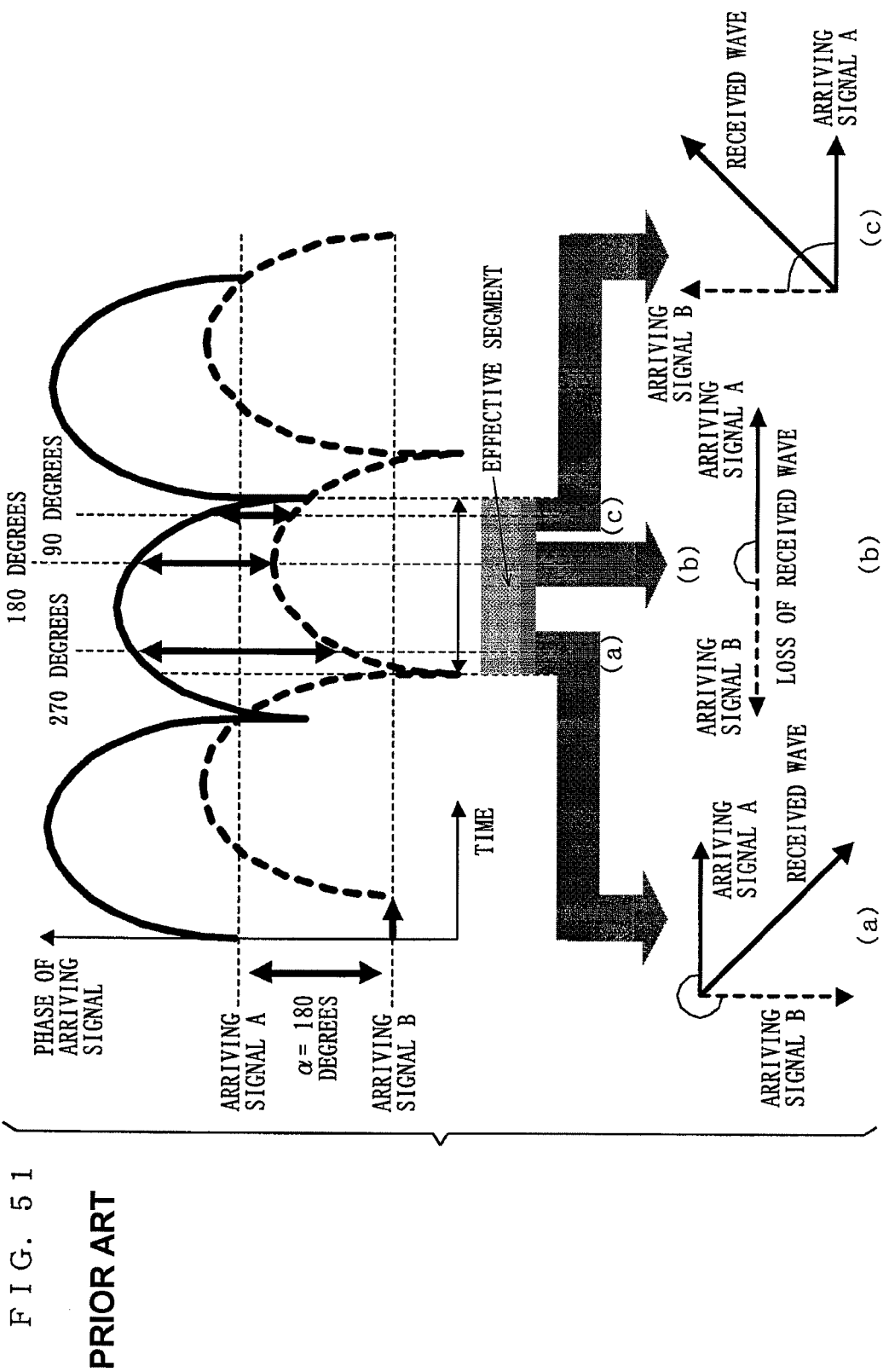
FIG. 51 is a schematic diagram showing a phase relationship between two arriving signals A and B with a delay.
Figure 52:
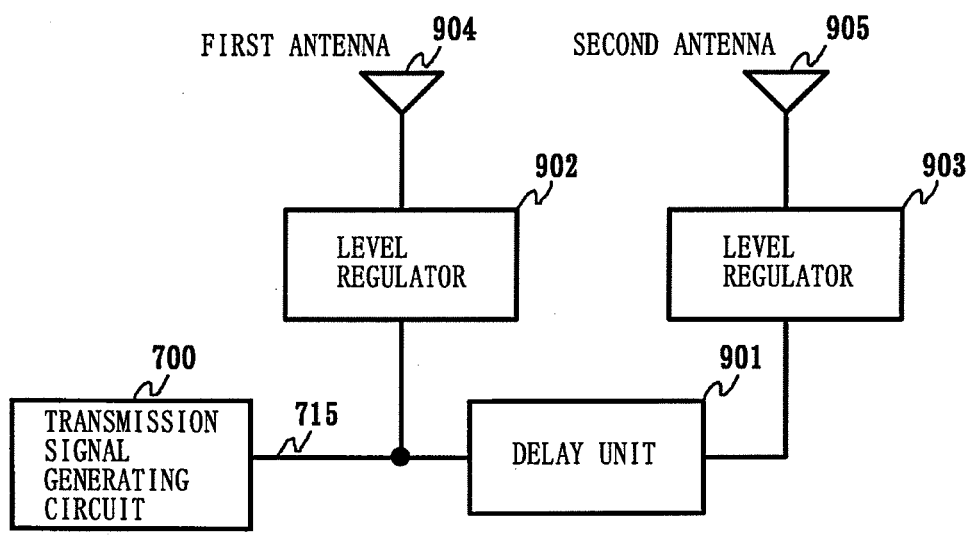
FIG. 52 is a schematic diagram showing a configuration of a conventional transmission system.
Figure 53:
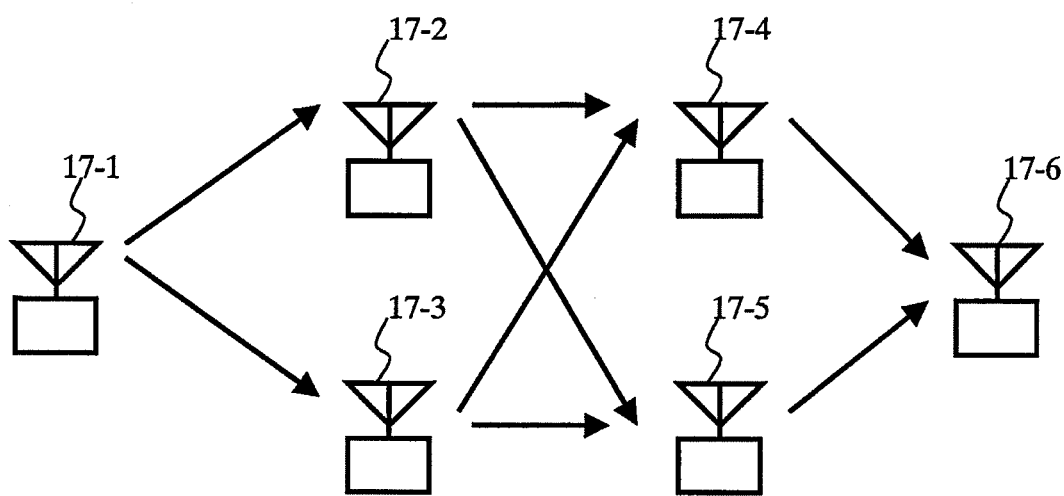
FIG. 53 is a diagram showing a configuration of a conventional wireless transmission system described in Patent Document 2.
Figure 55C:
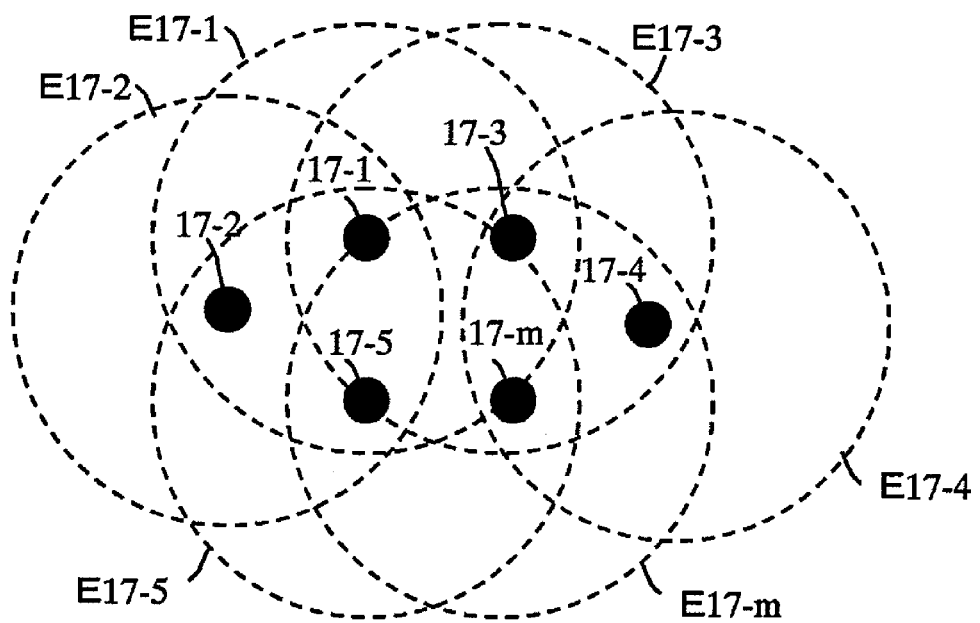
FIG. 55C is a diagram for describing the problem arising when multi-station simultaneous transmission is performed using the conventional multi-hop system.
Figure 56A:
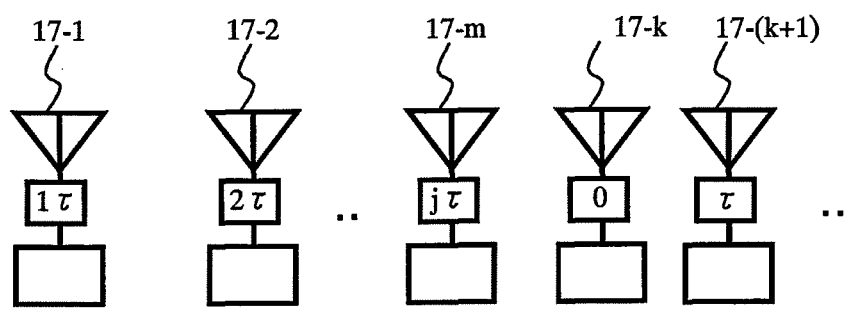
FIG. 56A is a diagram for describing the problem arising when multi-station simultaneous transmission is performed using the conventional multi-hop system.
Figure 56B:
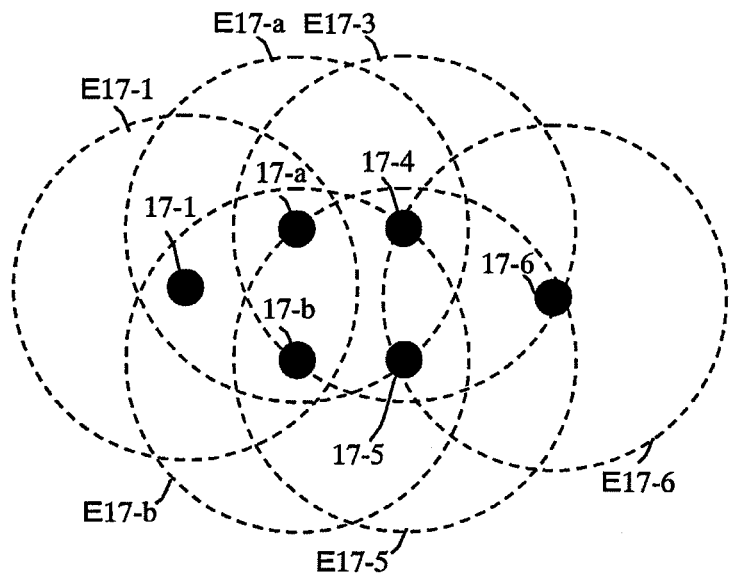
FIG. 56B is a diagram for describing the problem, arising when multi-station simultaneous transmission is performed using the conventional multi-hop system.
Figure 57:
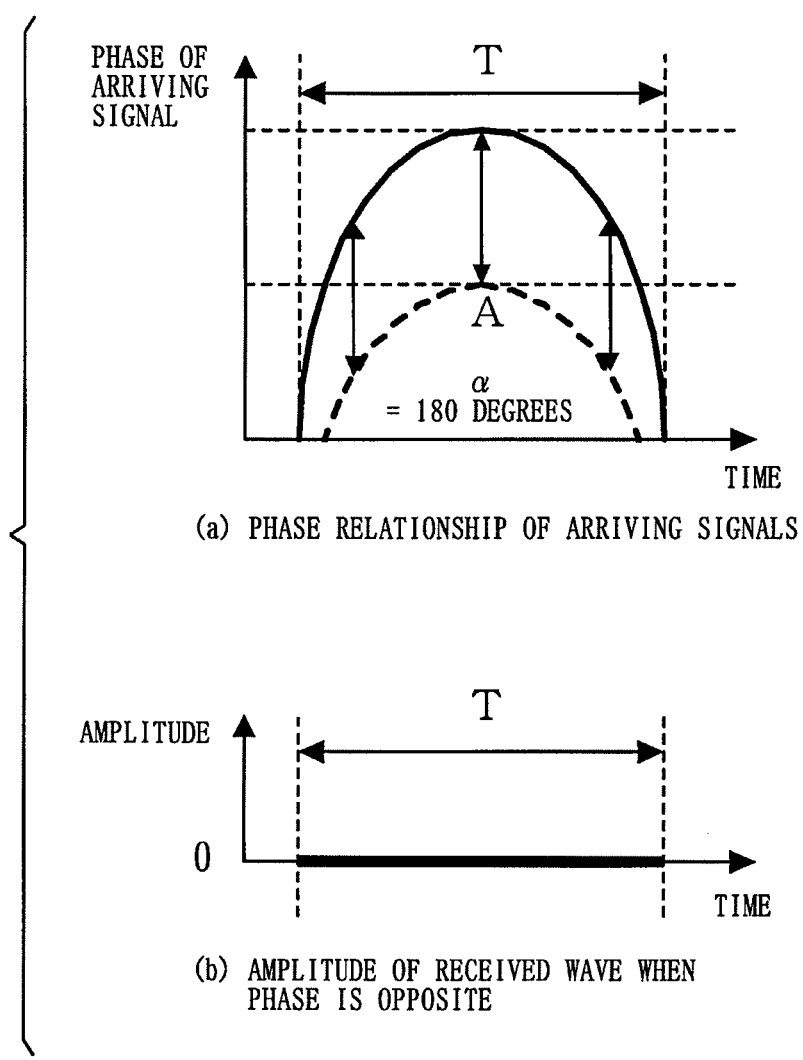
FIG. 57 is a schematic diagram, showing a case where phases of arriving signals are opposite to each other in a conventional modulation scheme.

FIG. 46B is a diagram showing an exemplary record table when the management station 3 disappears. A management station that has not participated in multi-station simultaneous transmission (indicated by "-" in FIG. 45A) is removed from FIG. 46 by compensating for combinations that have disappeared and have been lost. As a result, four management stations perform multi-station simultaneous transmission using all of the four combinations of symbol waveforms and delay amounts.

Thus, each management station holds a record table that stores symbol waveforms and delay amounts of all management stations capable of performing multi-station simultaneous transmission, and previously determines a procedure for changing a combination of a symbol waveform and a delay amount when a multi-station situation, such as the station number or the like, changes. Thereby, as compared to a combination setting procedure during initial negotiation, a symbol waveform and a delay amount of a management station capable of performing multi-station simultaneous transmission can be reset by a simple procedure even when the multi-station situation changes. Therefore, the maximum path diversity effect can be reliably exhibited while suppressing a reduction in transmission efficiency.

Also, it has been assumed in this embodiment that a symbol waveform and a delay amount during multi-station simultaneous transmission are determined by repeating transmission of a channel information packet the number of management stations existing in a wireless transmission system. Here, the symbol waveform and the delay amount may be determined based on the number of channel information packets first transmitted and the number of response packets transmitted with respect to these channel information packets.

FIG. 47 is a sequence diagram showing an operation of the management stations 1 to 3 when each management station determines a symbol waveform and a delay amount to be given to a packet during multi-station simultaneous transmission by a channel information packet being transmitted once. The management stations 2 and 3, when receiving a channel information packet transmitted by the management station 1, generates and transmits a response packet. The management station 1 receives response packets transmitted by the management stations 2 and 3. Also, the management station 2 receives the response packet transmitted by the management station 3, while the management station 3 receives the response packet transmitted by the management station 2. The management stations 1 to 3 determine that the total number of the received channel information packets and response packets is the number of management stations capable of performing multi-station simultaneous transmission when a broadcast packet is relayed and transmitted. Thereafter, the management stations 1 to 3 each determine a symbol waveform and a delay amount to be given to a packet when it performs multi-station simultaneous transmission, in accordance with the above-described predetermined rule. Thus, if each management station determines a symbol waveform and a delay amount by a channel packet being transmitted once, the procedure for deciding a symbol waveform and a delay amount can be facilitated.

Note that, in the configuration of the wireless station 1 of FIG. 5, various methods and configurations for controlling a delay amount can be contemplated. For example, a delay may be inserted after the modulating section 21. The present invention is not limited to those described above. Any method in which a wireless station adds a predetermined delay amount from a reference timing to data before transmitting data may be used.

Note that, in the wireless transmission systems of the first to fourth embodiments, the following points are common. The wireless transmission systems can perform multi-station simultaneous transmission of data by wireless. Also, the wireless transmission systems comprise a plurality of wireless stations for transmitting and receiving data. Also, in the wireless transmission systems, a system for path diversity is formed by a transmitter-side wireless station, a multipath transmission path, and a receiver-side wireless station. At least one of the wireless stations determines, in accordance with a response packet with respect to a multi-station simultaneous transmission request packet transmitted by itself or other stations, a symbol waveform and a plurality of delay amounts from a reference timing during multi-station simultaneous transmission in the wireless transmission system. A difference between each delay amount is set to be a predetermined delay resolution or more for each symbol waveform. A difference between maximum and minimum values of the delay amounts is set to be a predetermined maximum delay for each symbol waveform.

Also, it has been described in the first to fourth embodiments that a wireless station that performs multi-station simultaneous transmission is a management station. In an equally distributed system, a terminal and a management station may not be distinguished from each other, and a wireless station may determine a symbol waveform and a delay amount by the above-described method.

Note that each functional block, such as the symbol waveform/delay amount determining section, the transmission timing controlling section or the like described in the first to fourth embodiments, which is included in a wireless station, is typically implemented as LSI which is an integrated circuit. These blocks may be each individually formed on a single chip or all or a part of these blocks may be integrated into a single chip.

Also, as long as the operations described in the first to fourth embodiments can be achieved, the wireless station of the present invention may be configured using functional blocks and/or means other than those shown in the drawings.

According to the resent invention, in a multi-station simultaneous transmission system in which a plurality of wireless stations arranged in proximity to each other transmit the same data, even when the positional relationship between wireless stations or the number of wireless stations for performing multi-station simultaneous transmission of data changes, the path diversity effect can be obtained to the maximum extent and with reliability, so that the present invention is useful in the field of wireless communication or the like.

The invention claimed is:

1. A wireless transmission system for path diversity capable of performing multi-station simultaneous transmission of data, comprising a plurality of wireless stations and a multipath transmission path formed between the plurality of wireless stations, wherein
the plurality of wireless stations includes:
at least one wireless station that determines, at one time, depending on a response packet with respect to a multi-station simultaneous transmission request packet for requesting multi-station simultaneous transmission that is transmitted by itself or another station, a plurality of combinations of a symbol waveform and a delay amount from a reference timing that are used for transmission signals that are sent by the multi-station simultaneous transmission, the plurality of combinations corresponding to a number of wireless stations capable of performing the multi-station simultaneous transmission, and the least one wireless station notifies each of the wireless stations capable of performing the multi-station simultaneous transmission of at least one of the plurality of combinations; and a destination wireless station that receives the transmission signals that are sent by each of the wireless stations capable of the multi-station simultaneous transmission, the transmission signals being sent by each of the wireless stations capable of the multi-station simultaneous transmission using the at least one of the plurality of combinations notified of by the at least one wireless station, wherein when the number of wireless stations capable of performing the multi-station simultaneous transmission is larger than a maximum effective branch number, the at least one wireless station determines the number of the plurality of combinations to be smaller than or equal to the maximum effective branch number.

2. The wireless transmission system according to claim 1, wherein the at least one wireless station sets a difference between delay amounts to be a predetermined delay resolution or more, and sets a difference of a maximum value and a minimum value of delay amounts to be a predetermined maximum delay or less, for two or more combinations having the same symbol waveform and different delay amounts.

3. The wireless transmission system according to claim 2, wherein the predetermined delay resolution and the predetermined maximum delay are set to respective values that allow the destination wireless station to perform path diversity reception of a plurality of delayed waves.

4. The wireless transmission system according to claim 1, wherein
the plurality of wireless stations includes a plurality of management stations having a function of managing at least one terminal station present within respective communication areas,
each of the management stations includes a transmission/reception section for transmitting and receiving, prior to communication, the multi-station simultaneous transmission request packet and the response packet as a negotiation packet for establishing a state in which the communication can be performed, and the at least one wireless station is a source management station that transmits data to a management station that performs the multi-station simultaneous transmission, and the source management station includes a symbol waveform/delay amount determining section for recognizing, based on the negotiation packet, a management station capable of performing the multi-station simultaneous transmission and determining the combinations used when the multi-station simultaneous transmission of the transmission signal is performed by the recognized management station.

5. The wireless transmission system according to claim 1, wherein
the plurality of wireless stations includes a plurality of management stations having a function of managing at least one terminal station present within respective communication areas,
each of the management stations transmits and receives, prior to communication, the multi-station simultaneous transmission request packet and the response packet as a negotiation packet for establishing a state in which the communication can be performed, and the at least one wireless station is a management station that, based on the negotiation packet, is capable of performing the multi-station simultaneous transmission, and the management station includes a symbol waveform/delay amount determining section for determining the combinations used when the multi-station simultaneous transmission of the transmission signal is performed by itself.

6. The wireless transmission system according to claim 1, wherein
the wireless transmission system is a system for causing other wireless stations to relay a transmission signal from a source wireless station, thereby transmitting the transmission signal to the destination wireless station, each of the plurality of wireless stations includes:
a transmission section for transmitting the multi-station simultaneous transmission request packet to other wireless stations if the transmission signal is to be sent by the multi-station simultaneous transmission, and transmitting the response packet if the multi-station simultaneous transmission request packet is received;
a reception section for receiving the response packet; and a symbol waveform/delay amount determining section for determining a relay station capable of performing the multi-station simultaneous transmission based on the received response packet, and determining the combination used when the determined relay station sends the transmission signal by the multi-station simultaneous transmission.

7. The wireless transmission system according to claim 6, wherein a transmission section of each of the plurality of wireless stations, when the wireless station is a source wireless station, receives a notification indicating reception of the response packet from the destination wireless station from any of the relay stations, or when directly receiving the response packet from the destination wireless station, notifies the relay station that relay transmission is canceled.

8. The wireless transmission system according to claim 6, wherein
each of the plurality of wireless stations further includes a relay availability determining section for determining whether or not the wireless station can relay the transmission signal transmitted from the source wireless station, depending on the multi-station simultaneous transmission request packet from the source wireless station, and
the transmission section of each of the plurality of wireless stations adds a result of determination of the relay capability determining section to the response packet and transmits the resultant response packet.

9. The wireless transmission system according to claim 6, wherein
each of the plurality of wireless stations further includes a relay availability determining section for determining whether or not the wireless station can relay the transmission signal transmitted from the source wireless station, depending on the multi-station simultaneous transmission request packet from the source wireless station, and
the transmission section of each of the plurality of wireless stations, when the relay availability determining section determines that the wireless station can perform relay transmission, transmits the response packet.

10. The wireless transmission system according to claim 6, wherein when receiving the response packets transmitted by the other wireless stations with respect to the multi-station simultaneous transmission request packet, and if the number of the response packets is larger than a maximum effective branch number, the transmission/reception section of each of the plurality of wireless stations does not transmit the response packet.

11. The wireless transmission system according to claim 1, wherein the multi-station simultaneous transmission request packet is a channel information packet relating to a communication channel used by the plurality of wireless stations.

12. The wireless transmission system according to claim 1, wherein the multi-station simultaneous transmission request packet is the whole or a part of the packet to be sent by the multi-station simultaneous transmission.

13. The wireless transmission system according to claim 1, wherein the at least one wireless station determines the plurality of combinations, depending on the number of wireless stations capable of performing the multi-station simultaneous transmission.

14. The wireless transmission system according to claim 1, wherein the at least one wireless station notifies a wireless station capable of performing the multi-station simultaneous transmission of at least one of the plurality of combinations.

15. The wireless transmission system according to claim 1, wherein a source wireless station retransmits the transmission signal based on a combination assigned to itself of the plurality of combinations.

16. The wireless transmission system according to claim 15, wherein
the source wireless station determines a combination to be assigned when the transmission signal is retransmitted by the source wireless station transmitting the transmission signal to the wireless stations capable of performing the multi-station simultaneous transmission, of the plurality of combinations, and the source wireless station retransmits the transmission signal based on the assigned combination, wherein a combination of a wireless station capable of the multi-station simultaneous transmission other than itself is a predetermined combination.

17. The wireless transmission system according to claim 1, wherein the at least one wireless station determines the plurality of combinations when the response packet is received.

18. The wireless transmission system according to claim 1, wherein the at least one wireless station generates the transmission signal, where symbol waveforms of any two symbols separated by a predetermined number of symbols are the same regardless of the transmission signal, and a phase difference between the any two symbols is determined based on the transmission signal.

19. A wireless station for use in a wireless transmission system for path diversity capable of performing multi-station simultaneous transmission of data, the wireless transmission system including a plurality of wireless stations and a multi-path transmission path formed between the plurality of wireless stations, the wireless station comprising:
a response packet receiving section for receiving a response packet with respect to a multi-station simultaneous transmission request packet requesting multi-station simultaneous transmission transmitted by itself or other stations, and
a symbol waveform/delay amount determining section for determining, at one time, depending on the response packet with respect to the multi-station simultaneous transmission request packet for requesting the multi-station simultaneous transmission that is transmitted by itself or another station, a plurality of combinations of a symbol waveform and a delay amount from a reference timing that are used for transmission signals that are sent by the multi-station simultaneous transmission, the plurality of combinations corresponding to a number of wireless stations capable of performing the multi-station simultaneous transmission, and the symbol waveform/delay amount determining section notifies each of the wireless stations capable of performing the multi-station simultaneous transmission of at least one of the plurality of combinations, wherein when the number of wireless stations capable of performing the multi-station simultaneous transmission is larger than a maximum effective branch number, the at least one wireless station determines the number of the plurality of combinations to be smaller than or equal to the maximum effective branch number.

20. A method performed by a wireless station for use in a wireless transmission system for path diversity capable of performing multi-station simultaneous transmission of data, the wireless transmission system including a plurality of wireless stations and a multipath transmission path formed between the plurality of wireless stations, the method comprising:

receiving a response packet with respective to a multi-station simultaneous transmission request packet requesting multi-station simultaneous transmission transmitted by itself or other stations;

determining, at one time, depending on the response packet with respect to the multi-station simultaneous transmission request packet for requesting the multi-station simultaneous transmission that is transmitted by itself or another station, a plurality of combinations of a symbol waveform and a delay amount from a reference timing that are used for transmission signals that are sent by the multi-station simultaneous transmission, the plurality of combinations corresponding to a number of wireless stations capable of performing the multi-station simultaneous transmission; and notifying each of the wireless stations capable of performing the multi-station simultaneous transmission of at least one of the plurality of combinations, wherein when the number of wireless stations capable of performing the multi-station simultaneous transmission is larger than a maximum effective branch number, the at least one wireless station determines the number of the plurality of combinations to be smaller than or equal to the maximum effective branch number.

* * * * *